United States Patent [19]

Paneth et al.

[11] Patent Number: 4,675,863
[45] Date of Patent: Jun. 23, 1987

[54] SUBSCRIBER RF TELEPHONE SYSTEM FOR PROVIDING MULTIPLE SPEECH AND/OR DATA SIGNALS SIMULTANEOUSLY OVER EITHER A SINGLE OR A PLURALITY OF RF CHANNELS

[75] Inventors: Eric Paneth; Mark J. Handzel; Steven A. Morley; Graham M. Avis, all of San Diego, Calif.

[73] Assignee: International Mobile Machines Corp., Philadelphia, Pa.

[21] Appl. No.: 713,925

[22] Filed: Mar. 20, 1985

[51] Int. Cl.$^4$ .............................................. H04J 3/02
[52] U.S. Cl. ..................................... 370/50; 370/109; 455/33; 379/59
[58] Field of Search .................. 455/33, 54, 56, 69; 370/93, 110.1, 109, 69.1, 50; 379/58, 59, 63, 60

[56] References Cited

U.S. PATENT DOCUMENTS

| | | | |
|---|---|---|---|
| 4,414,661 | 11/1983 | Karlstrom | 370/110.1 |
| 4,531,235 | 7/1985 | Brusen | 455/33 |
| 4,550,443 | 10/1985 | Freeburg | 455/33 |
| 4,562,572 | 12/1985 | Goldman et al. | 455/33 |
| 4,567,591 | 1/1986 | Gray et al. | 370/109 |
| 4,578,815 | 3/1986 | Persinotti | 455/33 |
| 4,597,105 | 6/1986 | Freeburg | 455/33 |
| 4,613,990 | 9/1986 | Halpern | 455/69 |

Primary Examiner—Douglas W. Olms
Attorney, Agent, or Firm—Arthur A. Jacobs

[57] ABSTRACT

A system for the wireless transmission of multiple information signals utilizing digital time division circuits between a base station and a plurality of subscriber stations. The subscriber stations may be fixed or movable. The number of time division circuits is determined by the transmission quality of the signals. The base station is interconnected with an external information network, which may be analog and/or digital. The information signals are selected from the group consisting of voice, data, facsimile, video, computer and instrumentation signals. The modulation level of the signals and the power applied to the system are adjusted in accordance with signal error detection in the system. The system is provided with spatial diversity by using a plurality of antennas selectively spaced from each other to provide relatively high signal reception despite signal fading. The base station operates over a plurality of RF channel pairs. Each channel pair operation is implemented by the combination of a transmit channel circuit for processing a given plural number of information signals received simultaneously over telephone company trunk lines for simultaneous transmission to different subscriber stations over a given RF channel, and a receive channel circuit for processing a plurality of signals received simultaneously over a given RF channel from different subscriber stations to provide information signals for transmission over the trunk lines.

18 Claims, 31 Drawing Figures

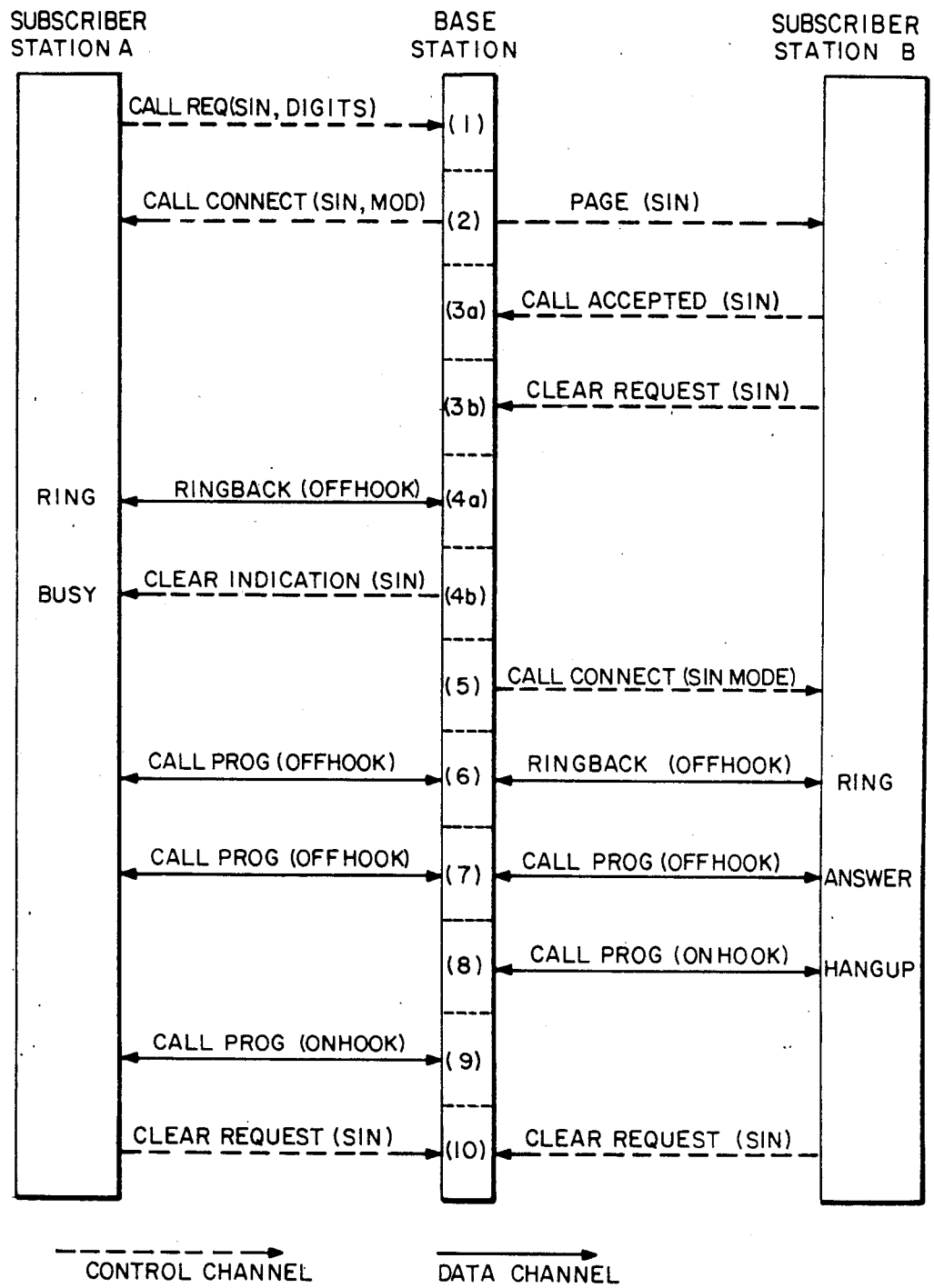

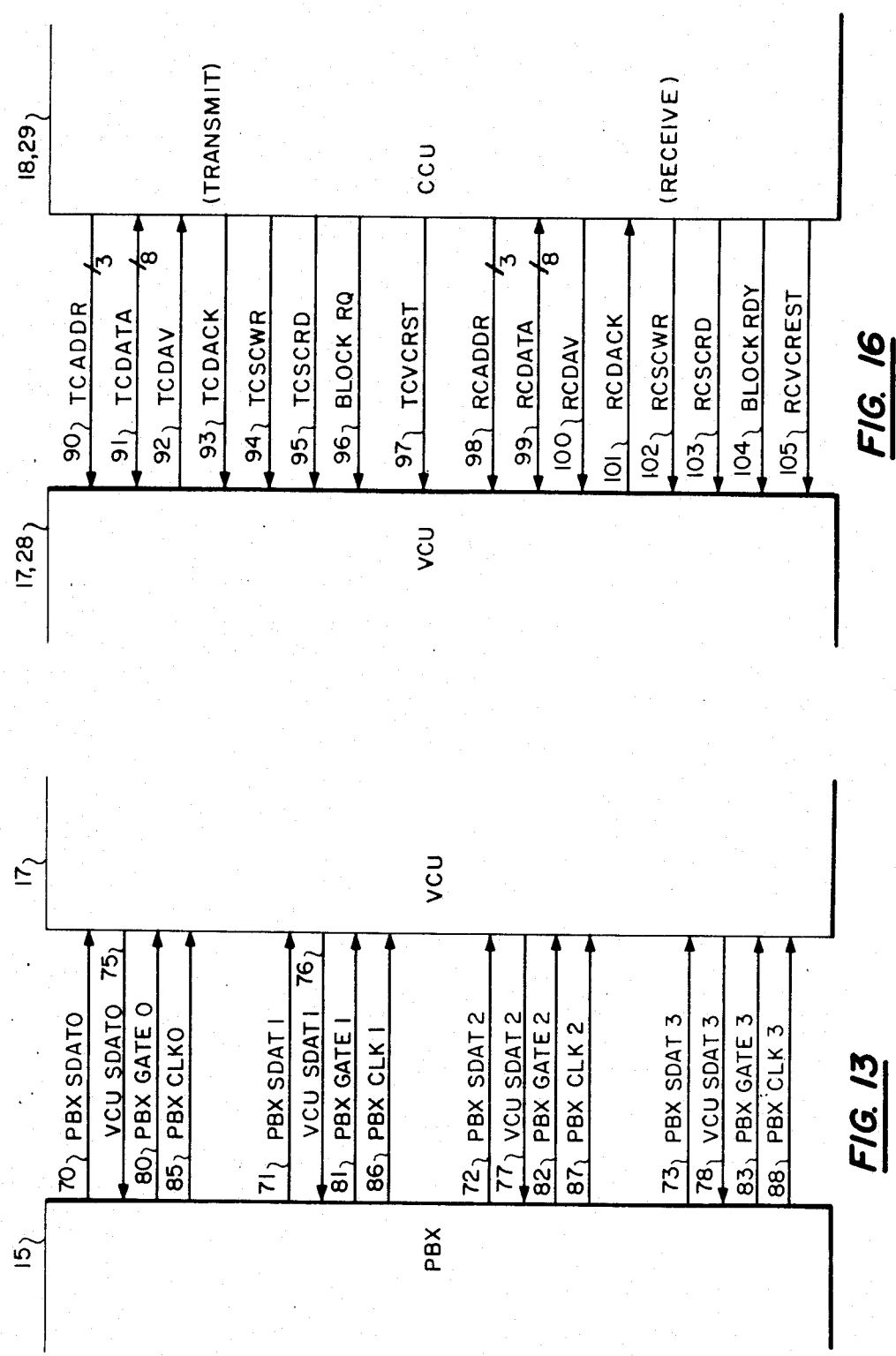

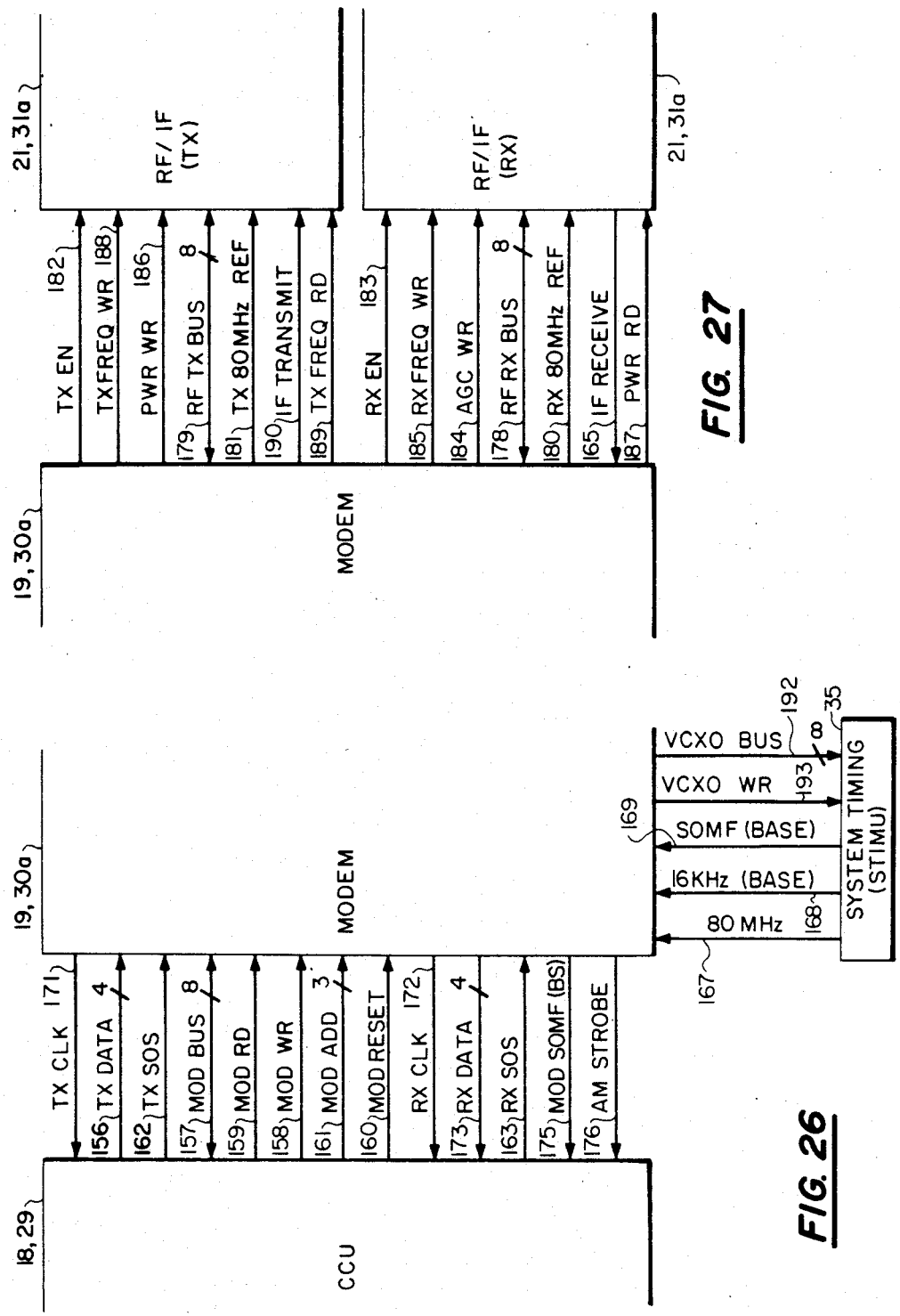

SUBSCRIBER RF TELEPHONE SYSTEM FOR PROVIDING MULTIPLE SPEECH AND/OR DATA SIGNALS SIMULTANEOUSLY OVER EITHER A SINGLE OR A PLURALITY OF RF CHANNELS

BACKGROUND OF THE INVENTION

The present invention generally pertains to communications systems and is particularly directed to a subscriber telephone system for providing multiple information signals simultaneously over one or more radio frequency (RF)channels.

SUMMARY OF THE INVENTION

The present invention provides a system for the wireless transmission of multiple information signals utilizing digital time division circuits between a base station and a plurality of subscriber stations. The subscriber stations may be fixed or movable. The number of time division circuits is determined by the transmission quality of the signals. The base station is interconnected with an external information network, which may be analog and/or digital. The information signals are selected from the group consisting of voice, data, facsimile, video, computer and instrumentation signals.

The movable subscriber stations may be selectively relatively fast and relatively slow moving.

The modulation level of the signals and the power applied to the system are adjusted in accordance with signal error detection in the system.

The system is provided with spatial diversity by using a plurality of antennas selectively spaced from each other to provide relatively high signal reception despite signal fading.

The base station operates over a plurality of RF channel pairs. Each channel pair operation is implemented by the combination of a transmit channel circuit for processing a given plural number of information signals received simultaneously over telephone company trunk lines for simultaneous transmission to different subscriber stations over a given radio frequency (RF) channel, and a receive channel circuit for processing a plurality of signals received simultaneously over a given RF channel from different subscriber stations to provide information signals for transmission over the trunk lines.

Separate conversion devices are respectively connected to each of the trunk lines for converting the information signals received over the trunk lines into digital signal samples.

The transmit channel circuit includes a given plural number of separate signal compression devices for simultaneously compressing the digital signal samples respectively derived from separate ones of the conversion devices to provide the given number of separate compressed signals; a channel control unit connected to the compression devices for sequentially combining the compressed signals into a single transmit channel bit stream, with each of the respective compressed signals occupying a repetitive sequential slot position in the transmit channel bit stream associated with a predetermined one of the separate compression devices and a unit for providing a transmit channel signal for transmission over the predetermined RF channel in response to the transmit channel bit stream.

An exchange couples the respective separate conversion devices to indicated ones of the separate compression devices.

A remote-connection processor unit is coupled to the trunk lines and responds to an incoming call request signal received over one of the trunk lines by providing a slot assignment signal indicating which one of the separate compression devices the exchange is to connect to the one of the separate conversion devices connected to the one trunk line, and thereby assigns to the one trunk line the slot in the transmit channel bit stream associated with the one of the separate compression devices that is so connected by the exchange. The remote-connection processor maintains a memory of which slots are so assigned and consults such memory upon receipt of an incoming call request and then provides the slot assignment signal that effects the connection to a compression device associated with one of the slots that is not assigned to another trunk line.

A call processor is connected to the remote-connection processor and responds to the slot assignment signal by causing the exchange to complete the connection indicated by the slot assignment signal.

The receive channel circuit includes a receiver unit for receiving a receive channel signal and for processing the receive channel signal to provide a receive channel bit stream containing separate compressed signals in different respective repetitive sequential slot positions; a given plural number of separate signal synthesis devices each associated with a different slot position in the receive channel bit stream for reconstructing digital signal samples from separate compressed signals contained in the associated respective slot positions of the receive channel bit stream; and a control control unit for segregating the separate compressed signals from the receive channel bit stream and distributing the segregated signals to the separate synthesis devices associated with the respective time slots from which the signals are segregated.

Separate reconversion devices are respectively connected to each of the trunk lines for reconverting digital signal samples to information signals for transmission over the respective trunk lines. Each of the separate reconversion means is associated with one of the separate conversion means and is connected to a common one of the trunk lines with the associated separate conversion means.

The exchange couples the respective separate reconversion devices to indicated ones of the separate synthesis devices.

The remote-connection processor responds to the incoming call request signal received over the one trunk line by providing a slot assignment signal for indicating which one of the separate synthesis devices the exchange is to connect to the one of the separate reconversion devices connected to the one trunk line and thereby assigns to the one trunk line the slot in the receive channel bit stream associated with the one of the separate synthesis devices that is so connected by the exchange means. The remote-connection processor maintains a memory of which slots in the receive channel bit stream are so assigned and consults such memory upon receipt of the incoming call request and then provides to the call processor the slot assignment signal for effecting the connection to a synthesis device associated with one of the slots that is not assigned to another trunk line.

The system of the present invention makes use of advanced digital and large-scale-integration electronics techniques to bring low-cost, reliable, high-quality communications to various market segments. One preferred embodiment uses a fixed base station installation centrally located to communicate with a large number of subscriber stations placed in the nearby geographic area. The central base station may be connected to a central office of a public switched telephone company (Telco) network through a private branch exchange switch (PBX) connected to incoming telephone trunks. The subscriber stations in the system may be either fixed-base portable or mobile in nature, and may be operational in either relatively slow or fast motion. The subscriber stations communicate with the base station via UHF radio channels and with the user via standard two-wire DTMF touchtone telephone equipment or via RS-232C or via non-standard phone stations (e.g., 4-wire). The system may be used to replace existing hard-wired local subscriber loops or to provide quality telephone service to areas where wired connections are not feasible or economical.

One feature of the system of the present invention is the ability to use time division multiple access (TDMA) and digital speech encoding to allow simultaneous multiple use of frequencies within a given network. Any feasible number of high-quality voice circuits may be operating on a given frequency channel (with 25 KHz channel spacing) at a time. Four such circuits are used for illustrative purposes. This provides both a spectral and an economic advantage over existing analog radiophone systems which can provide for only one conversation at a time on a given frequency channel.

Features which bring about the lower-cost fixed, mobile and portable service are the use of low-rate digital voice coding (less than 16 Kbps) combined with spectral-efficient digital modulation techniques. For example, the combined use of a 14.6 Kbps voice coding technique and 16-level DPSK modulation allows four simultaneous full-duplex conversations to be supported on a single pair of 20 KHz Bw channels that are spaced 25 KHz apart in the entire spectrum, and particularly in the 400–500 MHz and 800–950 MHz segments. This combination provides good quality speech over a distance of at least 20 Km.

To be competitive with wireline service, a much larger population of subscribers must be accommodated than can be supported simultaneously on a given pair of 25 KHz channels. For example, a 12-channel-pair system which supported 47 simultaneous calls might have a total off-hook plus on-hook population of 500 subscribers (with the maximum constrained by the desired peak-hour blocking probability). Thus, a subscriber call-request control scheme which provides reasonable call-connection delays is also an important feature of the present invention.

Additional features of the present invention are described in relation to the description of the preferred embodiments.

BRIEF DESCRIPTION OF THE DRAWINGS

FIG. 4 illustrates the sequence of messages generated by the subscriber stations and the base station to establish a connection between two subscriber stations.

FIG. 13 shows the signal interface between the PBX and the VCU in the base station of FIG. 2.

FIG. 16 (on sheet 11) shows the signal interface between the VCU and the CCU in both the base station of FIG. 2 and the subscriber station of FIG. 3.

FIG. 26 shows the signal interface between the CCU, the modem and the STIMU in the base station of FIG. 2.

FIG. 27 shows the signal interface between the modem and the RFU in the base station of FIG. 2 and in the subscriber station of FIG. 3.

GLOSSARY OF ACRONYMS

Glossary of acronyms used in the Specification

| ACRONYM | DEFINITION |
| --- | --- |
| A/D | Analog-to-Digital Converter |
| ADPCM | Adaptive Differential Pulse Code Modulation |
| AGC | Automatic Gain Control |
| AM | Amplitude Modulation |
| BCC | Baseband Control Channel |
| BPSK | Binary Phase Shift Keying Modulation |
| BW | Bandwidth |
| CCU | Channel Control Unit |
| CODEC | Combined Coder and Decoder |
| DEMOD | Demodulator (Receive Portion of Modem) |
| D/A | Digital-to-Analog Converter |
| dB | Decibels |
| DID | Direct Inward Dial |
| DMA | Direct Memory Access |
| DPSK | Differential Phase Shift Keying Modulation |
| DTMF | Dual Tone Multi-Frequency signalling scheme |
| ECL | Emitter-coupled Logic |
| FCC | United States Federal Communications Commission |
| FIFO | First-in First-out Memory |
| FIR | Finite-Duration Impulse-Response filter |
| Hz | Hertz (cycles per second) |
| I | In-phase |
| IF | Intermediate Frequency |
| Kbps | Kilobits per second |
| KHz | KiloHertz |
| Km | Kilometer |
| LSB | Least Significant Bit |
| MDPSK | Multi-phase Differential Phase Shift Keying modulation |
| MHz | MegaHertz |
| MODEM | Combined Modulator and Demodulator |
| MPM | Message Processing Module |
| ms | milliseconds |
| OCXO | Oven Controlled Crystal Oscillator |
| PBX | Private Branch Exchange or Automatic Switch |
| PCM | Pulsed Coded Modulation |
| PSN | Public Switched Network |
| PSTN | Public Switched Telephone Network or other interconnecting carrier (typically Telco) |
| Q | Quadrature |
| QPSK | Quadrature Phase Shift Keying Modulation |
| RBTG | Ringback Tone Generator |
| RAM | Random Access Memory |
| RCC | Radio Control Channel |
| RELP | Residual Excited Linear Prediction |
| RF | Radio Frequency |
| RFU | Radio Frequency Unit |
| RPU | Remote-Connection Processor Unit |
| ROM | Read-only Memory |
| RX | Receive |
| SBC | Subband Coding |
| SHF | Super High Frequency (3,000–30,000 MHz) |
| SIN | Subscriber Identification Number |
| SLIC | Subscriber Loop Interface Circuit |
| STIMU | System Timing Unit |
| STU | Subscriber Station Telephone Interface Unit |
| SUBTU | Subscriber Timing Unit |
| TDM | Time Division Multiplexing |
| TDMA | Time Division Multiple Access |
| Telco | Telephone Company |
| TX | Transmit |
| UHF | Ultra-High Frequency |
| UTX-250 | Switch that includes processing and interfacing and which may be but is not necessarily a PBX |
| UW | Unique Word |
| VCU | Voice Codec Unit |

-continued

| ACRONYM | DEFINITION |
| --- | --- |
| VCXO | Voltage Controller Crystal Oscillator |
| VHF | Very High Frequencies (30–350 MHz) |

DESCRIPTION OF THE PREFERRED EMBODIMENT

In this description, it is to be noted that where a particular band (e.g., 454 to 460 MHz) is used in the described embodiment, the invention is equally applicable to at least the entire VHF, UHF and SHF bands.

Figure 1:
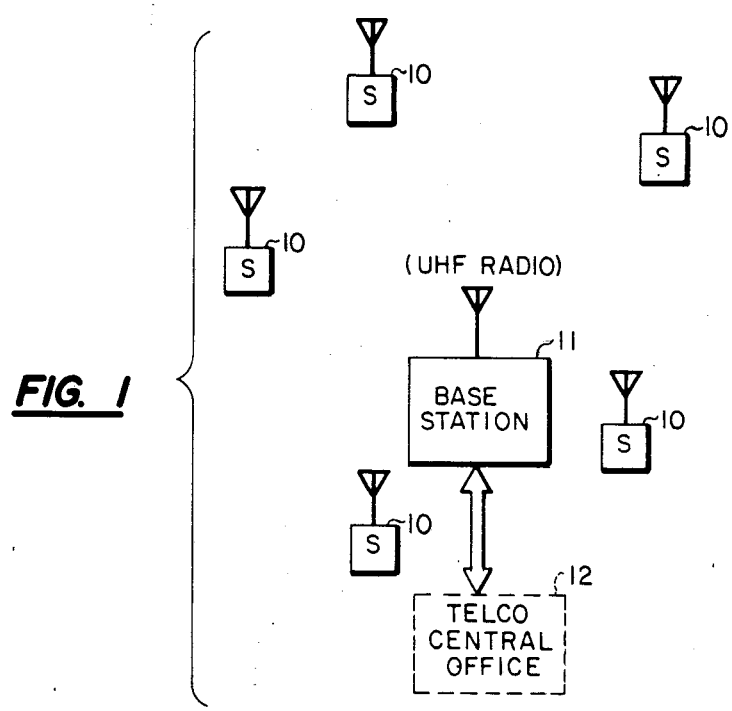
FIG. 1 is block diagram generally showing the RF subscriber telephone system of the present invention.

Referring to FIG. 1, the system of the present invention provides local-loop telephone service using UHF radio between subscriber stations (S) 10 and a base station 11. The base station 11 provides call connections directly between the radio-based subscriber stations 10 and is connected to a telephone company (Telco) central office 12 for calls to or from points outside the system.

For example, the illustrated system operates on common carrier frequency channel pairs within the 454 MHz to 460 MHz band. This particular set of frequencies contains 26 specified channels. The channels are spaced 25 KHz apart with an authorized bandwidth of 20 KHz. Spacing between transmit and receive channels is 5 MHz with the center frequency of the lower of the two frequencies being assigned to the base station transmissions. As indicated previously, the system may also operate on other UHF channel pairs.

The mode of transmission from the base station to the subscriber station (the transmit channel) is time division multiplexed (TDM). The transmission from the subscriber station to base station (the receive channel) is time division multiple access (TDMA).

All systems are designed to be compatible with 47 CFR FCC Parts 21, 22 and 90, as well as with other relevant rules.

Communication between the base station 11 and the subscriber stations 10 is accomplished digitally by filtered multiphase differential phase shift keying (MDPSK) modulation on 25 KHz spaced full duplex channels in the 454 to 460 MHz band, thereby satisfying the requirements of 20 KHz bandwidth such as designated in FCC rule Parts 21, 22 and 90 (e.g., 21.105, 22.105 and 90.209). This system may also be used for other band widths and spacings within any feasible portion of the VHF, UHF and SHF spectrums.

The symbol rate on each 25 KHz FCC channel is 16 kilosymbols/second in each direction. Voice transmission is accomplished using 16 level PSK modulation and voice digitization with a coding rate of 14.6 Kbps. Alternatively, the modulation may be two-level (BPSK) or four-level (QPSK). A mixture of different modulations levels may be used on the same channel simultaneously. With time division multiplexing, the system provides one conversation for each multiple-of-two phases at the 14.6 Kbps rate (4 phases provides two conversations, 16 phases provides four conversations, etc.) or more as appropriate for lower rates. This is, of course, only one example since, as shown by the following chart, many different combinations of modem bits/symbols or phases and Codec rates may be used:

Chart I
2-Way Conversations or
Duplex Circuits Using Codec Rates of:

| Phases Modulation | 14.4 Kbps | 6.4 Kbps | 2.4 Kbps |
|---|---|---|---|
| 4 | 2 | 4 | 8 |
| 8 | 3 | 6 | 12 |
| 16 | 4 | 8 | 16 |
| 32 | 5 | 10 | 20 |
| 64 | 6 | 12 | 24 |
| 128 | 7 | 14 | 28 |

The base station is capable of transmitting and receiving on any or all of the available FCC 25 KHz spaced frequency channels in the 454 to 460 MHz band wherein the channels are selectable. Channel frequency selection for each voice channel is accomplished automatically by the base station, one at a time, but may be overridden at an operator console interface provided at the base station.

The base station may have a transmitter power output of, typically, 100 watts for each frequency channel.

The base station provides modulation control, and time slot and frequency channel assignments to the subscriber stations. In addition, adaptive power control over the subscriber stations is exercised by the base station to minimize sequential time slot differences and adjacent channel interference.

Switching among Telco (telephone company) trunk lines and the TDM slots on the selected channel is accomplished by the base station using preferably a digital switch, although it is possible to substitute an analog switch.

The base station provides triple spatial diversity capability on the receive channels.

The subscriber station is capable of operating with three branch diversity. The transmitter power is typically adjustable between 0.1 and 25 watts, but it can be adjusted over other ranges of power. While voice communications through the subscriber station are perceived as being real time full-duplex, the RF system operates at half-duplex by utilizing appropriate time division multiplex timing methods.

The subscriber station interfaces with any telephone instrument for voice communications, or the telephone may be built into the system. In addition, a data connection such as an RS-232C standard 25-pin connection is provided for 9600 band rate data transmission between subscribers. The base station and the subscriber station may obtain operating power from any feasible source, either internal or external.

Figure 2:
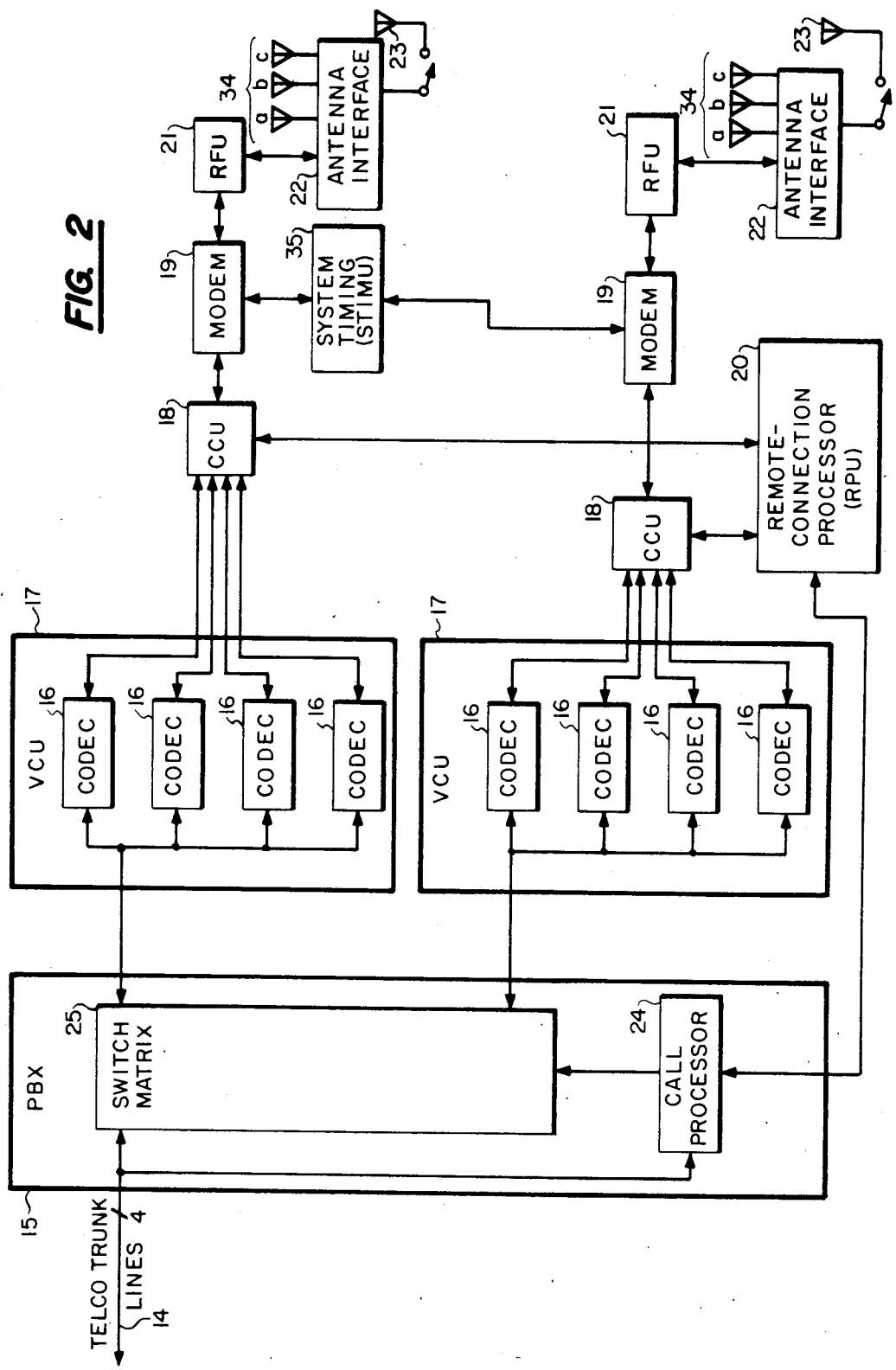
FIG. 2 is a block diagram of a representative preferred embodiment of the base station in the system of FIG. 1.

FIG. 2 is a block diagram of an embodiment of the base station that supports the simultaneous operation of two pairs of transmit and receive frequency channels. Each channel can process up to four phone connections simultaneously. In the preferred embodiment, there are many transmit and receive channel pairs. There are several time slots in each channel.

One of the several available time slots is required for a radio control channel (RCC).

Connections between the PSTN and the subscriber stations are established and maintained in the private branch exchange (PBX) 15 which is resident in the base station. The PBX 15 is a model UTX-250 system, an off-the-shelf product developed by the United Technologies Building Systems Group. Many of the existing features of the generic PBX system are utilized in the control of Telco interfaces required in the system of the present invention. The PBX 15 also converts voice information to/from the PSTN to 64 Kbps μ-law companded pulse coded modulation (PCM) digital samples. From this point on, the voice information is processed in a digital format throughout the base station and the subscriber stations, right up to the interface circuitry connecting to the subscriber telephone, or as far as the subscriber transmitter and receiver permits.

Digital voice information from the PBX 15 is next processed by a voice compression system known as a codec 16, which reduces the voice information rate from 64 Kbps to approximately 14.6 Kbps or less. The codec 16 uses either a Residual Excited Linear Predictive (RELP) algorithm or an SBC encoder-decoder to perform this voice rate compression. Typically, four codecs 16 reside in a single voice codec unit (VCU) 17 for performing voice compression for the four or more time slots in each frequency channel. Each base station VCU 17 can process four or more full-duplex voice connections for both the transmit channel and the receive channel of each channel pair. Connections by the PBX 15 determine which voice call is processed by which VCU 17 and by which codec 16 in the selected VCU 17. The circuits of each VCU 17 are hardware-mapped such that a voice call on a specific frequency and slot assignment in the base station is always processed by the same VCU codec 16.

Each VCU 17 is connected to a channel control unit (CCU) 18. The CCU 18 controls the TDMA function and also functions as a link-level protocol processor. Each CCU 18 takes the transmit channel outputs of the codecs 16 in the corresponding VCU 17 and transmits the data in the proper time slot and in the proper format to a modem unit 19. Each CCU 18 determines the modulation levels, as directed by a remote-control processor unit RPU 20, to be used for the broadcast (such as 2, 4 or 16 level PSK modulation). Each CCU 18 also processes control information for communication to the subscriber stations through the radio control channel (RCC) time slot and during overhead control bits in the voice channels. Each channel pair contains a series-connected combination of a VCU 17, a CCU 18 and a modem 19.

Properly formatted transmit data from each CCU 18 is transferred at a 16 K symbol/second rate to the modem corresponding 19. Each modem 19 takes these synchronous symbols and converts them to a Gray-coded multi-level phase shift keyed (PSK) format. The transmit channel output of the modem 19 is a modulated IF signal. This signal is fed into the RF/IF processing unit (RFU) 21 which then converts the IF signal to the RF UHF signal in the 450 MHz range. Control signals for the modem 19 and the RFU 21 are provided by the corresponding CCU 18, working under the overall control of the RPU 20. The UHF signal is amplified by power amplifiers in the RFU 21 and transferred through an antenna interface unit 22 to a transmit antenna 23 for open-air broadcast.

The receive function of the base station is essentially the reverse of the transmit function. Each RFU 21, modem 19, CCU 18, VCU 17 and the PBX 15 are full-duplex in nature.

The remote-control processor unit (RPU) 20 is the central control processor which conveys connection data and control messages to the CCU. The RPU 20 includes a general-purpose computer based on a Model 6800 microprocessor which performs the sophisticated system management functions and control mechanisms for call setup, teardown, and maintenance. The RPU 20 also communicates with a call processor 24 in the PBX 15 to control the interconnections between the codecs 16 and the Telco trunks accomplished by a switch matrix 25 of the PBX 15.

Each subscriber station is a relatively small unit which is located at each user site in the system. The subscriber station connects the user's standard telephone set and/or data terminal or integrated acoustical transmitter/receiver to the base station through the UHF radio channel. The subscriber station's function is very similar to that of the base station. However, whereas the base station can operate on one or more frequency channels simultaneously, each offering the capacity to support several voice circuits, the subscriber station normally operates on only one frequency at a time.

Figure 3:
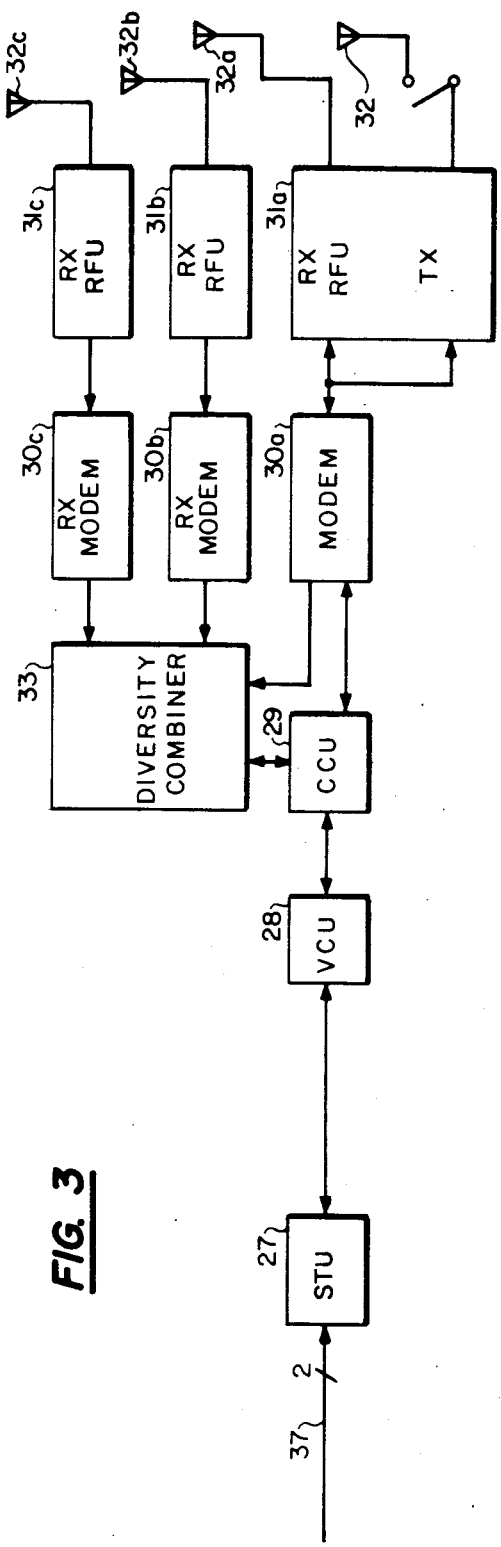
FIG. 3 is a block diagram of a preferred embodiment of a subscriber station in the system of FIG. 1.

FIG. 3 is a block diagram of a subscriber station. The functional partitioning is very similar to that of the base station (FIG. 2). The user interface function is performed by the subscriber telephone interface unit (STU) in the subscriber station. The associated function in the base station is performed by the PBX module. The STU in the subscriber station also performs all control functions of the subscriber station just as the RPU functions in the base station. The subscriber stations act as slaves to the master base station in the overall system control architecture. The STU may interface with an external instrument or may transmit and receive acoustically.

Following the data flow through the subscriber station, the user voice or data information is first processed by a subscriber terminal unit (STU) 27. The voice signal inputs from the user telephone are received and digitized in the VCU 28. The format for the digitized voice signals is identical to the format used by the PBX 15 in the base station. The subscriber station includes a VCU 28, CCU 29, modem 30a and a RFU 31a that perform similar functions as the like units described above in the base station architecture description related to FIG. 2. One difference in the subscriber station operation is that usually it is limited to only one voice channel at a time. The subscriber station essentially operates in the half-duplex mode, transmitting in a portion of the TDMA frame and receiving in a different portion of the TDM frame. With a frame size of 45 msec the half-duplex characteristic of the subscriber station is transparent to the user, who hears continuous voice input from the party at the other end of the call connection. The STU 27 and VCU 28, as well as the modem 30a, may be duplicated to permit more than one subscriber conversation.

The half-duplex operation of the subscriber station offers opportunity to make more efficient use of the available subscriber station hardware. The subscriber station VCU and CCU function in essentially identical manner as in the base station, at least as far as voice data handling is concerned. However, the modem 30a is set up to operate in a half-duplex mode so that either the receive or transmit portion of the modem are used, but not at the same time. The primary savings here is that the RFU 31a need only operate in half-duplex mode. This saves power in that the RF power amplifier is active for no more than half the time. Also, the RF transmit antenna 32a can be switched to operate as a second receive antenna during the receive portions of the frame using an RF antenna switch function. Furthermore, no duplexer is required.

Each subscriber station also includes a diversity network including three modems and a diversity combiner circuit 33. The diversity combiner circuit 33 gathers demodulated receive information from each of the demods of the three modems 30a, 30b, 30c and combines the three streams to form a single "best-guess" symbol stream which is then sent on to the CCU 29 to process. The demodulation circuits or demods in the three modems 30a, 30b, 30c are connected to separate RX RFUs 31a, 31b, 31c and thereby to separate antennas 32a, 32b, 32c.

In the base station, three receiver antennas 34a, 34b and 34c are placed an appropriate distance from each other to provide uncorrelated spatially diverse signals to be processed by a diversity network. The operation of the diversity network is transparent to the CCU function and therefore can be replaced by a single modem function at any time that the diversity function is not required.

The base station also includes a spatial diversity network for each transmit and receive channel pair. Although the diversity network is not shown, the base station diagram of FIG. 2 is the same as that shown in the subscriber station diagram of FIG. 3, which shows the connection of the diversity network for a single transmit and receive channel pair. Thus, each transmit and receive channel pair in the base station actually contains three demods and one modem connected to a diversity combiner circuit as shown in FIG. 3.

Accurate timing synchronization between base station and the subscriber stations is critical in the overall system. The master timing base for the entire system is provided by the base station. All subscriber units in a given system must synchronize to this time base, in terms of frequency, symbol timing and frame timing.

The base station includes a system timing unit (STIMU) 35 which provides a high accuracy timing reference clock signal at 80.000 MHz. This 80 MHz reference clock signal is divided down to produce a 16 KHz clock signal and a 22.222 Hz (45 msec duration) frame strobe marker signal. All base station transmit timing is generated from these three synchronous master references. The 80 MHz clock signal is used by the modems 19 and the RFUs 21 for accurate IF and RF frequency bases. The 16 KHz clock signal provides the symbol rate timing for transmissions on all base station frequencies. The 45 msec marker signal is used to denote the first symbol in a new frame. This marker is active for a period of one symbol time (62.5 microseconds, equal to 1/16000 Hz). All frequency channels in the base station use the same time reference for transmission. The three timing signals (80 MHz, 16 KHz and start of frame {SOF} marker) are provided to each modem 19 in the base station. The modem 19 distributes the appropriate clock signals to the CCU 18 and RFU 21 in same series-connected transmit and receive channel pair. The 16 KHz and SOF marker are used by the CCU 18 to time the transmission of voice and control symbols according to the current frame structure on that frequency.

The receive timing in the base station is ideally identical to the base station transmit timing. That is, the SOF marker and symbol clock signals should be exactly lined up between the transmit and receive signals. However, since perfect timing synchronization cannot be expected from the subscriber station transmission, the base station modem's 19 receive timing must match the incoming symbols from the subscriber station. This is required so that the sampling period in the base station modem 19 receive function provides the best estimate of the symbol being received from the subscriber station. A small elastic buffer in the CCU 18 interfaced with the modem 19 receive function compensates for this slight timing skew.

The subscriber stations in the overall system synchronize their time references to the master time base in the base station. This synchronization is achieved through a multiple step procedure whereby the subscriber station initially acquires the base station time reference through the use of the RCC messages from the base station. This procedure is described below.

Once the subscriber station has initially acquired the time reference from the base station, a tracking algorithm in the demods of the subscriber station modems 30a, 30b, 30c keeps the subscriber station receive timing accurate. The subscriber station advances its own transmissions back to the base station by a small amount of time to offset the transmission round-trip delay due to the subscriber station ranging. This method results in the transmission from all subscriber stations being received by the base station in proper phase in relation to each other.

The system timing unit (STIMU) 35 provides the time base for all transmissions in the base station. The STIMU 35 includes a high-accuracy ($3 \times 10-9$) ovenized crystal oscillator operating at a fixed frequency of 80 MHz. This basic clock frequency is divided by 5000 in the STIMU 35 to form the 16 KHz symbol clock signal and again by 720 to form a start of frame (SOF) marker signal. These three time references are buffered and provided to each of the base station modems.

The subscriber timing unit (SUBTU) (not shown in FIG. 3) provides a 80 MHz clock signal, a 16 KHz symbol timing signal and a 45 msec duration frame marker signal for the subscriber stations. These signals are identical to those in the base station STIMU, except that the 16 KHz clock signal is used as the receive symbol timing in the subscriber station. The 16 KHz clock signal is used for transmit timing in the base station. Transmit timing in the subscriber station is provided by a delayed version of the subscriber station receive timing. The delay is a variable amount determined by the ranging computation performed between the base station and the subscriber station.

The timing reference signal for the subscriber station is provided by a voltage controlled crystal oscillator (VCXO) operating at a nominal 80 MHz frequency. The actual frequency is adjusted by the subscriber station modem to be frequency locked to the base station timing reference as received at the subscriber RF unit input.

Protocols

The following protocols specify the procedures for system control, collision avoidance and call signaling in the system, as well as the transmitted frame structure. In referring to the components of the system, reference is made to the components of the base station described above in relation to FIG. 2, unless otherwise indicated.

The system uses 20 KHz BW full duplex channels in the 450 MHz spectral region on 25 KHz centers and accommodates several simultaneous conversations per channel. Each full duplex channel consists of a receive and a transmit frequency separated by 5 MHz. The lower frequency of each channel is assigned to the base station for transmission and is called the forward frequency. The higher frequency of each channel, called the reverse frequency, is assigned to the subscriber stations for transmission. Thus, the base station transmits on the forward frequency and receives on the reverse frequency. The opposite is true for the subscriber stations.

The capability of the system to provide a spectrally efficient method of transmitting up several voice channels on a single frequency is primarily dependent on the modem operation. The modem 19 must operate in such a manner as to provide 3.2 bits/Hz efficiency when operating in a 16-phase DPSK mode at a 16K symbol/second rate.

The modem 19 is strictly a mechanism to convert the 1, 2, 4 or more bit symbols from the CCU 18 to a phase-modulated IF carrier for transmission, and to reverse the process on the receive side. All control for frame timing and mode selection is performed by the CCU 18. An interface between the CCU 18 and modem 19 may consist of two four-bit unidirectional synchronous (16K symbols/second) data busses (Tx and Rx). In addition, an 8-bit status/control bus provides control information to the modem and reports status from the modem to the CCU 18. The modem 19 also provides the CCU 18 with the master 16 KHz symbol clock signal. In the base station this clock signal is received from the master oscillator in the system timing unit 35, to which the entire base station (and therefore the entire system) is synchronized. In the subscriber station this clock is derived from the incoming symbols received from the base station. Therefore, all transmissions are referenced to the time base in the base station. A major function of the subscriber modem operation is to synchronize the local subscriber clock signal to the base station time reference by decoding the timing from the received symbols.

The modem transmitter modulator section uses an FIR digital filter to create a digital representation of the waveform which is used to modulate the RF carrier. The resultant digital stream is converted to analog format and mixed to an IF transmit frequency of 20.2 MHz. The signal is then sent on to the RFU for filtering, further conversion to RF and amplification prior to transmission.

The modem receiver demodulator section takes in the IF receive signal from the RFU 21 at the receive IF frequency of 20 MHz. This signal is down-converted to baseband, then digitized with an A/D converter function. The resultant digital samples are processed by a microprocessor-based signal processing unit. This function performs filter equalization and synchronization algorithms on the input samples and then demodulates the PSK signal to yield the symbol stream at 16K symbols/second. The signal processing unit also functions in a self-training mode, which is used to teach the processing unit the imperfections of the analog filters used in the receive stream. Once the signal processing unit is trained, the demodulator digital equalization process compensates the input samples for these imperfections in the analog filter components. This technique allows the use of less expensive lower-tolerance analog components and adds to the overall system ability to demodulate weak or noisy signals.

The modem demodulated symbols are output at the symbol rate to the CCU 18 during the receive function. The modem 19 provides the timing associated with this symbol stream. Both the base station and the subscriber stations derive receive function timing from the incoming receive signal.

Figure 25:
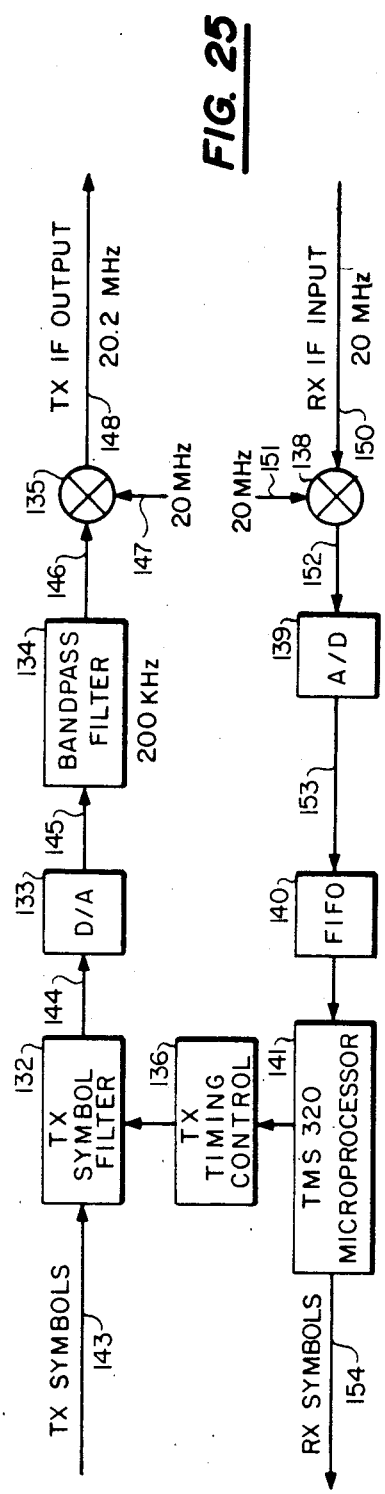
FIG. 25 (on sheet 3) is a block diagram of the modem of the base station of FIG. 2 and the subscriber station of FIG. 3.

A more detailed description and specification of the modem functions and performance characteristics is set forth below in relation to FIG. 25.

The basic TDM/TDMA channel per subscriber offers a total of 16 Kbps in each direction dedicated to each conversation. Of this channel capacity, 1.43 Kbps in each direction are required for control overhead and demodulation preambles. The VCU therefore operates at a fixed data rate of 14.57 Kbps. This is equivalent to 328 bits per codec frame period, defined as being one-half of the modem frame period or 22.5 msec.

To accommodate multiple conversations per channel, each channel is divided into "slots" via a time division multiplexing (TDM) scheme. These slots specify the system frame format. The length of the system frame consists of a predetermined constant number of symbols. The system frame duration has been optimized considering the voice coding rate and the number of acquisition symbols required by the modem 19 at the start of each burst. The number of slots within the system frame is dependent on the modulation-level of the channel. For instance, if the modulation-level of the channel is QPSK, then the system frame consists of two slots per frame. By increasing the modulation-level of the channel, the number of bits of information encoded per symbol increases and, therefore, the data rate of the channel increases. At 16-level DPSK the system frame divides into four slots, each handling the voice data rate for one conversation. It is important to note that even at the higher modulation levels, the number of symbol times required for modem synchronization remains constant.

The format of the system frame ensures that the modem 19 in the subscriber stations never needs to operate in a full-duplex manner (i.e., transmitting and receiving at the same time). Hence, the slots on the reverse and forward frequencies are offset in time by at least one slot time.

The system frame for the system is fixed at 45 msec in duration. The symbol transmission rate is fixed at 16K symbols/second. Each symbol is transmitted for an equal amount of time, equal to 1/16000th of a second (62.5 microseconds). This results in a fixed 720 symbols per frame, numbered 0 to 719 from the start of the system frame. These 720 symbols may consist of 1, 2 or 4 bits of information each, corresponding to modulation rates of 2, 4 or 16 phases.

The system frame time (45 msec) is further divided in 2 or 4 time division slots, depending on the modulation format for the slots which compose the frame. Each slot can be one of three slot types: (1) radio control channel (RCC), (2) 4-ary voice channel, and (3) 16-ary voice channel. The RCC is always transmitted in a binary (2-phase) modulation mode. The RCC and 16-ary voice channel slots each require 180 symbols to transmit, that is, one-fourth of a system frame period. Since the 16-ary voice channel transmits 4 bits of information per symbol (that is $2^4 = 16$ phases), the 16-ary voice channel transmits 720 bits of information per frame. This equates to a bit rate of 16 Kbps. Some of these bits are used for modem overhead and control purposes, resulting in a voice bit rate of 14.57 Kbps. The 4-ary voice channel slot requires 360 symbols to transmit, equal to one-half of the system frame period. Each symbol in this slot type consists of one of four differential phases, so that 2 bits are transmitted per symbol ($2=4$ phases). The resulting bit rate is 16 Kbps, the same as for the 16-ary voice channel. The same number of bits (not symbols) are reserved for modem overhead and control purposes, so that the voice information rate is 14.57 Kbps, as it is in the 16-ary voice channel slot type.

The system frame on any given frequency channel may be composed of any combination of these three slot types within the following five constraints:

1. A maximum number (720) of symbols are transmitted each system frame. Combinations of the three slot types may be combined on a given frequency to accomplish this. In the event that not all channel capacity is filled in base station frame transmission (i.e., fewer than 720 symbols are transmitted in a frame) null symbols are inserted to fill the 720-symbol frame capacity. A null symbol is a symbol which has no transmitted energy.

2. Only one frequency in a multi-frequency base station includes a RCC slot type. Only one RCC is operable at any given time in the entire system. The frequency on which the RCC operates is set by a system initialization parameter and is changed only when that frequency channel becomes unavailable for any reason. The RCC slot is always assigned to the first 180 symbols of the system frame (denoted as Slot 0).

3. A base station frequency may operate in a constant transmission mode. The subscriber station transmits during no more than one-half of the total frame time. The subscriber station, when carrying one conversation, transmits only during 25% of the frame when operating in the RCC or 16-ary voice channel mode. The subscriber station will transmit during 50% of the frame when operating in the 4-ary voice channel mode. A subscriber station can only transmit in one slot during any given frame when carrying one conversation.

4. All 4-ary voice channels must begin transmission on symbol number 0 or 360. That is, either the first half or the second half of a frame may contain a 4-ary voice channel.

5. Transmissions between the forward and reverse frequencies are assigned so that the reverse message of given slot begins transmission 180 symbols after the transmission of the forward frequency message. This precludes the subscriber station from the requirement to transmit on the reverse frequency while simultaneously receiving on the forward frequency.

Given these restrictions up to four voice calls can be processed on a single frequency, if all four calls consist of the 16-ary voice channel format when operating within 14.4 Kbps codecs.

The slots within the system frame are numbered by position in the frame structure. The numbering system need not be contiguous. When one or more of the slots in the frame consist of a 4-ary voice channel slot type, the numbering system will "skip" over the second slot period that is included in the longer 4-ary slot. The slot numbering system for the reverse frequency (i.e., subscriber) transmissions is staggered from the numbering of the base station (forward frequency) transmission. Therefore, a subscriber that receives information on slot 2 of the forward frequency transmits on slot 2 on the reverse frequency, which is half a frame offset in time. Tables 1 through 5 illustrate possible frame formats and the numbering associated with each slot.

TABLE 1

Radio Control Channel Structure: BPSK

Forward Channel:

| Slot no. | 0 | 1 | 2 | 3 |
|---|---|---|---|---|
| No. of symbols | 180 | 180 | | |
| Modulation type | BPSK | 16-PSK | | |

System frame = 45 ms (each slot 11.25 ms)

| Function | AM HOLE | FILTER STARTUP | BIT SYNC PATTERN | RCP |
|---|---|---|---|---|
| No. of Symbols | 8 | 8 | 46 | 112 |

Reverse Channel:

| Slot no. | 2 | 3 | 0 | 1 |
|---|---|---|---|---|
| No. of symbols | | | 180 | 180 |
| Modulation type | | | BPSK | 16-PSK |

(each slot 11.25 ms)

| Function | RANGE 1 | FILTER STARTUP | BIT SYNC PATTERN | UW | RCP | RANGE 2 |
|---|---|---|---|---|---|---|
| No. of symbols | XX | 8 | 49 | 8 | 112 | 3-XX |

= 0/1/2/3

TABLE 2

4-ary Voice Channel Frame Structure

Forward Channel:

System frame = 45 ms (two slots of 22.5 ms)

| Slot no. | 0 | 2 |
|---|---|---|
| No. of symbols | 360 | 360 |

| Function | FILTER STARTUP | BIT SYNC PATTERN | CODE WORDS | VCF 0 | VCF 1 |
|---|---|---|---|---|---|
| No. of symbols | 8 | 18 | 6 | 164 | 164 |

TABLE 2-continued

Reverse Channel:

| Slot no. | 0 | 2 |
|---|---|---|
| No. of symbols | 360 | 360 |

(each slot 22.5 ms)

| Functions | FILTER STARTUP | BIT SYNC AGC | CODE WORDS | VCF 0 | VCF 1 |
|---|---|---|---|---|---|
| No. of symbols | 8 | 18 | 6 | 164 | 164 |

TABLE 3

16-ary Voice Channel Frame Structure

Forward Channel:

System frame = 45 ms (four slots of 11.25 ms)

| Slot no. | 0 | 1 | 2 | 3 |
|---|---|---|---|---|
| No. of symbols | 180 | 180 | 180 | 180 |

TABLE 3-continued

| FILTER STARTUP | BIT SYNC PATTERN | CODE WORDS | VCF 0 | VCF 1 | Function |
|---|---|---|---|---|---|
| 8 | 5 | 3 | 82 | 82 | No. of symbols |

Reverse Channel:

| ←11.25→ | ←11.25→ | ←11.25→ | ←11.25→ | ms |
|---|---|---|---|---|
| 2 | 3 | 0 | 1 | Slot no. |
| 180 | 180 | 180 | 180 | No. of symbols |

| FILTER STARTUP | BIT SYNC AGC | CODE WORDS | VCF 0 | VCF 1 | Function |
|---|---|---|---|---|---|
| 8 | 5 | 3 | 82 | 82 | No. of symbols |

TABLE 4

Mixed Modulation Frame Structure: 2/16-PSK and 4-PSK

Forward Channel:

| ←————System frame = 45 ms————→ | | | |
|---|---|---|---|
| ←11.25→ | ←11.25→ | ←22.5→ | ms |
| 0 | 1 | 2 | Slot no. |
| 2/16-PSK | 16-PSK | 4-PSK | Modulation type |
| 180 | 180 | 360 | No. of symbols |

Reverse Channel:

| ←22.5→ | ←11.25→ | ←11.25→ | ms |
|---|---|---|---|
| 2 | 0 | 1 | Slot no. |
| 4-PSK | 2/16-PSK | 16-PSK | Modulation type |
| 360 | 180 | 180 | No. of symbols |

For each slot symbol description refer to FIG. 2-1 through FIG. 6-3.

TABLE 5

Mixed Modulation: 4-PSK and 16-PSK

Forward Channel:

| ←22.5→ | ←11.25→ | ←11.25→ | ms |
|---|---|---|---|
| 0 | 2 | 3 | Slot no. |
| 4-PSK | 16-PSK | 16-PSK | Modulation type |
| 360 | 180 | 180 | No. of symbols |

Reverse Channel:

| ←11.25→ | ←11.25→ | ←22.5→ | ms |
|---|---|---|---|
| 2 | 3 | 0 | Slot no. |
| 16-PSK | 16-PSK | 4-PSK | Modulation type |
| 180 | 180 | 360 | No. of symbols |

Referring to Table 3, the structure of the 180 symbol 16-ary voice channel slot type is described. The first 8 symbols of this slot type are referred to as filter startup bits. The filter startup period, which is included at the beginning of every slot type, is a time in which no energy is transmitted, giving the receive section of the modem 19 time to purge its filters in preparation for the new slot.

Following the filter startup is a bit sync period. During this time, a degenerated 16-ary pattern is transmitted which simulates an alternating BPSK signal. The receive section of the modem 19 uses this field to establish the phase reference of the transmitter section of the modem 19.

Next, a twelve bit code word is used to determine synchronization between the subscriber and base station and to exchange control and status information. Code words are used to exchange the current state of the connection, link quality and power and timing adjustments. Each control word is encoded into ten bits using a Hamming code, which allows single error correction and double error detection. The CCU 18 determines the gain and loss of synchronization by tracking the number of consecutive code words received correctly or incorrectly; and the CCU 18 passes synchronization changes to the RPU 20 in the base station. In the subscriber station, the CCU 29 passes synchronization changes to the STU 27.

The Hamming code adds five parity bits to five bits of information to produce a ten bit code. Each parity bit is calculated by doing a modulo-two addition of all bits in positions within the code word which contain the bit represented by the parity bit. Though the code word is sent with all data bits contiguous, followed by all parity bits, by arranging the parity bits in positions within the word with just one bit on (the position represented by the bit) and placing the data bits in the other positions, the code can be visualized as follows:

| bit position: | 1 | 2 | 3 | 4 | 5 | 6 | 7 | 8 | 9 | 10 |
|---|---|---|---|---|---|---|---|---|---|---|
| info: | | P1 | P2 | D1 | P3 | D2 | D3 | D4 | P4 | D5 | P5 |

P = parity bit
D = data bit
P1 = D1 + D2 + D4 + D5
P2 = D1 + D3 + D4
P3 = D2 + D3 + D4
P4 = D5
P5 = overall When a code word is received, parity bits are calculated from the received data bits and compared with the received parity bits. If the calculated overall parity bit is different from the received overall bit, then the calculated parity bit is exclusive-or'd with the received bits to indicate the address of the bit in error. If the calculated and received overall bits are the same and the other four bits are not, two errors have been detected. If all parity bits are the same, the data has been received correctly.

The remainder of the slot contains two voice codec packets containing 328 bits of information each.

Table 2 shows the symbol structure for the 4-ary voice channel. The structure is very similar to that of the 16-ary voice channel. Differences exist because certain allocations of symbols are dependent on a fixed number of symbols required per slot for overhead purposes, where other bit allocations are made on a fixed number of bits.

The radio control channel (RCC) serves a dual purpose of providing a basis for the subscriber stations to initially acquire the system timing from the base station and to provide out-of-band signalling between the base station and the subscriber stations.

The format of the radio control channel slot is the same for the forward and reverse channels except for the following fields. The first eight symbols of a control slot transmitted by the base station (the forward channel) contains an amplitude modulation gap ("AM Hole") which is a period in which no energy is transmitted. This gap is used by the subscriber stations to uniquely identify the control channel. At the beginning and end of the reverse channel control slot, there are a few symbols extra in order to allow for the fact that the subscriber stations could be off in its timing by a few symbols.

All slots contain eight symbols of "null" transmission, the filter startup field, which enables the modem to purge its receive filters in order to prepare for the new slot. The next field of the slot is a fixed-bit sync pattern. The pattern transmitted is an alternating BPSK signal. The receive modem uses this field to establish a phase reference and frequency lock to the transmitting modem.

The CCU 18 constantly searches for a unique word (UW), which is an eight-symbol sequence, in order to identify an incoming RCC message. The base station CCU 18 must exhaustively check for a valid RCC message in every RCC slot. It performs this task by scanning for the unique word in a window of ±3 symbols about the nominal UW location, based upon master system timing. The search algorithm starts with the nominal UW position and shifts one symbol right and left until it (1) finds the UW pattern and (2) verifies a correct RCC checksum. The search terminates as soon as (1) and (2) are satisfied or all possibilities have been exhausted. The shift information, RCC message and power information are sent to the RPU 20 following a successful search.

The subscriber station CCU 29, when receiving RCC data, can be in one of two modes: frame search or monitor. The frame search mode is used to acquire receive frame timing from the incoming RCC data and is invoked automatically when RCC sync is lost. The monitor mode is entered whenever receive frame synchronization has been acquired.

When in the frame search mode, the subscriber station CCU 29 must exhaustively check for a valid RCC message immediately after an RCC slot is received at the subscriber station. Like the base station CCU 18, it 29 performs this task by scanning for the unique word in a window of ±3 symbols about the nominal UW location, based upon timing derived from modem AM hole detection. The search algorithm starts with the nominal UW position and shifts one symbol right and left until it (1) finds the UW pattern and (2) verifies a correct RCC checksum. The search terminates as soon as (1) and (2) are satisfied or all possibilities have been exhausted. The shift information from a successful search is used to adjust the CCU generated receive framing markers. Acquisition terminates when (1) and (2) above are satisfied for three consecutive frames with the UW in its nominal position. The STU 27 is informed of framing acquisition when it occurs. RCC messages are not forwarded to the STU 27 during the frame search mode.

When framing acquisition is accomplished, the subscriber station CCU 29 enters the monitor mode. Only the nominal UW position is checked to avoid the possibility of false UW acquisitions. If no UW is detected for five consecutive frames then the channel is declared out of sync and frame search mode is entered (this transition should be very unlikely or system performance is unacceptable). The STU 27 is informed of this out-of-sync condition. During the monitor mode, RCC messages that have a correct checksum and subscriber ID number (SIN) are passed on to the STU 27.

The rest of the slot is used to exchange information between the base station and the subscriber stations. The data section consists of twelve bytes. The first eight bits of data contain a link field which passes information regarding the status of the system, collision, detection and reservation information.

The purpose of the link level protocol is to detect erroneous messages on the radio control channel. The link protocol also resolves contentions on the RCC slot.

The link field includes "idle transmission", "system busy", "collision", "transmission detected", and "slot reservation" bits. These bits are set by the base station CCU 18 and read by the subscriber station CCU 29.

The idle transmission bit is set by the base station to indicate that an idle message has been transmitted. When a subscriber unit receives a slot with this bit set, it performs the usual synchronization and error checks, but does not pass the message on to the respective RPU 20 or STU 27 if the message was received without error.

The system busy bit indicates that all the voice channels are allocated and no new call requests should be attempted (for some fixed time).

The collision bit resolves contentions involving two or more subscriber stations attempting to transmit in the same control slot.

The transmission detected bit indicates that the base station has detected a transmission on the reverse control channel.

The slot reservation bit reserves the next slot on the reverse control channel.

The remainder of the data section is used for addressing and exchanging information during call set up and teardown procedures. Following the data section is a 16 bit cyclic redundancy check (CRC) over the unique word and data sections of the slot. The CRC is used to detect errors that occur during the transmission of the RCC messages. The CRC algorithm involves the division of a block of data by a predefined bit sequence and the transmission of the remainder of that division as a part of the data block. The polynomial to generate the CRC is the form of:

$$P(x) = 1 + x^5 + x^{12} + x^{16} \qquad \text{(Eq. 1)}$$

If the CRC does verify check on a message received, the message is not passed from the CCU 18 to the RPU 21 in the base station, or by the CCU 29 to the STU 27 in the subscriber station.

When a subscriber station first powers up and comes on-line, the subscriber station must acquire system timing and synchronization referenced from the base station. This acquisition is achieved via transmission exchanges on the radio control channel (RCC) and a refinement on the voice channel. The events that lead to system acquisition are as follows:

1. When power is first applied at the subscriber station, the system initializes and the subscriber station CCU 29 gives a series of commands to the demods of the subscriber station modems 30a, 30b, 30c which lead to the RCC acquisition.

2. The demod of each each modem 30a, 30b, 30c is first placed in its training mode. During this time, the modem trains its receiver digital filters for the characteristics of the receive analog filters. The analog filters may degrade due to time and temperature fluctuations. Each modem automatically adjusts its digital filter coefficients during the training mode to compensate for these degradations. After the CCU 29 receives the status from the demods of modems 30a, 30b, 30c that the training sequence is complete, the CCU sets the receive frequency to the default RCC frequency. The CCU then commands the modem to acquire the RCC frequency and to search for the RCC's characteristic amplitude modulation "gap", referred to as the AM hole. The AM hole is a period, 16 symbols in duration, when no energy is transmitted during the beginning of RCC transmission from the base station. All other transmitted slot-types involve only an eight symbol "null" transmission. The extra eight symbols of null information at the start of a slot burst uniquely identify that burst as the RCC.

3. The first action of the demods of modems 30a, 30b, 30c is to perform a coarse frequency acquisition. The received signal is processed in a digital phase-lock-loop and the subscriber VCXO is adjusted to the base station's transmit frequency. After frequency acquisition, the modem begins to search for the AM hole. The modem searches for a sequence of symbols with little or no amplitude. When this sequence is detected for a number of frames, the modem asserts an "AM strobe" signal to initialize the CCU frame timing circuit. If no AM hole sequence is detected, the modem returns status to the CCU that the RCC acquisition was unsuccessful. The CCU then begins to search out alternate RCC frequencies in the same manner.

4. After AM hole detection the demods of modems 30a, 30b, 30c perform refined frequency acquisition and initial bit sync adjustments. The first 60 symbols of the RCC control slot are a fixed bit sync pattern used by the modem to lock onto the base station's phase (bit timing). At this point the RX clock at the subscriber station is useful as a symbol clock.

5. The subscriber station CCU 29 has received a coarse symbol timing adjustment via the AM strobe from the modem. After frequency acquisition and bit sync the CCU examines data received by the modem and searches for the RCC unique word. This unique word gives the absolute symbol count reference for the frame. The CCU then adjusts its symbol counters to align the counters to this reference. The subscriber station is now aligned and locked on the base station transmission system timing (both frequency and symbol timing).

6. The remaining portion of system timing acquisition determines the range delay between the base and subscriber stations. This delay can range from 0 to 1.2 symbol times (one way) in the system. During a call set up, the subscriber station sends a message to the base station over the RCC.

7. The base station modem 19 is always searching for new subscribers bursting in. These bursts can be delayed from 0 to 3 symbol times from the base station master reference start of frame. During each slot, the demods of the base station modems 30a, 30b, 30c search for a transmission on the reverse RCC slot. All timing and phase information must be derived during the first part of the slot (preamble) else the slot and its information is lost. There are no second chances when receiving inbound control slots. The inbound control slots are received pursuant to Aloha queueing scheme on the RCC, which is described below, follow this itemization of the events that lead to system acquisition.

8. During each slot the base station modem 19 performs a fast AGC adjustment and bit timing estimation during the first 60 symbols of the slot. The receive section clock signals are adjusted to compensate for the subscriber station's ranging delay. The received data is then delivered to the base station CCU 18. The CCU 18 detects the location of the unique word in the stream and determines the integer range delay between base station and the subscriber station. The modem 19 delivers AGC information to the CCU 18 for the determination of the subscriber station TX power adjustments. The modem 19 also provides link quality and fractional time information to the CCU 18. Link quality is used to determine if a collision has occurred. A bad measurement of link quality indicates that the signal was not of good quality, most probably due to a simultaneous transmission by more than one subscriber on the RCC slot. The fractional time estimate is the value computed by the modem 19 of the fractional range delay between the base and subscriber stations.

9. This power and range delay information is processed by the CCU 18 and forwarded to the RPU 20. The RPU 20 formats this information into the RCC format and conveys this information to the subscriber station via the RCC control slot. The subscriber station CCU 18 decodes this information and make the required adjustments to the transmit power and range delay counters in both the modem 19 and the CCU 18. The CCU 18 updates its own integer TX symbol frame counter and updates the modem's TX clock fractional delay counters.

10. During the call connection for a subscriber station, the base station RPU 20 allocates the frequency and slot assignment for the voice call. This information is conveyed over the RCC and the subscriber station CCU 29 adjusts the RX frequency and commands the modem to begin detection of the voice slot. AGC, timing and frequency information are carried forward from the RCC operation to the voice channel operation. This is possible because all frequencies in the system are synchronized to the same frame timing reference in the base station.

11. In order to accurately set the subscriber station timing, a refinement procedure is implemented at the beginning of each voice connection. During the refinement phase, the communication over the voice channel is similar to the control channel, the modulation level is BPSK and the messages are in the RCC format, but no "AM" hole is generated at the base station; these new RCC messages are exchanged between the CCUs 18 and 29 only. The modem 19 is placed in the refinement mode at the base station and outbound control mode at the subscriber station. During refinement the subscriber station CCU 29 generates a message containing, for the most part, a fixed bit pattern along with a variable portion which indicates the acceptance or rejection of the previous message received from the base station. The base station modem 19 passes timing and power adjustments to the CCU 18 from each slot received. Power adjustments are sent to the subscriber station continually. Timing adjustments and control information, indicating the continuation or completion of the refinement mode, are sent out after a period of calculations. The base station CCU 18 collects the timing adjustments from the modem 19 for 30 frames, calculates a mean and then sends the adjustment to the subscriber station CCU 29. Then another 30 frame refinement operation is performed by the base station CCU 18, with the results again being sent to the subscriber station CCU 29. The refinement phase is terminated by the base station CCU 18, and the voice connection started, when the variance of the adjustments received from the modem 19 are within an acceptable range, such as 1%, or the refinement periods has taken a maximum amount of time.

During call set up and teardown, the subscriber stations communicate with the base station by sending messages over the reverse RCC slot. The traffic attributes of the subscriber stations trying to access the RCC can be characterized as stochastic in nature. When a subscriber station wishes to transmit a message to the base station, some form of control mechanism must arbitrate which subscriber station is allowed to transmit, since multiple subscriber stations could be trying to transmit in the same slot. The slotted Aloha scheme is well-suited to the context of a large population of subscribers requiring relatively infrequent random accesses on the RCC channel.

The slotted Aloha scheme allows subscriber stations to transmit messages in the designated RCC slot completely independent of whether other subscriber stations are also attempting to transmit in the same control slot. The natural consequence of this independence of action is that messages from different subscriber stations may be transmitted at the same time and therefore collide. To deal with collisions, this scheme requires that a positive acknowledgement (ACK) be sent by the base station following the correct receipt of the subscriber station's message. If the ACK is not received within the maximum allotted time required by transmission and processing delays in each direction (approximately 1–2 frame times), the subscriber station must retransmit the message. Retransmissions may be caused by an error in reception of the ACK at the subscriber station. In general, the subscriber stations cannot determine the cause of the problem. Thus, a random delay is selected by the subscriber stations prior to the retransmission of the message to avoid repeated collisions with other senders that may be involved in a previous collision.

A complication that arises in an Aloha scheme is the fact that the channel may become unstable if random retransmissions delays are not long enough. When this happens, the channel becomes clogged with retransmissions and throughput falls to zero. A backoff technique minimizes this problem by increasing each subscriber station's average randomized retransmission delay with successive retransmissions.

The implications of collision retransmissions and stability control for access delay are that the delays are typically geometrically distributed. To avoid large variance in delay, it is thus necessary to operate the channel at a utilization considerably less than 36%.

In particular, a utilization of 20% or less makes it unlikely that more than one retransmission will be necessary due to collisions. Using a random delay of, say, eight frame times for 45 msec frames, the total average delay with one retransmission is then 450 msec (i.e., on average the delay includes: one frame delay the original transmission, plus one frame delay for the acknowledgement, plus the eight frame random delay).

To ensure that utilization is not greater than 20%, we must consider the average time T between call requests per subscriber, the total number N of subscribers, and the frame time F for values less than 36%, the utilization is given by NF/T. For F=45 msec, N=1000 subscribers, and T=30 minutes, the utilization is 1.5%.

Thus for the 20% maximum utilization value, a population of 1000 subscribers each making a call on the average every half minute can be supported by a 45 ms frame time with access delays of about 45 ms when one retransmission is required, and an average access time of approximately 70–80 ms. The price paid for the much lower average delay is an increased delay variance, which for the 20% or less utilization should rarely exceed two retransmission times, i.e., one second.

The Aloha scheme approach appears well-suited to a system having a large population of subscribers requiring relatively infrequent random accesses on the control channel, and should allow the design goal of setup delays of less than one second to be achieved for the expected population parameters. In contrast, polling and fixed-TDMA techniques give unacceptable delays.

All phases of call processing including call establishment, call disconnection, and slot connection, require information exchange over the control channel and/or the control portion of the voice slot. The following describes the different phases of call processing in regards to both subscriber station processing and base station processing.

The subscriber station's subscriber identification number (SIN) and the dialed digits are two call control items that must be supplied in a CALL REQUEST message to the base station on every call made by a subscriber station. In the case of subscriber-station-to-subscriber-station calls, the user dials the number into a register in the subscriber station's memory. The user initiates the communication with the base station by pushing the send key or allowing a time-out. Only when the number is completely assembled and stored in the subscriber station is the radio channel used. Thus, the customer can dial at a slow rate without tying up valuable radio control channel (RCC) bandwidth or time.

The sequence of messages generated by the subscriber stations and the base station to establish a connection between two subscriber stations are shown in FIG. 4. The control channel link level protocol is used to check the various error conditions that arise due to channel errors. Further, messages that are received by the base station on the reverse control frequency are automatically acknowledged in the next control slot on the forward control frequency. The following paragraphs provide a brief description of a message exchange for call establishment between two subscriber stations.

When the base station receives a CALL REQUEST message on the control channel from a subscriber station A, it first checks the received SIN for errors. If the SIN is in error, the message is dropped. Without a valid SIN, the base station does not know who sent the message. If the dialed digits are incorrect or incomplete, the base station sends a CLEAR INDICATION message on the forward control channel frequency to the requesting subscriber station A with status information specifying the problem.

If the origination attempt is correct and allowed (i.e., the destination unit is not busy), the voice channel is allocated for the originating subscriber station A and the base station sends a PAGE in the form of an incoming-call message on the forward control frequency to destination subscriber station B. If the destination subscriber station B does not answer the PAGE with a CALL ACCEPTED message after two attempts or returns a busy condition indication via a CLEAR-REQUEST message, then the base station transmits a CLEAR-INDICATION message to the originating subscriber station A with status information of busy (i.e., destination unit off-hook) or that the destination subscriber station is not answering the page.

If the destination subscriber station B accepts the incoming call, then a CALL-ACCEPTED message is transmitted back to the base station and the voice channel is allocated. When voice channel synchronization is achieved, the destination subscriber station B generates an audible ring heard at the destination subscriber station B and also generates the RINGBACK tone over the voice channel to the originating subscriber station A.

When the destination subscriber station B goes off hook, the control portion of the voice slot changes from a sync-ring indication to a sync-offhook indication and CALL PROGRESS messages are provided over the voice channel via the base station between the two subscriber stations. The destination subscriber station B terminates the audible ring and disconnects the RINGBACK tone from the voice channel at this point. The circuit is now complete, and voice/data exchange can begin.

Placing a call to an external telephone is performed in the same manner as calling another subscriber station. The subscriber station merely dials the desired digits and presses the send button or waits for time-out. This generates a radio request message to the base station. The base station decides whether to page another subscriber station or to seize an external trunk line. In this case, an external trunk line is seized, and the dialed digits are out-pulsed on the trunk line. While the digits are being out-pulsed, the voice frequency for the originating subscriber station is allocated. When a subscriber station receives the CALL-CONNECT message, it changes frequency and synchronizes itself to the assigned voice channel. Once the voice channel is ready, the subscriber station handset is disconnected from local silence and connected to the external trunk line. From this point on, the destination Telco central office generates all the call progress tones.

An incoming external call seizes a trunk line into the base station. The originating central office sends in from 2 to 5 digits, identifying the unique digits of the destination subscriber station SIN, to the base station over the direct inward dialing (DID) trunk line. If the dialed subscriber station is not busy, the base station sends a PAGE MESSAGE over the RCC to the appropriate subscriber station. Three possible situations can occur. First, the subscriber station accepts the incoming call and processing proceeds as described below. Second, no response is received. In this case, the base station retries the paging process two times. If the base station exhausts the retry count without an answer from the subscriber unit, then a RINGBACK tone is generated in the originating unit. The third condition is a result of the subscriber station being busy dialing (i.e., off-hook) and returning a CLEAR-REQUEST message on the control channel. In this case, a busy tone is returned to the originating subscriber station.

In the case of a successful PAGE request, the voice channel is allocated, external ring is generated at the destination subscriber station's handset while an audible RINGBACK tone is generated back to the originating party, from the subscriber station. When the destination subscriber station answers the call (i.e., the base station detects an onhook to offhook transition), the external ring and the channel RINGBACK message are both removed. At this point, the voice channel is ready for a conversation.

A normal call termination is initiated by the subscriber going on-hook. The base station detects the offhook to onhook transition via the control portion of the voice channel. Upon detecting the transition, the base station deallocates the voice channel. The channel is not allowed to be used again until the base station sees the subscriber station lose synchronization on that channel. If the call being disconnected is to another subscriber station, an onhook indication is sent to the second subscriber station in the control portion of the voice channel. The subscriber stations resynchronize themselves to the RCC's transmissions and send CLEAR-REQUEST messages to the base station.

Termination of a call also takes place five seconds after the base station loses radio contact with a subscriber station.

A voice connection can be "lost" due to fading or channel interference at the destination receiver. The following conditions are checked at the subscriber stations and the base station to determine if the connection is experiencing problems: The link quality value returned from the subscriber or base station receiver is below a predetermined threshold for successive receptions; a loss of word synchronization has been detected for several successive transmissions.

Base station originated messages are broadcast to all active subscriber stations. These messages are transmitted by the base station over the radio control channel. The purpose of the broadcast message is to notify all active subscriber stations of changes in operation of the system (i.e., change in frequency of the RCC, or a command to the modems to go into self-test mode, etc.).

These messages are not acknowledged by the subscriber stations.

Remote-Control Processor Unit (RPU)

The RPU functions as the control computer within the base station architecture; it interfaces with the CCUs 18, which communicate with the radio equipment, and the PBX 15, as shown in FIG. 2.

The RPU 20 coordinates the necessary actions for radio call processing. The RPU 20 exchanges messages with the subscriber stations, the PBX 15 and the CCUs 15 in order to make connections and disconnections. Included in the call processing functions is the allocation and deallocation of the radio channels. The RPU 20 also maintains a database that reflects the current state of the system; the database contains information on the status of the equipment, subscriber stations, connections and the radio channels within the system.

Call establishment begins when the RPU receives a message either from the PBX call processor 24 for a call received from an external line, or from a subscriber, for a call destined for an external phone or another subscriber. Communication from a subscriber comes in over the radio control channel (RCC) via a base station CCU 18. The RPU 20 allocates a voice channel and exchanges messages with the subscriber station, the PBX 15 and the CCU 18 in order to establish the connection.

A disconnection begins by a message being received from the PBX 15 or a subscriber indicating that a phone was hung up or from the CCU 18 indicating that synchronization was lost over the radio channel. The RPU informs the CCU 18 and the PBX 15 of the disconnect and the RCC is deallocated.

The RPU software performs the following functions:
1. Processes subscriber, CCU and PBX messages which control call setup, call teardown and channel allocation;
2. Initializes and maintains a read/write system database;
3. Supports a system console which allows system queries and manual system control;
4. Handles the BCC interfaces by supporting the baseband control channel (BCC) communications protocol over a 9600 baud asynchronous serial interface;
5. Handles the PBX interface by supporting the PBX message protocol; and
6. Keeps a transaction log which supplies diagnostic and raw billing data.

The RPU software supports one serial interface to the PBX call processor 24. It also supports serial interfaces to each of the CCUs 18 in the base station configuration.

The RPU hardware includes a Motorola Model 68000 based general-purpose computer. This machine is configured with one Mbyte of random access memory (RAM) and 10 Mbytes of non-volatile hard disk storage. I/O consists of a system console and a unit which supports eight asynchronous serial data interfaces.

Figure 5:
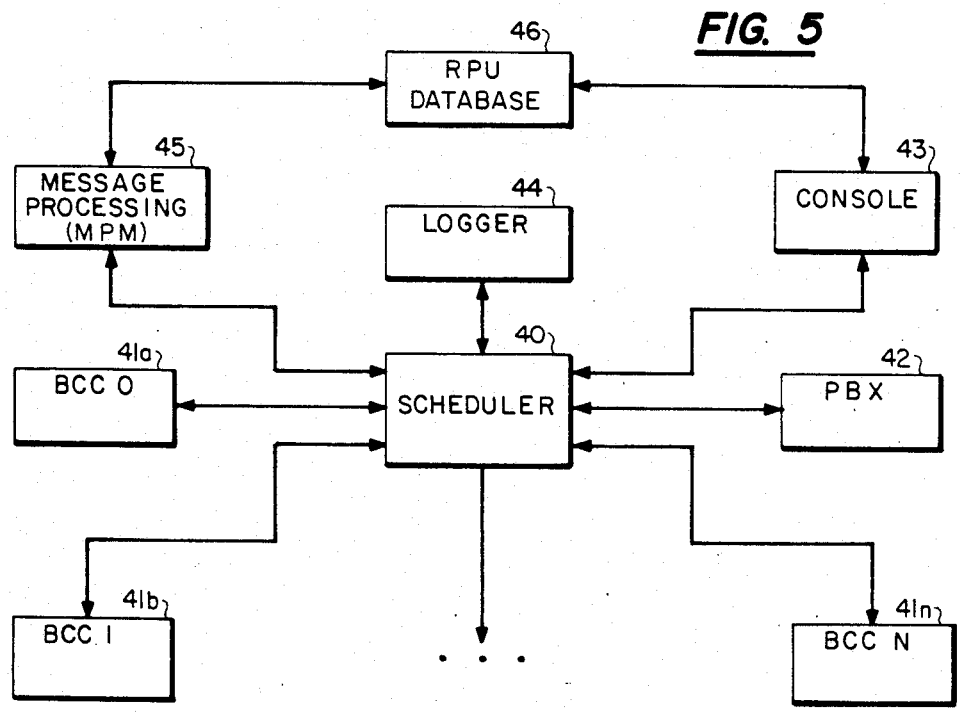
FIG. 5 illustrates various data processing modules implemented in the remote-control processor unit (RPU) in the base station of FIG. 2.

As shown in FIG. 5, the RPU software package simulates a system that includes a scheduler module 40, a BCC interface module(s) 41a, 41b, ... 41n, a PBX interface module 42, a console module 43, a logger module 44, a message processing module (MPM) 45, and a database module 46.

All modules, except the database module 46, are called to run from the scheduler module 40. The modules communicate with each other through a system of mailboxes. The database module 46 is based upon a collection of subroutines for accessing information in the database.

The scheduler module 40 provides mainline code for the RPU software. It is responsible for scheduling and activating all other modules. It also is responsible for maintaining event timers and mailboxes which allow intra- and inter-process communication.

The BCC interface modules 41a, ... 41n support a serial asynchronous interface and a link level protocol. They also monitor the state of communication with the CCUs 18.

The PBX interface module 42 supports a serial asynchronous interface to the PBX call processor 24.

The console module 43 provides a system operator interface which allows system status queries and modifications and message exchange between the RPU 20 and the rest of the system.

The logger module 44 provides raw transaction information for diagnostic and system analysis purposes.

The message processing module 46 processes all received RCC, BCC and PBX messages. It performs all subscriber call set up and tear down not performed by the PBX 15 and allocates the radio channels. It also includes a background task which monitors the state of the CCUs 18.

The database module 46 provides a consistent interface to all of the data structures required for call processing. It includes a frequency allocation task which assigns the radio channels.

The RPU database contains structure describing the system configuration including information on all subscribers and the state of all radio channels. These structures are described as follows:

The RPU database contains a baseband control channel (BCC) data structure for each CCU 18 in the system.

A subscriber identification table (SIN table) contains a sorted list of all valid subscribers. The list is sorted to facilitate subscriber validation. The SIN table has one entry for every subscriber in the system.

The RPU software performs a portion of the subscriber unit call processing. This processing is done in the message processing module. Call processing is accomplished by means of message exchanges between the MPM 45, the PBX module 42 and all of the BCC modules 41.

Initiating a Phone Call from a Subscriber Station

This section briefly describes the normal call setup procedure for a subscriber initiated phone call. A subscriber (the "originating subscriber") goes off-hook, dials a valid phone number (the phone number of the "destination") and presses the send button or waits for a time-out. The originating subscriber station sends a CALL REQUEST message over the control channel to the base station. The RPU BCC modules 41 receives the RADIO REQUEST message and forward it to the MPM 45. The MPM 45 performs some simple dialed digit validation and sends a RADIO REQUEST message to the PBX module 42 which forwards the message to the PBX control processor 24. The PBX call processor 24 validates the dialed digits and returns a PLACE CALL message to the RPU 20. The MPM 45 assigns a voice slot to the originating subscriber station. The MPM 45 generates a CHANGE CHANNEL command to the CCU 18 that contains the voice slot that the originating subscriber station is assigned to. The MPM 45 generates a CALL CONNECT command to the originating subscriber station, which command assigns the voice frequency and slot to the originating subscriber station. The MPM 45 generates an ALLOCATE message to the PBX call processor 24 which tells the PBX call processor 24 to allocate a message channel. At this point, the originating subscriber station is completely set up. It is now awaiting a connection through the PBX switch matrix 25 to the "destination". The "destination" can be either another subscriber station or a telephone that must be accessed over a Telco trunk line 14, it makes no difference.

Receiving a Call on a Subscriber Station

This section briefly discusses how an incoming call to a subscriber station is handled. The PBX call processor 24 determines that a phone call is destined for a subscriber station. The PBX call processor 24 generates an INCOMING CALL message. This message contains information about the nature of the incoming call, specifically whether the call is coming from an external trunk line 14 or from another subscriber station. The RPU PBX module 42 receives the PBX message from the PBX call processor 24 and forwards it to the MPM 45. If the call is coming from another subscriber station, the MPM 45 sets the subscriber-to-subscriber index of both the "originating" and "destination" subscriber stations and commands the CCUs involved 18 to go into internal mode. The MPM 45 generates a PAGE message to the subscriber station specified in the INCOMING CALL message. The proper subscriber station responds with a CALL ACCEPT message. The MPM 45 responds to the CALL ACCEPT message by generating a CHANGE CHANNEL message to the appropriate CCU 18 and a CALL CONNECT message to the appropriate subscriber station. The MPM 45 then generates an ALLOCATE message to the PBX call processor 24 which causes the PBX switch matrix 25 to make the final connection for the incoming call.

Drop Out Recovery

This section briefly describes the RPU 20 response to a channel fade while a conversation is in progress. The CCU 18 handling the voice channel which fades sees the channel lose synchronization. The CCU 18 generates a NO-SYNC event message. The BCC module 41 receives the event message and forwards it to the MPM 45. The MPM 45 sends an ONHOOK message to the PBX call processor 24 and sets the subscriber to the idle state and the channel to the on-hook state.

Processing an Incoming BCC Message

A BCC message is passed via a 9600 baud asynchronous interface from the CCU 18 to the RPU 20. The BCC module 41 which handles that particular CCU interface reads in the message and checks the link-level information bits to verify the integrity of the incoming message. If the BCC module 41 determines that the message is acceptable, an appropriate acknowledgement is returned to the sending CCU 18. Otherwise a retry or negative-acknowledgement is returned. The BCC module 41 now sends the message to the MPM 45. This message is placed in the message processing mailbox 48 utilizing the mailboxes provided by the scheduler module 40. (See FIG. 6.)

If there is no more input from the CCU 18, and the BCC mailbox 49 containing output messages to the CCU is empty, the BCC module 41 "blocks", and control passes to the scheduler module 40.

The scheduler module 40 activates the next module in the round-robin schedule, and this module runs until it blocks. The scheduler module then activates another, and so on. At some later point, the scheduler module activates the MPM 45.

Figure 6:
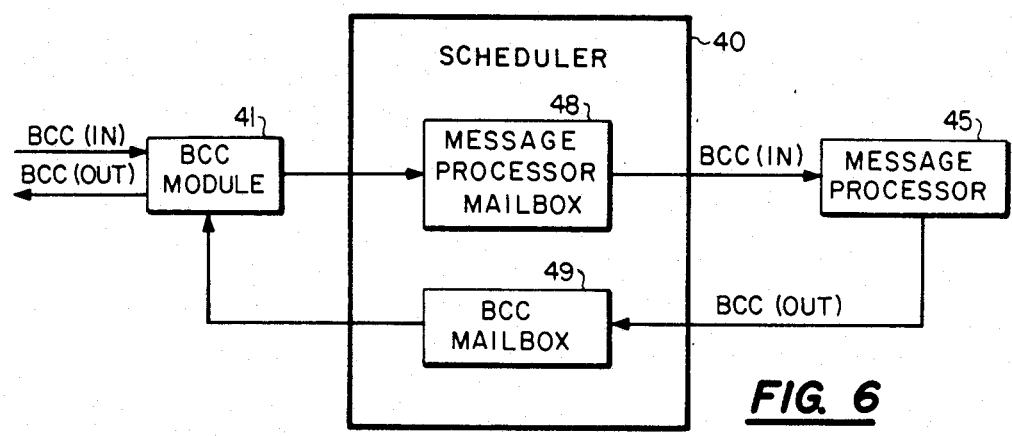
FIG. 6 illustrates the processing of incoming and outgoing BCC messages by the RPU in the base station of FIG. 2.

The MPM 45 then reads in the BCC message, along with any other messages that have been queued up for it in its mailbox 48. The BCC message is identified and processed. Such processing may include changes to the database and the generation of new messages. FIG. 6 illustrates the data path of an incoming message.

Generating an Outgoing BCC Message

FIG. 6 also illustrates the data path of an outgoing BCC message. An outgoing BCC message is generated by the MPM 45 in response to some particular event. The message is constructed within the MPM 45 and is mailed to the BCC module 41 which handles the destination CCU 18. After this message, and any other necessary messages are sent, and if there are not more messages in the MPM's mailbox 48, the MPM "blocks", and control is returned to the scheduler module.

The BCC module reads the message from its mailbox 49 and adds the appropriate link level bits to the outgoing message. It then transmits the message out the serial data port to the CCU 18.

Processing RCC Messages

An incoming RCC message is handled exactly like an incoming BCC message since an RCC message is a type of BCC message. Also, an outgoing RCC message is created and transmitted in the same way as an outgoing BCC message.

Processing an Incoming PBX Message

Figure 7:
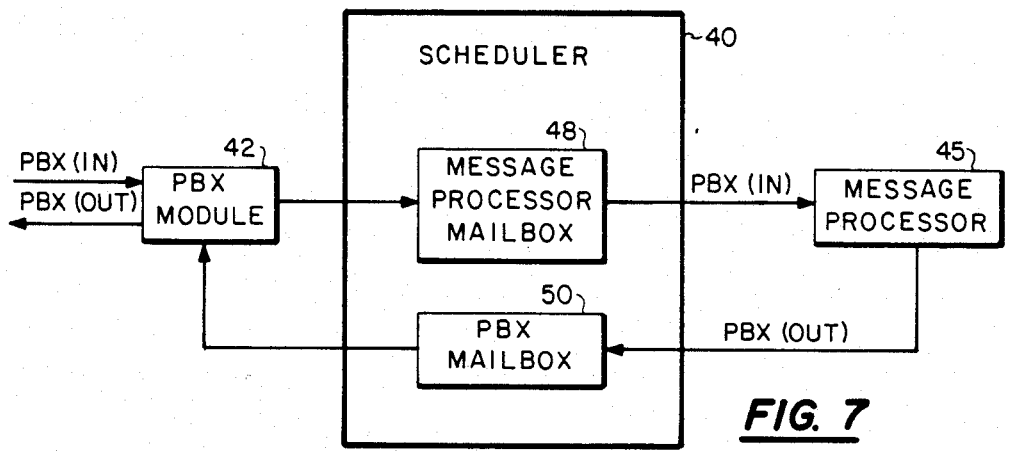
FIG. 7 illustrates the processing of incoming and outgoing PBX messages by the RPU in the base station of FIG. 2.

A PBX message is received from the PBX call processor 24. This message is passes via a 9600 baud asynchronous interface to the RPU 20. Referring to FIG. 7, the RPU PBX module 42 reads in the PBX message and sends it to the MPM mailbox 48. When there are no more incoming characters and the PBX mailbox 50 containing outgoing PBX messages is empty, the RPU PBX module 42 "blocks", and control is passed back to the scheduler module 40.

The MPM 45 reads in the PBX message, along with any other messages that have been queued up for it in its mailbox 48. The PBX message is processed based on the type of the message and the current state of the subscriber specified in the message. Processing may include changes to the database, changes in the subscriber state and the generation of new messages. FIG. 7 illustrates the data path of the incoming PBX message.

Generating an Outgoing PBX Message

Referring again to FIG. 7, an outgoing PBX message is generated by the MPM 45 in response to an event. The message is constructed within the MPM 45 and is mailed to the PBX module 42. After this message, and any other necessary messages are sent, and if there are no more messages in the MPM mailbox 48, the MPM 45 "blocks", and control is returned to the scheduler module 40.

The scheduler module 40 continues to activate other modules in the round-robin schedule until the RPU PBX module 42 is activated.

The RPU PBX module 42 reads the PBX message from its mailbox 50 and then transmits the message out the serial data port to the PBX call processor 24.

Generating Logger Messages

Figure 8:
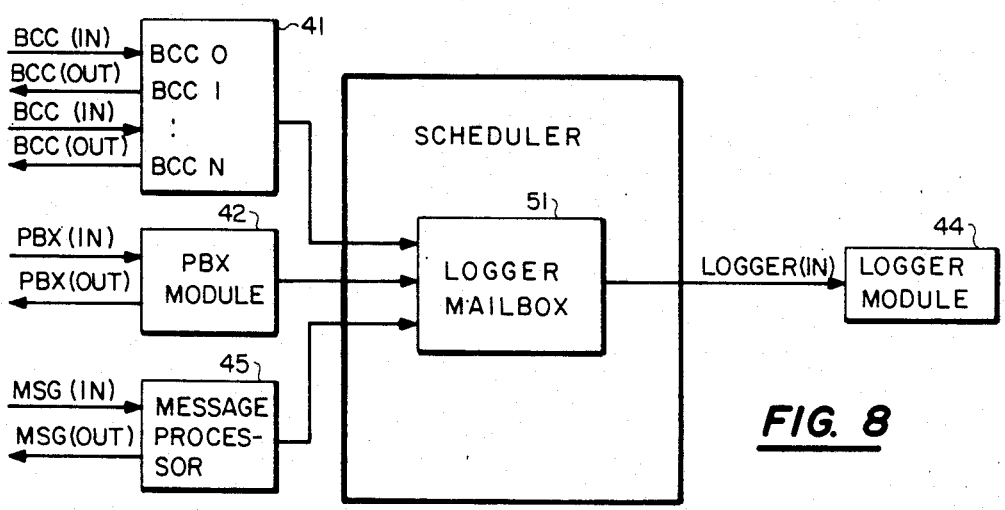
FIG. 8 illustrates the processing of logger messages by the RPU in the base station of FIG. 2.

At relevant points in each of the modules in the RPU software package, a message containing pertinent information is mailed to the logger module 44. This information is time stamped and output to a file. FIG. 8 illustrates the logger data paths.

Console Input/Output Module

The console module 43 input section provides command prompting and recognition along with command validation. Valid console commands have the capability to query and update the RPU database and send messages to RPU modules. The output resulting from console display commands will be output directly to the console port.

Scheduler Module

The scheduler module 40 is considered to be a special system module and is responsible for scheduling all the other RPU modules. The main responsibilities of the scheduler module 40 are to select the next module to be executed and to provide inter- and intra-module communication.

Figure 9:
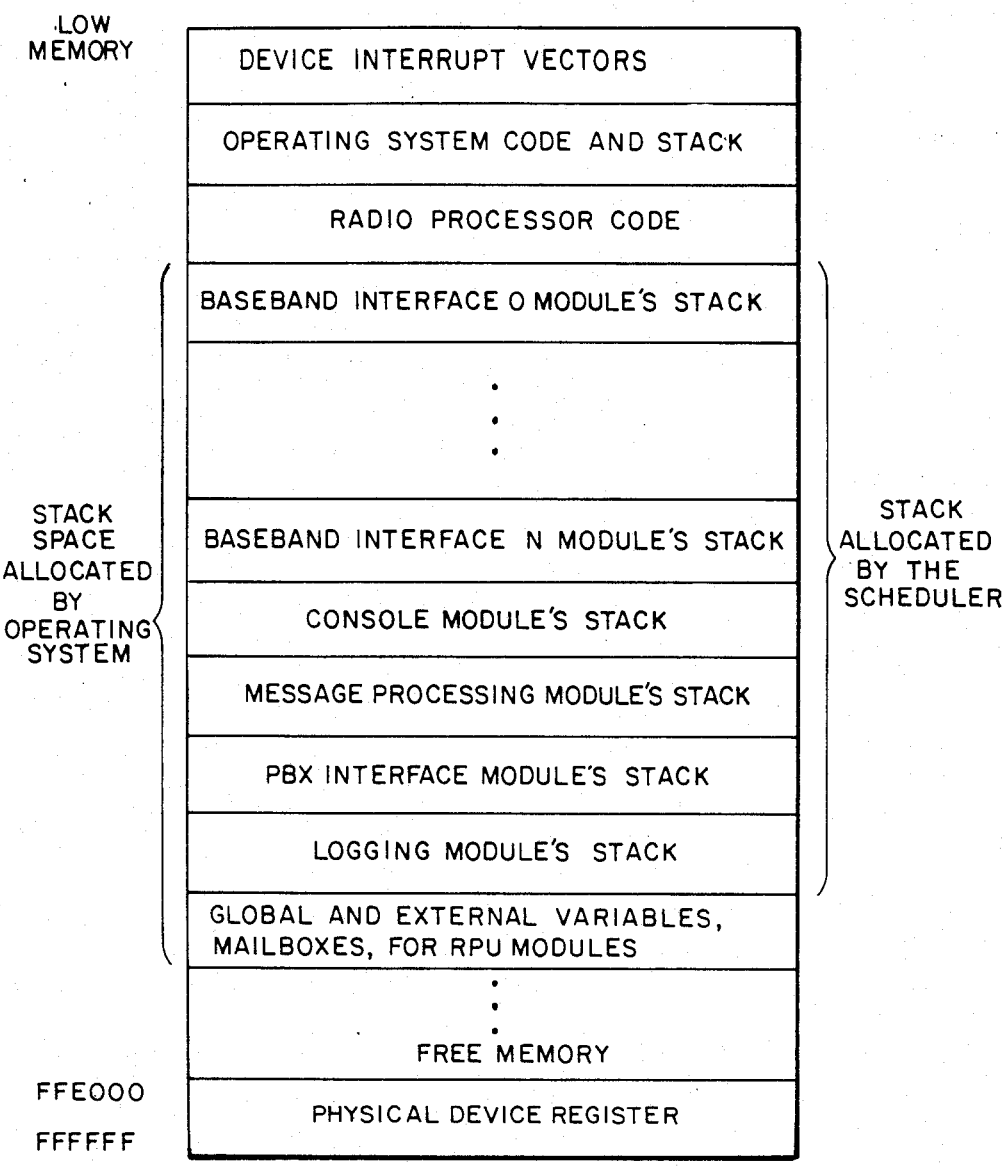
FIG. 9 illustrates a memory map of the RPU in the base station of FIG. 2.

Although all the various RPU modules can be thought of as separate modules, in reality, all the modules are one application process of a Regulus operating system. It is the scheduler module 40 which performs the round-robin dispatching of the other RPU modules. the scheduler module 40 manages the stack for each of the pseudo RPU modules by allocating a fixed part of stack space to each of the pseudo modules at startup time. Then just before each module is scheduled to run, the stack pointer is changed by the scheduler module 40 to point to the appropriate stack address for the proper module. A memory map of the RPU 20 is shown in FIG. 9.

Each RPU module runs until it blocks. When a module blocks, it returns control back to the scheduler which allows another module to be scheduled and run. A module can block in several ways: by calling GETEVENT() which forces the module to block until an event is pending, or by calling WAIT() which blocks for a certain number of seconds, or by calling BLOCK() which blocks for one tour of the round-robin scheduling loop.

Another major function that the scheduler module 40 performs is inter-module communication between modules. Mailboxes are used as the means for sending or receiving messages to or from other modules. Each module can check for mail in its mailbox by using the MAILREAD() call. Likewise, a module can send mail to another module by using the MAILSEND() call. The scheduler module maintains a separate mailbox for each of the modules that are in the scheduling loop. When one module sends a message to another module, the message is copied into the destination's mailbox. Later, when it is the destination's turn to run, the scheduler module checks its mailbox to determine whether there is a message in the mailbox. If so, the scheduler module 40 generates an event of type MAIL which forces the module to be unblocked, if blocked by a GETEVENT(), and thus scheduled to run.

An event list is also maintained by the scheduler module for each module in the scheduling loop. Events can consist of mail or timer events. Mail events are generated whenever the scheduler module determines that messages are pending for the currently running module. A module can put a timer event on the event list by calling PUTEVENT() with the number of seconds to wait before an event is to be generated. The scheduler module 40 checks the module's event list each tour through the round-robin scheduling loop searching for timer expirations. When a timer expiration is detected, the appropriate module is scheduled to run and the event is returned to the module through the GETEVENT() call.

The scheduler module 40 contains routines that are used to initialize RS-232 interfaces between the CCU 18 and the RPU 20 and between the PBX 15 and the RPU 20. These routines, which take exclusive software control over the RS-232 interfaces, turn off the usual processing of control sequences by the Regulus operating system. Other routines are used to flush the I/O buffers and to read and write terminal input and output. The scheduler module 40 also keeps track of the system time for all the RPU modules.

BCC Interface Module

Each BCC module 41 provides an interface between a CCU 18 and the other software modules in the RPU 20. The messages exchanged between the CCU 18 and the RPU 20 consists of variable length binary data which are transmitted over an asynchronous communication link. The BCC module 41 is responsible for providing message integrity over the communications link which includes error detection, message sequencing and message acknowledgements.

The hardware interface between the CCU 18 and the RPU 20 consists of a 9600 baud RS-232 asynchronous interface.

Inputs to this module 41 include messages received from the CCU or from other RPU software modules. Messages are output from this module to either the CCU via the RS-232 interface or to other RPU software modules via the proper mailbox.

The purpose of this module 41 is to process message traffic between the RPU 20 and the CCU 18. This module 41 continually checks for messages received from the CCU 18 and routes them to the proper RPU software module. Likewise, this module is continually checking for messages from other RPU software modules that are destined for a CCU 18. An alternating bit protocol is utilized to limit outstanding messages (i.e., unacknowledged) to one in each direction. Sequence and acknowledgement bits serve as the necessary flow control to accomplish this function. The protocol is described in greater detail in the following paragraphs.

In the following discussion, one entity that can process messages is labelled "we" or "us", and the other is labelled "they" or "them". The protocol can be explained by indicating the actions to be taken when a message is received. There are only four basic actions, which depend on two conditions. These conditions are determined by comparing the sequence and acknowledgement bits of the received message with those expected.

On an arriving message, the ACK bit is as expected if it is the same as the SEQ bit of our last transmitted message. Similarly, the SEQ bit is as expected if it differs from the SEQ bit of the last received message. In other words, the expected conditions are that an incoming message acknowledges our last message and we also expect each new arrival to be a new message.

The actions taken upon receiving a message are now summarized under four combinations generated by the above conditions:

1. ACK as expected; SEQ as expected. Mark our last transmitted message as being acknowledged (enabling us to transmit a new message). Process the newly arrived message (acknowledge it in the next message we send).

2. ACK as expected; SEQ not as expected. Mark our last transmitted message as being acknowledged (enabling us to transmit a new message). Discard the newly arrived message (do not acknowledge it).

3. ACK not as expected; SEQ as expected. If we have transmitted a message that has not been acked yet, resend it. If we do not have such a message then something has gone wrong at the destination and we should Reset as described below. Process the newly arrived message.

4. ACK not as expected; SEQ not as expected. Our last message has not been received at the destination. Retransmit it. Discard the newly arrived message.

The Reset bit is used to reset the SEQ and ACK bits. When we receive a message with the Reset bit on, it should be accepted as a new message regardless of its SEQ bit, and it should be acknowledged. Furthermore, the ACK bit on the received message reflects the SEQ bit of the last message that they received from us. We should toggle this bit before sending the next message. As an example, if we receive a message whose ACK/SEQ digit is "4" (Reset=1, ACK=0, SEQ=0), then the ACK/SEQ digit on the response should be "1" (Reset-0, ACK=0, SEQ=1). Either side may reset when it thinks that the protocol has gotten out of step.

When we receive a message from them, and have no new message pending or a standard reply is not soon forthcoming, we will acknowledge the message by sending a special ACK message. The ACK bit will acknowledge the received message, but the SEQ bit will not change from the last message we sent. This will cause them to process the acknowledgement and to discard the newly arrived message. The content of this message is a null message. However, as this message is discarded anyway, the content of this message should be irrelevant.

PBX Interface Module

The PBX module 42 provides the interface between the UTX-250 PBX call processor 24 and the other software modules of the RPU 20. The messages exchanged between the two machines are to consist of an ASCII character oriented message exchange. The ASCII character is defined here to be 7 or 8-bit ASCII. Both the PBX call processor 24 and the RPU 20 must be capable of accepting characters with odd, even or no parity. The text of the messages consist of variable length strings or printable characters.

The hardware interface between the PBX call processor 24 and the RPU 20 consists of a 9600 baud RS-232 asynchronous interface.

Inputs to the PBX module 42 include messages received from the PBX call processor 24 or from other RPU software modules. Messages are output from this module to either the PBX call processor 24 or to other RPU software modules via the proper mailbox.

The purpose of the PBX module 42 is to process message traffic between the RPU 20 and the PBX call processor 24. This module continually checks for messages received from the PBX call processor 24 and routes them to the proper RPU software module. Likewise, this module is continually checking for messages from other RPU software modules that are destined for the PBX call processor 24.

Every character that is received from the PBX call processor 24 is checked for equality with the greater-than character > which indicates the beginning of a message or a carriage return character which indicates the end of a message. This module is capable of handling full-duplex message traffic.

Console Module

The console module 43 is the operator's window into the current state of the RPU 20. The console provides capability to display information regarding the current state of the subscribers and the radio channels, modify connection and channel states and send messages to the PBX 15 and the CCUs 18. The console processes the input stream from the terminal and executes the desired command.

The console module 43 provides the interface to the base station operator's terminal. The console module 43 processes the input from the terminal and executes the command. Data is retrieved from and written into the database, displays are output to the terminal screen and messages are sent to other modules. The interfaces for this module include:

(1) Characters are input from the operator's keyboard.
(2) Characters are output to the operator's screen.
(3) Data is retrieved from and written into the database.
(4) Messages are sent to the PBX, BCC and message processing modules.

A set of parser routines input characters from the operator's keyboard. A data entry prompt is displayed at the beginning of each command line, the data is buffered, the editing characters processed, the input echoed to the display and the data delimited into tokens. By providing the parser with a set of data structures describing all possible commands and valid tokens within each commmand, the parser performs recognition on the data entered, responds to question marks and displays guide words for data entry. Each token is checked that it is the type of data expected; keywords are matched with the list of acceptable entires and numbers are converted to integers. Once the command line entry is complete further verification takes place; numbers are checked to be within range and with some commands the state of the system is checked before the command is executed.

Commands break into three categories: (1) commands that display information from the database, (2) commands that modify the database and (3) commands that send messages. Information can be displayed on subscriber, connection, CCU and channel status. All display commands require information to be retrieved from the database and formatted data output to the operator's display. The modification commands include the ability to force a subscriber's connection on a particular channel and the ability to enable and disable channels. The modification commands are used in testing the frequency allocation algorithm. All modification commands write into the database.

PBX, BCC and RCC messages can be sent from the console module 43 to various other modules in the system. A SENDMSG commands prompt the operator for all information needed for the message, the message is formatted and forwarded to the indicated module. PBX messages are sent to the RPU PBX module 42 which sends the message out to the PBX call processor 42. BCC and RCC messages can be sent from the RPU 20 to the CCUs 18 via the BCC modules 41, which add the link level protocol bits to the outgoing messages. Input from the CCUs 18 is simulated and messages, including both BCC and RCC messages, are forwarded to the MPM 46.

Logger Module

The logger module 44 is responsible for logging RPU events or messages. The logger module 44 maintains the following three disk files: a transaction log with information similar to billing information, an error log consisting of error messages, and a message log which consists of system warning messages.

The logger module 44 consists of a set of subroutines which are called from the other RPU modules. Each subroutine is responsible for time stamping the message and writing the message to the proper disk file. Each subroutine has a global flag which determines whether messages are to be logged or not. The global flags are set and reset by using console commands.

Message Processing Module (MPM)

The MPM 45 performs the high-level call processing functions between the PBX 15 and the subscriber stations. It is responsible for call processing functions such as initiating pages, allocating voice channels and controlling call progress tones for both subscriber and external telephones. The MPM 45 also processes status messages that it receives from the CCUs 18. For example, channel status information consisting of link quality or subscriber hook status is processed by the MPM 45.

The MPM 45 is organized as a state machine where PBX and BCC messages are tokens to the message processing state machine. The MPM 45 processes the tokens by updating the database, outputting the necessary responses and then transitioning to the next state.

The MPM 45 uses the system mailboxes, which are maintained by the scheduling module 40, to receive and transmit messages to and from other RPU modules. Also, the MPM 45 utilizes subroutines in the database module to retrieve or update state information in the database.

As previously described, the MPM 45 is organized as a state machine. Tokens, which force some processing to be performed, consists of messages, or timeouts. The MPM 45 determines the type of token (i.e., timer, RCC message, PBX message, etc.) and the subscriber station or channel that is affected by the token. The MPM 45 processes the token by generating the proper message responses and transitioning to the next state.

Figure 10:
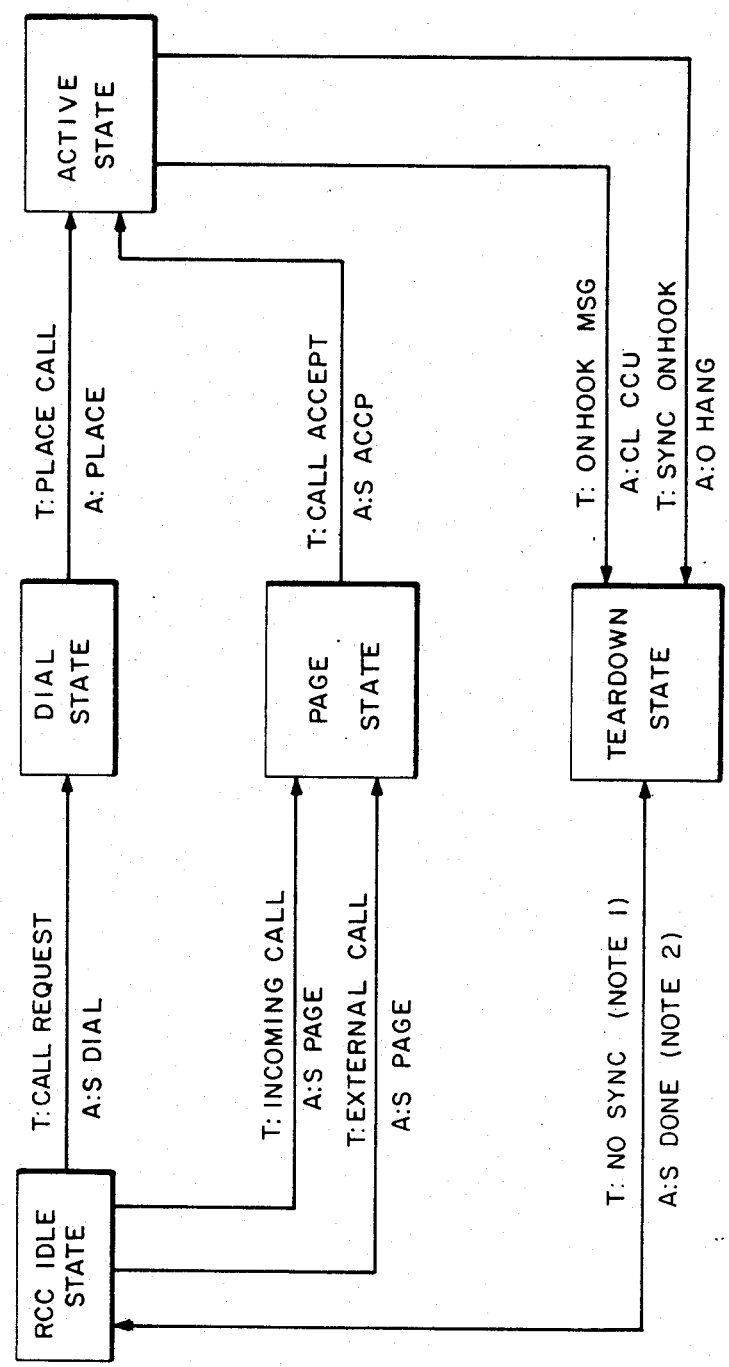
FIG. 10 illustrates the processing of messages relating to the RCC state by the message processing module (MPM) shown in FIG. 5.
Figure 11:
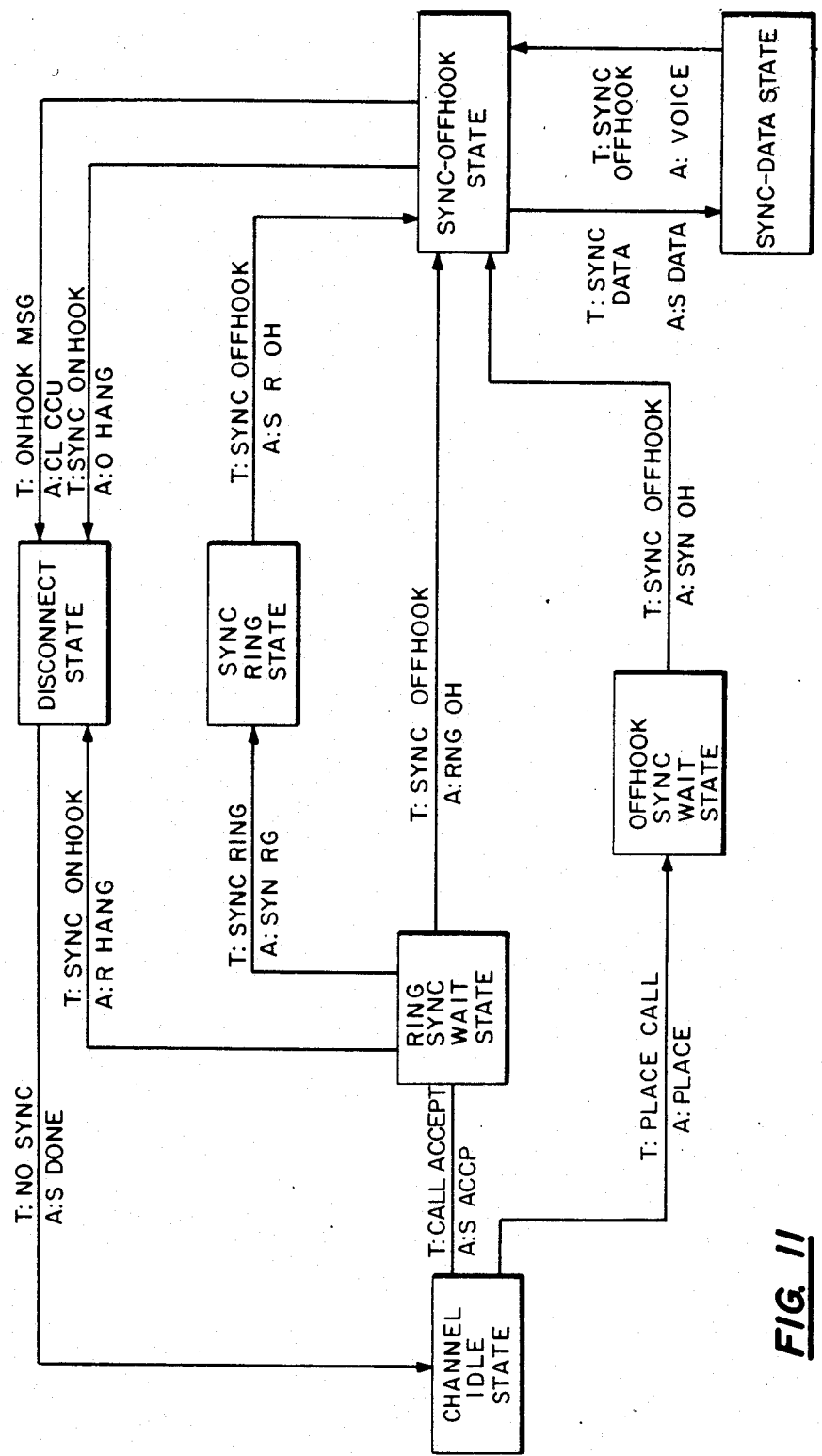
FIG. 11 illustrates the processing of messages relating to the channel state by the message processing MPM shown in FIG. 5.

The MPM 45 actually consists of two states tables. The RCC state machine, which is shown in FIG. 10, is used to process messages from the PBX call processor 24 or RCC messages from a subscriber station. The channel state machine, which is shown in FIG. 11, is used to process messages received from a CCU 18.

Initially, all subscribers are in the RCC idle state and all channels are in the channel idle state which indicates that no connections are set up or in progress.

The changes of state for a typical external to subscriber call are as follows. An external call message is received from the PBX call processor 24, which message includes the phone number of the destination subscriber station of the call. A PAGE message is sent out to the subscriber station and the state of the subscriber station is set to PAGE. When a CALL ACCEPT message is received from the subscriber station, the state of the subscriber station is set to ACTIVE. At this point, a channel is assigned, and the PBX call processor 24, CCU 18 and the subscriber station are informed of the channel assignment. The channel is placed into the RING SYNC-WAIT state (FIG. 11). When the CCU 18 indicates that synchronization has been acquired, the channel state is set to SYNC RING. Finally, when the CCU 18 indicates that the subscriber has gone offhook, the channel is set to the SYNC OFFHOOK state. The SYNC OFFHOOK state indicates that a voice connection is established.

A subscriber-to-subscriber call begins with a CALL REQUEST message being received from the originating subscriber station. The originating subscriber station is placed into the DIAL state and a RADIO REQUEST message is sent to the PBX call processor 24. The PBX call processor 24 then returns a PLACE CALL message for the originating subscriber station and an INCOMING CALL message for the destination subscriber station. In response to the PLACE CALL message, a channel is allocated, the PBX call processor 24, the CCU 18 and originating subscriber station are informed of the assignment. The channel state of the originating subscriber is set to OFFHOOK SYNC WAIT until the channel goes into synchronization. When the base station CCU 18 detects the transmission from the originating subscriber, it generates a SYNC OFFHOOK channel event message. The RPU 20 processes the channel event message by changing the state of the channel to the SYNC OFFHOOK state. An incoming call message for the destination subscriber station is processed in the same manner as the external call message as described above. In addition, the channels involved in the connection are set to internal mode once both subscribers are in synchronization.

A disconnection begins when one of the parties involved in a connection goes ONHOOK. When a phone that is external to the system is hung up, an ONHOOK message is received by the MPM 45 from the PBX call processor 24. When a subscriber goes ONHOOK, the CCU 18 sends a message which indicates that the subscriber station is ONHOOK. In either case, the other party is informed of the disconnect, the channel is placed into the DISCONNECT state and the subscriber station is placed into the TEARDOWN state. When the CCU 18 indicates that synchronization has been lost, the channel and the subscriber station are placed back into the idle states.

Background Tasks

A background task routine is implemented by the MPM 45. The background task initially communicates with the CCUs 18 after a cold or warm restart. Also, once the system is operation, the background task monitors the CCUs 18 in order to keep the database current and a RCC assigned.

BCC messages, generated by both the CCUs 18 and by the BCC modules 41, are received from the BCC modules 41. Messages are sent to the CCUs 18 via the BCC modules 41.

Data is written into and retrieved from the database.

Initially, all CCUs 18 are sent BASEBAND QUERY messages in order for the RPU 20 to determine the current state of the system. All information received from baseband event or response messages is stored in the RPU database. When the RPU 20 receives a baseband event message, which indicates that a CCU 18 is ready and not reset (i.e., the CCU 18 has not just powered up), the frequency assigned to the CCU 20 is marked as allocated. The CCU 18 is then sent CHANNEL QUERY messages in order to update the database to the current state of the system. CCU initialization is complete once each CCU 18 has either responded to all outstanding query messages or it is determined that the CCU 18 is down. At this time, each CCU 18 that indicated it was ready and reset (i.e., the CCU had just powered up) is assigned a frequency. If no control channel has been assigned to a CCU 18, then the RPU 20 attempts to assign the control channel. The first choice is to assign the control channel to the CCU 18 on the first frequency, since this is where the subscriber first looks for the RCC. The next choice is any CCU 18 with slot 0 not in use and the last choice is a CCU 18 with a connection on slot 0. If all the operational CCUs 18 already have a connection on slot 0, then one of the connections on slot 0 is terminated and the control channel is assigned to that slot.

Once the RPU 20 has communicated with all the CCUs 18, the state of the CCUs 18 is monitored via status messages received from the CCUs 18 or the BCC modules 41. The BCC modules 41 are continually monitoring the communication path to each CCU 18. A CCU 18 is considered out of operation when a baseband event message is received indicating that the CCU 18 is not ready. At this time, the CCU 18 is marked as not ready in the database. Further, all connections are torn down, all channels are returned to the default state and the frequency assigned to the CCU 18 is deallocated. If the CCU 18 contained the control channel, then a new control channel is assigned.

When a baseband event message is received, which indicates that a CCU 18 is ready and reset, the CCU 18 is assigned a frequency. If no control channel is currently assigned to a CCU 18, then slot 0 of the reset CCU is assigned the control channel.

If a baseband event message is received, which indicates that a CCU 18 had lost communication with the RPU 20, then CHANNEL QUERY messages (i.e., one for each of the four channels) are sent to the CCU 18 to update the RPU database with the current state of each of the CCU's channels. As a response to each CHANNEL QUERY message is received, the current channel state and connection information is updated in the database. If a channel is in the SYNC WAIT state, then it is assumed that the subscriber is no longer involved in the connection and the connection is torn down.

Initially, the CCUs 18 are queried from the RPU 20 for their initial states. The CCUs 18 also send in event messages whenever they power up or change state. The exchange of messages keeps the RPU database up to date with the current state of the system.

Database Module

The database module 46 contains the database interface routines necessary for database access. They provide a concise single-thread interface into the database for any module requiring access to the information within. The bulk of the access routines are concerned with the SIN table and the BCC Table. Access to all fields within these tables is provided by the access routines.

The database module is also responsible for database initialization at start-up. All significant fields are initialized to appropriate values by the initialization portion of the database module.

The database module also provides the following:
(1) Routines to support TTY initialization;
(2) A binary search routine for subscriber searches in the SIN table;
(3) Routines and tables to support frequency-to-CCU mapping;
(4) Control of diagnostic display information; and
(5) Frequency Allocation.

The database module 46 is a collection of routines which allow controlled access to the database by other modules. By channelling all accesses through the database routines, the database is essentially hidden from outside modules. This allows the database to change without requiring modifications to any of the other modules. When the database changes, only the interface routine to the changed portion of the database needs to be changed.

Frequency Allocation Task

The frequency allocation task performed by the RPU 20 selects an appropriate frequency and slot for a subscriber station that requires a voice channel. The selection algorithm takes into consideration call type (i.e., internal or external) and modulation level (i.e., 16-ary or 4-ary). Although the frequency allocation task is functionally independent from the database module 46, it is closely tied to the data structures within the database. Because of this fact, this function is described separately from the database module, even though it is technically a routine within the database module 46.

The frequency allocation task is used by the MPM during call setup. It makes extensive use of the data structures within the database module.

All frequency allocation requests fall within one of two categories. The first is the external-source category and the second is the internal-destination category. The internal-destination category covers the incoming part (i.e., destination) of an internal call. The external-source category covers all other cases which includes external calls whether they are incoming or outgoing or the origination of an internal call.

Input into the frequency allocation task consists of an index into the SIN table of the subscriber station requesting a channel and the index into the SIN table of the originating subscriber station. The index of the originating subscriber station is only valid when the channel is being set up for an internal-destination call. At all other times, the originating subscriber index is a predefined illegal index defines as DB NULL. These indexes provide access to all the information required to allocate an appropriate channel (i.e., frequency and slot).

The frequency allocation routine returns a value of TRUE if a frequency-slot combination is successfully allocated. It returns FALSE otherwise. If allocated, the frequency and slot selected are put into the SIN table for the subscriber station requesting the frequency assignment.

Each frequency is divided into four TDM slots. The RPU database maintains a count of how many slots are available in each position. When an allocation request falls within the external-source category, a slot is selected from the slot position with the greatest vacancy count. Once a slot position is selected, the first frequency with that slot available is selected. Actually, it doesn't matter which slot is selected when a request falls within this category. However, this technique tends to distribute the system load evenly across all slots and, more importantly, it increases the probability of optimal slot assignments for both parties of an internal call. This is true because system timing ±0 calculations have shown that the optimal slot assignment for a subscriber-to-subscriber call is to have the base station's transmit slot for each subscriber in the same slot on different frequencies. By assigning the originator of a subscriber-to-subscriber call to the most available slot position, the probability is greater than when the time comes, the destination subscriber station will be able to allocate that same slot position on another frequency. For example, if position No. 2 is the most available position then it is selected. When the destination subscriber station's allocation request is processed, it is more probable that another slot in position No. 2 is available to be selected, thus allowing the optimal slot-to-slot assignment to occur.

When an allocation request falls within the internal-destination category, the slot to be assigned is chosen from a selection table. A selection table contains lists, ordered from the most to the least desirable slot position assignments for the destination subscriber. This ordering is based on the slot assignment of the originating subscriber. Up to this point, modulation type has not been mentioned. This is because the basic allocation rules do not change for 4-ary and 16-ary slot selections, except for one important exception. That is, only slot 0 or slot 2 may be allocated for a 4-ary type connection. Because of this exception, and due to the fact that the two subscribers could be set to different modulation types, a total of four unique selection tables are required in order to cover all possible call combinations. They are as follows:

TABLE 6

| Originating slot | 1st choice* | 2nd choice | 3rd choice | 4th choice |
| --- | --- | --- | --- | --- |
| slot 0 | 0 | 1 | 3 | 2 |
| slot 1 | 1 | 0 | 2 | 3 |
| slot 2 | 2 | 1 | 3 | 0 |
| slot 3 | 3 | 0 | 2 | 1 |
| rating → | (1) | (2a) | (2b) | (3) |

16-ary (destination) from 16-ary (originator) internal call preferred slot selection table Note that each column of every table has a rating associated with it. This rating indicates the desirability of a particular slot. The most desirable slot will have a rating of 1, and less desirable slots will have ratings of 2, 3, etc. If two or more columns of a selection table have equal desirability, they will have the same rating number followed by an alphabetical character. For example, if three columns are rated 2a, 2b and 2c respectively, all three of these columns have an equal desirability, and their ordering (a, b, c) is arbitrary.

TABLE 7

| Originating slot | 1st choice | 2nd choice | 3rd choice | 4th choice |
| --- | --- | --- | --- | --- |
| slot 0 | 0 | 1 | 2 | 3 |
| slot 2 | 2 | 3 | 0 | 1 |
| rating → | (1a) | (1b) | (2a) | (2b) |

16-ary (destination) from 4-ary (originator) internal call preferred slot selection table

TABLE 8

| Originating slot | 1st choice | 2nd choice |
| --- | --- | --- |
| slot 0 | 0 | 2 |
| slot 1 | 0 | 2 |
| slot 2 | 2 | 0 |
| slot 3 | 2 | 0 |
| rating → | (1) | (2) |

4-ary (destination) from 16-ary (originator) internal call preferred slot table

TABLE 9

| Originating slot | 1st choice | 2nd choice |
| --- | --- | --- |
| slot 0 | 0 | 2 |
| slot 2 | 2 | 0 |
| rating → | (1) | (2) |

4-ary (destination) from 4-ary (originator) internal call preferred slot selection table The frequency allocation task has two inputs. These inputs provide access to crucial information required for proper frequency and slot selection.

The first input is the index into the SIN table for the subscriber station requesting a channel. With this index, frequency allocation can determine the default modulation type of the requesting subscriber. It also tells the routine where to put the results of its selection algorithms (i.e., the frequency and slot numbers).

The second input to the frequency allocation task indicates the category of the frequency-slot request. The value of the second input is either an index into the SIN table, or it is the previously defined illegal value DB NULL. If a valid index is received, the frequency allocation request is identified as the destination side of a subscriber-to-subscriber call and the selection tables should be utilized. If DB NULL is received, the request is considered to fall into the external-source category and the "most available slot position" algorithm is utilized.

The frequency allocation task returns TRUE if a frequency-slot combination is successfully allocated, otherwise it returns FALSE. It also causes one desirable side effect. If allocation is successful, the baseband index and slot fields of the SIN table are filled in for the requesting subscriber.

The frequency allocation algorithm can be broken down into two stages. The first stage, called the classification stage, determines the category of the allocation request. The second stage, called the selection stage, finds and allocates a frequency-slot combination using the appropriate algorithm as determined by the allocation request category.

The classification stage first determines if an automatic frequency selection is to occur. If the requesting subscriber has been put into manual mode, the specified manual-modulation-level, manual-frequency and manual-slot values specify the frequency-slot-modulation to be allocated. If the frequency-slot specified is available, they are assigned to the requesting subscriber. If the frequency-slot specified is not available, the routine exits returning a FALSE value. If the requesting subscriber has been put into automatic mode, further classification is required.

After determining that an automatic selection is to occur, the frequency allocation algorithm determines the request category. These request categories are as follows: "External-In" applies when a destination subscriber station is called from an external phone; "External-out" applies when an originating subscriber station calls an external phone; "Internal-out" applies when an originating subscriber station calls another subscriber station; "Internal-in" applies when a destination subscriber station is called from another subscriber station. If the request is an external-in, external-out or internal-out, a slot position is selected by searching for the most available position. Once the position is selected, all frequencies are sequentially searched until a vacant slot (or adjacent slot pair in the case of 4-ary request) of the desired position is found. At this point, the routine puts the appropriate values into the SIN table and exits, returning a value of TRUE. If the request falls into the final category (internal-in), further information is required.

When an internal-in type request is made, two further bits of information are required. The slot assignment and the modulation type (4-ary or 16-ary) of the originating subscriber must be extracted. Once this is accomplished, the appropriate selection table is determined based on the modulation type of the originating subscriber and the destination subscriber. After the table has been selected, the slot assignment of the originating subscriber is used to determine the appropriate row of the selection table to use. Each sequential element of the selected row contains an equally or less desirable slot assignment. This list is traversed until an available slot is found, beginning with the most desirable position and continuing until all slot positions have been exhausted. For each slot position (or slot pair for 4-ary connections), each frequency is sequentially searched until the actual slot (or slot pair) is found. The derived frequency and slot values are not entered into the appropriate SIN table entries, and the routine exits, returning a value of TRUE.

A "slot count" array keeps track of the number of available slots for each slot position. These counts are maintained by the database module and are referenced by the frequency allocation task.

The SIN table contains pertinent information on each of the subscribers recognized by the system. The following accesses are made to the SIN Table.

modulation-level (read): The modulation level of the subscriber requesting a frequency is extracted from this table along with the modulation level of the originating subscriber during internal-call setup.

slot-number (read): The slot assignment of the originating subscriber in an internal-call setup must be retrieved.

slot-number (write): The slot assignment of the subscriber requesting a channel is put here.

baseband-index (write): The frequency assignment of the subscriber requesting a channel is put here.

The BCC table is used by the frequency allocation routines search for an available frequency-slot combination. The following accesses are made to the BCC table:

channel-state (read): The state of a channel is checked to determine availability.

channel-status (read): The channel status is checked to verify that the specified channel is a voice channel.

channel-state (write): The channel state is changed when the specified channel is selected for allocation.

channel-control (write): The modulation type of the requesting subscriber is written into the channel control byte.

SIN-index (write): Establishes a link from the selected channel to the requesting subscriber.

The frequency allocation routines directly access the database. This is necessary due to speed and efficiency considerations. Whenever possible, the database interface routines are used to access the database from the frequency allocation routines.

Subscriber Telephone Interface Unit (STU)

Figure 12:
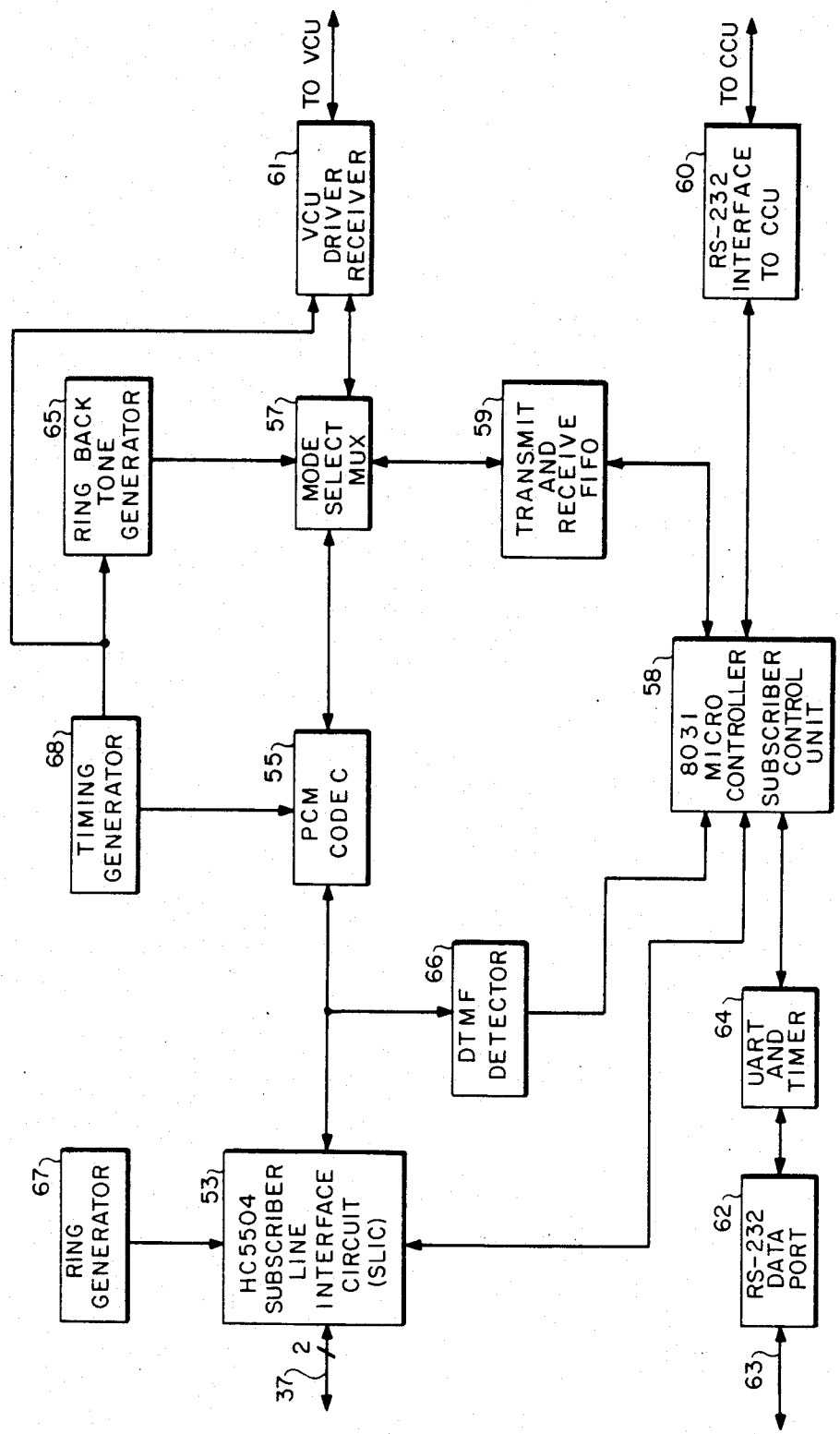
FIG. 12 is a block diagram of the subscriber terminal interface unit (STU) in the subscriber station of FIG. 3.

In its basic mode of operation the STU acts as an interface unit to convert the 2-wire analog signal interfaced from a standard telephone set to 64 Kbps PCM encoded digital samples. Referring to FIG. 12, the STU includes a subscriber line interface circuit (SLIC) 53 which connects directly to a type-500 touch-tone phone set via lines 37. The SLIC 53 provides proper voltage and impedance characteristics for phone operation. In addition, the SLIC 53 allows a "ring" current to be applied to the phone set and also performs "on-hook/off-hook" detection. The signal outputs of the SLIC 53 on line 54 are analog voice-frequency (VF) transmit and receive signals. These are subsequently converted to PCM samples by a PCM codec 55. The PCM codec 55 uses the $\mu$-255 companding algorithm to digitize the voice signals into 8-bit samples at an 8 KHz rate. The PCM codec 55 is full-duplex in nature. The digitized voice samples are then fed over line 56 to a "mode select" multiplexer (MUX) 57. The mode of operation the MUX is determined by the subscriber controller unit SCU 58 which interfaces with the MUX 57 by a transmit and receive FIFO 59. The SCU 58 essentially includes a Model 803 microcontroller. The SCU is coupled to the CCU 29. Through an RS-232 interface circuit 60 and further controls the operation of the SLIC 53.

The STU can essentially operate in one of three distinct modes. The first, and most basic, mode is the voice mode. In this mode, voice samples from the PCM codec 55 are transferred through the mode select MUX 57 and a VCU driver/receiver circuit 61 to the VCU 28, where they are further processed to reduce the bit rate from 64 Kbps to 14.6 Kbps and then sent on for transmission to the base station.

The second mode of operation is the data mode. In this mode the 64 Kbps stream to/from the VCU 28 does not involve voice information; rather, the information conveyed to the base station is a reformatted data stream from an external data source at a rate of up to the 14.6 Kbps channel data transmission rate. The STU also includes a RS-232 data port 62 to allow the connection of a data device (e.g., terminal) via a line 63 using a standard asynchronous RS-232 interface operating up to 9600 baud. The STU includes an UART and timer circuit 64 to synchronize the data from the RS-232 data port 62. The VCU 28 packetizes the synchronized data so that it will pass through the 14.6 Kbps limitation of the channel. Full-duplex data transmission is supported in this mode.

The third STU mode is the call setup mode. In this mode, no data is conveyed from the STU 27 to the VCU 28 through the mode select MUX 57. However, a ringback tone generator circuit 65 is connected to the mode select MUX 57. This circuit digitally synthesizes the tones used in call placement procedures, such as busy and error tones. During call placement, DTMF digits dialed by the user are detected by a DTMF detector circuit 66 and processed by the SCU 58 to place the call. The ringback tone generator circuit 65 returns appropriate tones to the user's head set. A ring generator 67 is connected to the SLIC 53. A timing generator 68 provides timing signals to the PCM codec 55, the VCU driver receiver circuit 61 and the ringback tone generator 65. Once the call placement is complete, the STU will switch to either the voice mode or the data mode for communications with the base station.

An additional requirement of the STU is to provide for cancellation of undesired echo signals from the remote connections. The delay of the round trip for the voice signals between base station and the subscriber station will be well over 100 msec. Any reflected signal due to impedance mismatch at either end will result in an obnoxious echo return. This problem is handled in the base station by an echo cancellation system in the PBX function. The STU must provide the echo cancellation in the subscriber station. At least 40 dB of echo attenuation is expected to be required from this cancellation. The delay of the echo to be cancelled is very small, however, since the reflection-of-interest is between the SLIC 53 in the STU and the local phone set itself. This distance will typically be only a few tens of feet and the delay is essentially zero.

The 8031 micropro controller in the SCU 58 performs the functions of the RPU 20 and PBX call processor 24 in the base station. It communicates to the base station RPU 20 via messages sent on the radio control channel (RCC) and controls all the individual functions of the STU 27. The SCTU also communicates to the subscriber station CCU 29 via the baseband control channel (BCC). The RS-232 interface to the CCU 29 operates at 9600 baud and is used to convey control information between the CCU 29 and STU 27 in the subscriber station.

Voice Codec Unit (VCU)

The voice codec unit (VCU) implements four full-duplex RELP voice compression systems. The VCU design is identical for the base station and the subscriber stations. In the subscriber station only one-fourth of the overall functionality is used (that is, only one of the four channels). The interface to the STU 27 in the subscriber station is identical to the interface used by each of the four PBX channels in the base station VCU 17 interface. The VCU 17, 28 uses an entirely digital scheme to implement the RELP voice algorithm, as described in co-pending U.S. patent application Ser. No. 667,446 entitled "RELP Vocoder Implemented in Digital Signal Processors", filed Nov. 2, 1984 by Philip J. Wilson, the disclosure of which is incorporated herein by reference. Alternatively, a sub-band codec may be used. The processed data is provided to the CCU 18, 29 on a common parallel bus interface which is controlled by the CCU software. The CCU 18, 29 sends the VCU 17, 28 control signals to determine the mode of operation and configuration in the VCU 18, 29. The modes of operation, functional description and implementation considerations associated with the VCU 17, 28 are described below.

Figure 14:
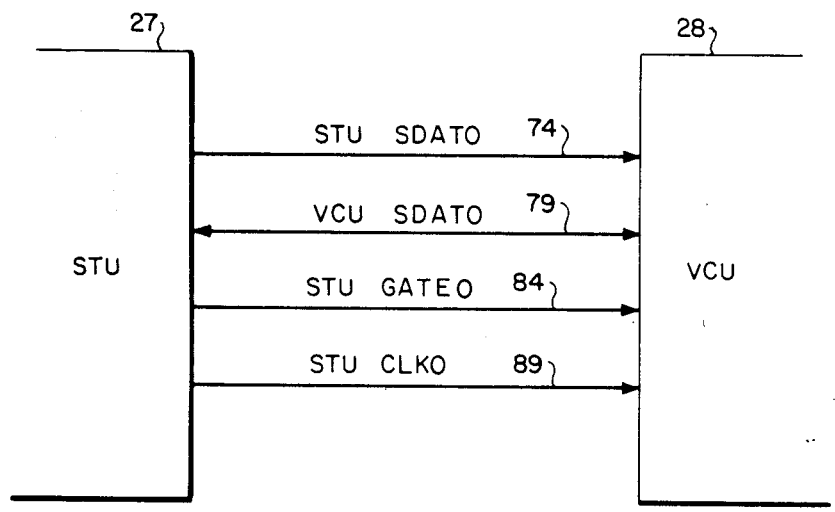
FIG. 14 (on sheet 1) shows the signal interface between the STU and the VCU in the subscriber station of FIG. 2.
Figure 15:
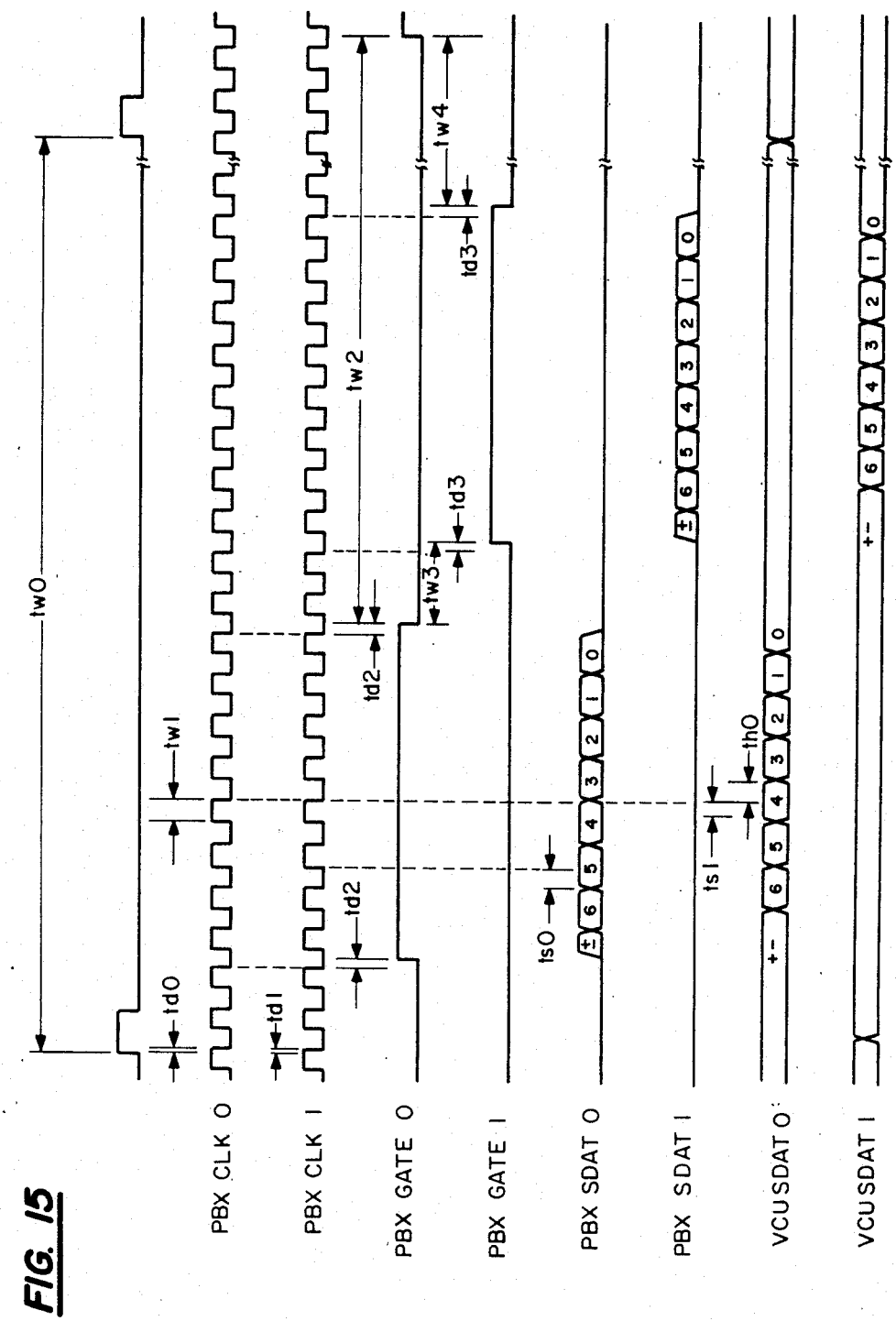
FIG. 15 shows the timing relationships for the PBX-VCU interface signals shown in FIG. 13 and for the STU-VCU interface signals shown in FIG. 14.

The interfaces between the PBX 15 and the VCU 17 are shown in FIG. 13. The interfaces between the STU 27 and the VCU 28 are shown in FIG. 14. The STU 27 interfaces are a subset of the PBX 15 interfaces in that the STU 27 provides only one full duplex voice channel operation. The timing relationships for the PBX and STU interfaces are identical and are shown in FIG. 15. Table 10 describes the characteristics represented by the symbols used in FIG. 15.

TABLE 10

| Symbol | Parameter | Min | Typ | Max | Unit |
|---|---|---|---|---|---|
| tw0 | PBX frame width | — | 125 | — | μs |
| tw1 | clock pulse width | 1.8 | 2.0 | 2.2 | μs |
| tw2 | gate 0 inactive width | — | 93.75 | — | μs |
| tw3 | gate 0 inactive - gate 1 width | 5.9 | 7.8 | 9.7 | μs |
| tw4 | gate 1 inactive - gate 0 width | 52.8 | 54.7 | 56.6 | μs |
| td0 | start pulse - clock 0 delay | 0 | 250 | −800 | ns |
| td1 | start pulse - clock 1 delay | 0 | 250 | −800 | ns |
| td2 | clock 0 - gate 0 edge delay | 100 | 1000 | 2000 | ns |
| td3 | clock 1 - gate 1 edge delay | 100 | 1000 | 2000 | ns |
| ts0 | input data setup time | 20 | 1500 | — | ns |
| ts1 | output data setup time | 500 | 1800 | — | ns |
| th0 | output data hold time | 500 | 2200 | — | ns |

Referring to FIG. 13, the PBX SDAT0, 1, 2 and 3 lines 70, 71, 72, 73 carry data signals from the PBX 15 to the VCU 17 in the base station. In the subscriber station the data signal is carried on the STU SDAT0 line 74 from the STU 27 to the VCU 28 (FIG. 14). 8-bit μ-255 companded serial data is sent to the voice codec during the active portion of the PBX/STU GATE0 or PBX GATE1 . . . 3 at a clock rate of 256 KHz. Data is clocked into the VCU 17, 28 on the rising edge of the 256 KHz clock.

The VCU SDAT0 1, 2 and 3 lines 75, 76, 77, 78 carry data signals from the VCU to the PBX 15 in the base station. The VCU SDATO line 29 carries data from the VCU 28 to the STU 27 in the subscriber station. 8-bit μ-255 companded serial data is sent to the PBX 15 or STU 27 from the voice codec during the active high portion of PBX/STU GATE0 or PBX GATE1 . . . 3 at a 256 KHz clock rate. Data is clocked out of the VCU 17, 28 on the rising edge of the 256 KHz clock.

The PBX GATE0, 1, 2 and 3 lines 80, 81, 82, 83, carry gate signals from the PBX 15 to the VCU 17 in the base station. The STU GATE0 line 84 carries a gate signal from the STU 27 to the VCU 28 in the subscriber station. The gate signal is an active high signal used to enable transfer of PBX/STU SDAT0, PBX SDAT1 . . . 3 and VCU SDAT0 . . . 3. This gate signal is active for eight consecutive clock periods every 125 microsecond.

The PBX CLK0, 1, 2 and 3 lines 85, 86, 87, 88 carry 256 KHz clock signals from the PBX 15 to the VCU 17 in the base station. The STU CLK0 line 89 carries a 256 KHz clock signal from the STU 27 to the VCU 28 in the subscriber station. A 256 KHz clock signal is used to clock the PBX/STU SDAT0 and PBX SDAT1 . . . 3 signals into the VCU 17, 28 and the VCU SDAT0 . . . 3 signal into the PBX 15 or STU 27. However, the clocks are not synchronized with any clocks generated within the VCU 17, 18, CCU 18, 29 or modem 19, 30.

In the base station, the PBX-VCU interface converts four channels of synchronous 64 Kbps serial data into 8-bit parallel data, which is then made available to the four transmit voice codecs 16 at an 8 KHz sampling rate. In the subscriber station, only one channel (channel 0) is converted by the STU-VCU interface. The necessary clocks and gates are provided by the PBX 15 and the STU 27.

The PBX-VCU and STU-VCU interfaces also perform the complementary function for the receive voice codecs. In the base station, 8-bit parallel data, received from the four codec channels, is converted into four 64

Kbps synchronous serial channels for transmission back to the PBX 15. In the subscriber station, one voice channel is converted and sent back to the STU 27.

Figure 17:
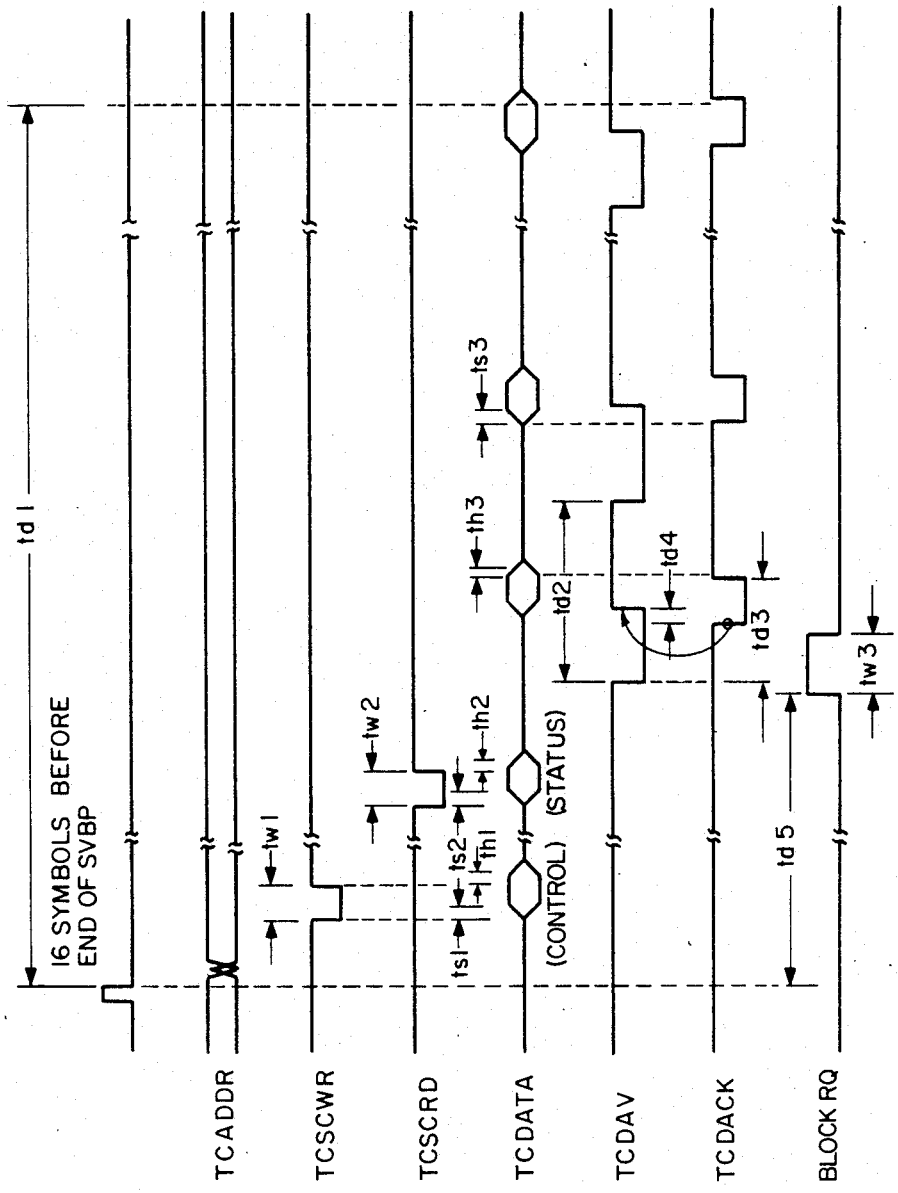
FIG. 17 shows the timing relationship for the transmit channel signals of the VCU-CCU signal interface shown in FIG. 16.
Figure 18:
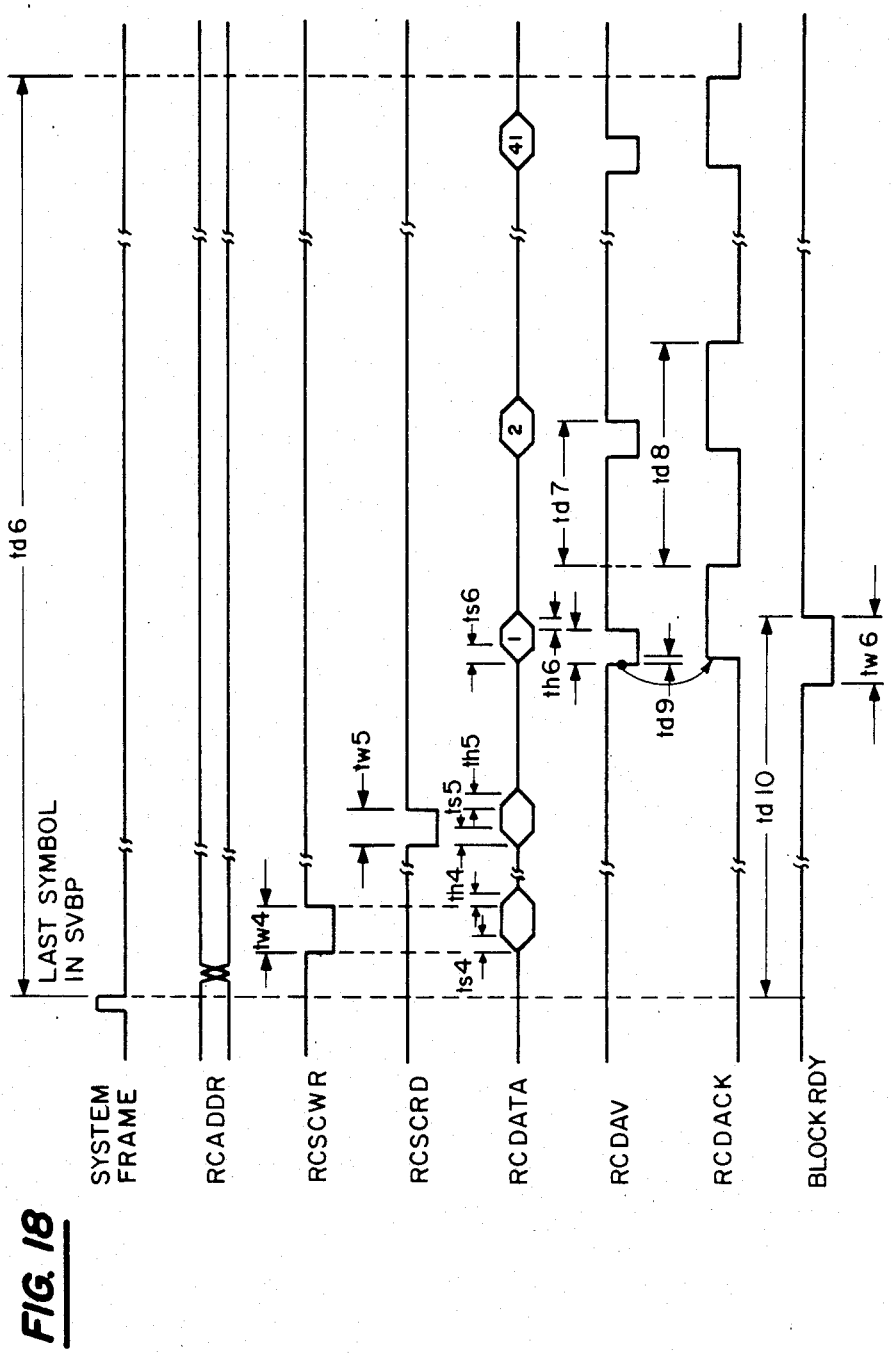
FIG. 18 shows the timing relationship for the receive channel signals of the VCU-CCU signal interface shown in FIG. 16.

The hardware interfaces between the VCU 17, 28 and the CCU 18, 29 are shown in FIG. 16. The timing relationships for the transmit and receive channels between the VCU and the CCU are shown in FIGS. 17 and 18 respectfully. Tables 11 and 12 describe the characteristics represented by the symbols used in FIGS. 17 and 18 respectively.

Figures 19A, 19B:
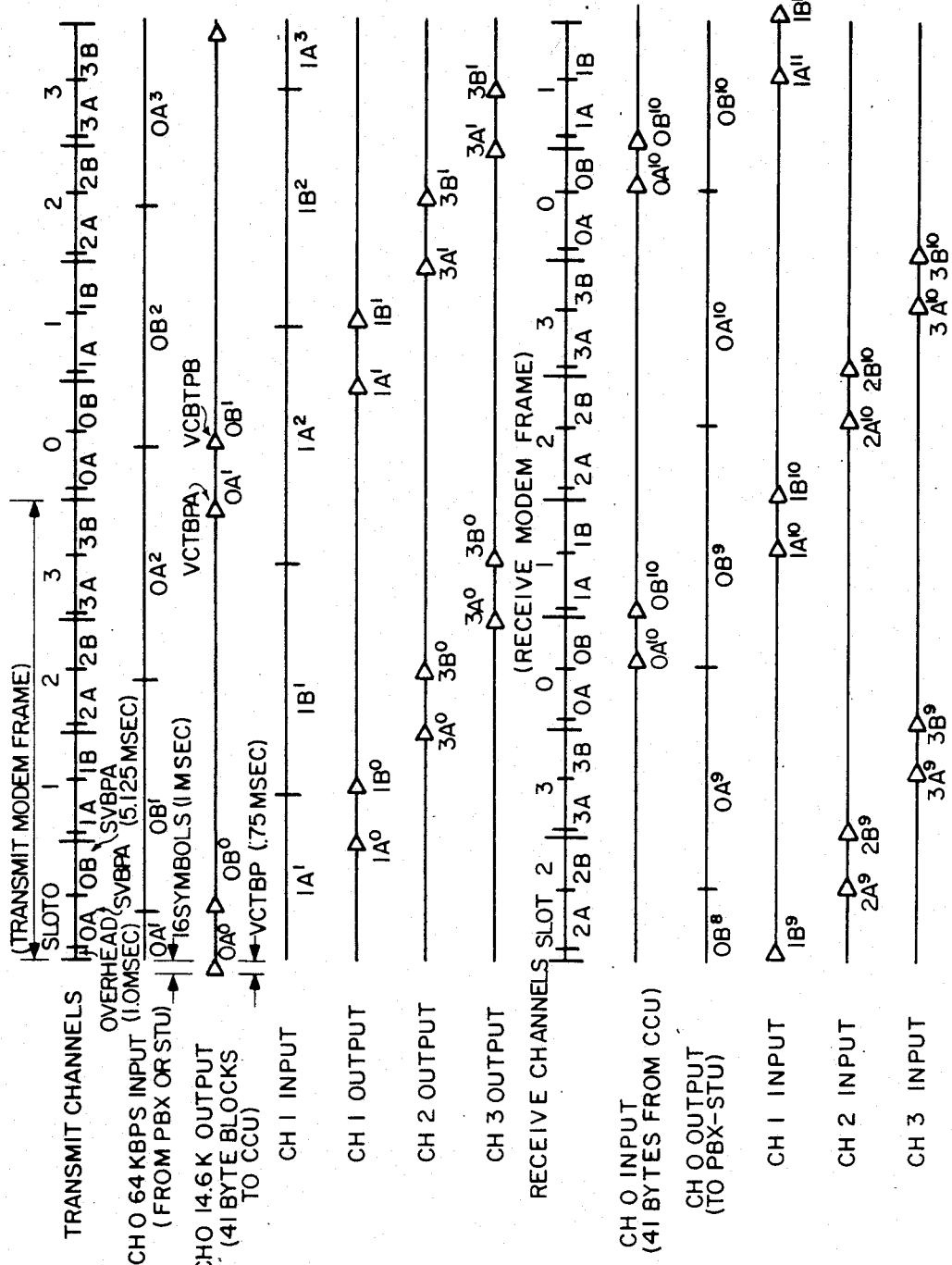
FIGS. 19A and 19B respectively show the timing relationships for the transmit and receive speech blocks that are transferred between the VCU and CCU for 16-level PSK modulation.

Note that FIGS. 17 and 18 detail the events that occur during the VCBTP shown in FIGS. 19A and 19B. The individual interface signal definitions are given in the following paragraphs.

TABLE 11

| Symbol | Characteristic | Min | Max | Unit |
| --- | --- | --- | --- | --- |
| td1 | voice codec block transfer period | — | 750 | μsec |
| td2 | TCVC response time | 1.25 | 15 | μsec |
| td3 | CCU DMA response time | | 1.25 | μsec |
| td4 | handshake delay | | 15 | nsec |
| td5 | VC block period delay | | 150 | μsec |
| th1 | control data hold | | | nsec |
| th2 | status data hold | | | nsec |
| th3 | TC data hold | | | nsec |
| ts1 | control data setup | | | nsec |
| ts2 | status data setup | | | nsec |
| ts3 | TC data setup | | | nsec |
| tw1 | write width | | | nsec |
| tw2 | read width | | | nsec |
| tw3 | block request width | 1.5 | | μsec |

TABLE 12

| Symbol | Characteristic | Min | Max | Unit |
| --- | --- | --- | --- | --- |
| td6 | block transfer period | | 750 | μsec |
| td7 | CCU data response time | | 1.25 | μsec |
| td8 | VC response time | 1.25 | 15 | μsec |
| td9 | handshake delay | | 15 | nsec |
| td10 | VC block period delay | | 150 | μsec |
| th4 | control data hold | | | nsec |
| th5 | status data hold | | | nsec |
| th6 | RC data hold | | | nsec |
| ts4 | control data setup | | | nsec |
| ts5 | status data setup | | | nsec |
| ts6 | TC data setup | | | nsec |
| tw4 | write width | | | nsec |
| tw4 | read width | | | nsec |
| tw6 | block request width | 1.5 | | μsec |

FIGS. 19A and 19B show the timing relationships between the various transmit and receive speech blocks that are transferred between the VCU 17, 18 and CCU 18, 19 for 16-level phase shift keying (PSK) modulation. At the top of the FIG. 19A is the system frame timing to which all transfers are referenced. This frame timing is also applicable to FIG. 19B. One modem frame is 45 msec in length and includes of four voice slots (or channels). Each voice slot consists of two system voice block periods (SVBP) of speech data each containing 82 symbols (requiring 5.125 msec) and an additional 16 overhead data symbols requiring 1.0 msec of frame time.

For the transmit channels, one block of 328 bits (41 bytes) of processed speech is transferred from the VCU 17, 28 to the CCU 18, 29 prior to the beginning of each SVBP during a voice codec block transfer period (VCBTP). The VCU's 64 Kbps input data stream, which is associated with a processed speech block, is shown to be partitioned into voice coder block periods (VCBPs) that are 22.5 msec in length. Referring to transmit channel 0 in FIG. 19A, unprocessed VC input data in VCBPs OA1 and OB1 is associated with processed data in VCBTPs OA1 and OB1. Also note that the VCBPs for channels 0 and 2 are staggered by one-half of a VCBP (i.e., 11.25 msec) from the VCBPs for channels 1 and 3.

For the receive channels (as shown in FIG. 19B), one block of 328 bits (41 bytes) of processed speech is transferred from the CCU 18, 29 to the VCU 17, 28 at the end of each SVBP during a VCBTP. As in the transmit channels, the time skew of the VCBP to the VCBTP is implementation dependent and a (maximum) offset of one VCBP is shown in FIG. 19B. To understand the relationship of voice codec's input and output data, refer to FIGS. 19A and 19B. For receive channel 0, compressed speech data transferred during VCBTPs OA10 and OB10 is associated with the processed expanded data stream in VCBPS OA10 and OB10.

The TCADDR lines 90 carry transmit channel address signals from the CCU 18, 29 to the VCU 17, 28. These three address lines are used to select the current transmit channel address.

The TCDATA bus 91 carries transmit channel data signals between the VCU 17, 28 and the CCU 18, 29.

The TCDAV line 92 carries a transmit channel data available signal from the VCU 17, 28 to the CCU 18, 29. The TCDAV/ signal indicates to the CCU 18, 29 that a data byte is available in the TCDATA register. The TCDAV signal remains low until a TCDACK signal is activated.

The TCDACK line 93 carries a transmit channel data acknowledge signal from the CCU 18, 29 to VCU 17, 28. The TCDACK/signal gates the data onto the TCDATA bus and resets the TCDAV/.

The TCSCWR line 94 carries a transmit channel status/control write signal from the CCU 18, 29 to the VCU 17, 28. The TCSCWR signal writes the voice codec control word into the appropriate transmit channel control register determined by the TCADDR lines. Data is latched into the register on the rising edge of the TCSCWR signal.

The TCSCRD line 95 carries a transmit channel status/control read signal from the CCU 18, 29 to the VCU 17, 28. The TCSCRD signal gates the status byte onto the TCDATA bus from the voice codec status register designated by the TCADDR lines.

The BLOCKRQ line 96 carries a block request signal from the CCU 18, 29 to the VCU 17, 28. The BLOCKRQ signal is used to initiate a 41 byte block transfer of data from the voice codec (specified by the TCADDR lines) to the CCU 18, 29 over the TCDATA bus. BLOCKRQ is used by the voice codec for start of VCBP timing.

The TCVCRST line 97 carries a transmit channel voice codec reset signal from the CCU 18, 29 to the VCU 17, 28. The transmit voice codec specified by the TCADDR lines is reset.

The RCADDR lines 98 carry receive channel address signals from the CCU 18, 29 to the VCU 17, 28. These address lines are used to select the current receive channel address as follows.

The RCDATA bus 98 carries receive channel data signals between the CCU 18, 29 and the VCU 17, 28.

The RCDAV line 100 carries a receive channel data available signal from the CCU 18, 29 to the VCU 17, 28. The RCDAV signal indicates to the voice codec specified by the RCADDR lines that a data byte is available in the RCDATA register. The RCDAV signal gates the data onto the RCDATA bus and into the RCDATA register, and resets the RCDACK line.

The RCDACK line 101 carries a receive channel data acknowledge signal from the VCU 17, 28 to the CCU 18, 29. The RCDACK signal indicates to the CCU 18, 29 that the data has been read from the RCDATA register and that another byte may be transferred from the CCU 18, 29.

The RCSCWR line 102 carries a receive channel status/control write signal from the CCU 18, 29 to the VCU 17, 28. The RCSCWR signal writes the control word into the appropriate voice codec control register determined by the RCADDR lines. Data is latched into the register on the rising edge of RCSCWR signal.

The RCSCRD line 103 carries a channel status/control read signal from the VCU 17, 28 to the CCU 18, 29. The RCSCRD signal gates the voice codec status word onto the RCDATA bus from the status register designated by the RCADDR lines.

The BLOCKRDY line 104 carries a block ready signal from the CCU 18, 29 to the VCU 17, 28. The BLOCKRDY signal is used to initiate a 41 byte block transfer of data from the CCU 18, 29 to the voice codec specified by the RCADDR lines. The BLOCKRDY signal is used by the voice codec for start VCBP timing. The CCU 18, 29 is required to have a data byte available in the RCDATA register prior to the rising edge of the BLOCKRDY signal.

The RCVCRST line 105 carries a receive channel voice codec reset signal from the CCU 18, 29 to the VCU 17, 28. The voice code specified by the RCADDR lines is reset by the RCVCRST signals.

Figure 20A:
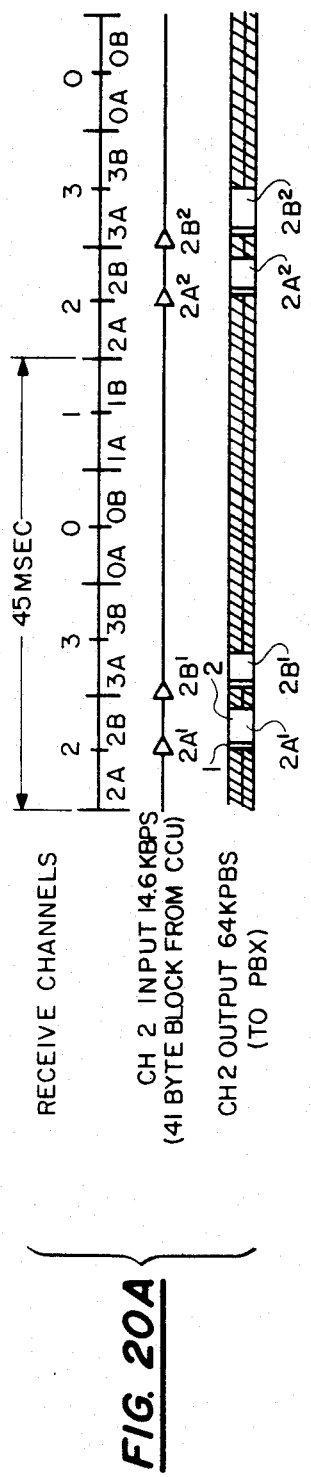
FIGS. 20A shows the input and output data timing and content for the receive channel between the VCU and the PBX (or STU) for 16-level PSK modulation.

The receive channel VCU hardware receives 41 byte blocks of input data from the CCU 18, 29 during a VCBTP as shown in FIG. 20A. After processing the data according to the current mode of operation, the 8-bit μ-law companded data is transferred at an 8 KHz rate to the PBX (STU) interface module. Data buffering is performed within the VCU 17, 28 to simplify the input/output requirements of the CCU 18, 29. Control information is passed between the VCU 17, 28 and the CCU 18, 29 via a set of control and status ports for each receive channel at the beginning of a VCBTP as shown in FIG. 18. The following operating modes are supported by the receive codecs:

In the external mode, speech bandwidth expansion is performed with an input data rate of 14.6 Kbps (328 bits every 22.5 msec), and an output data rate of 64 Kbps. Speech data may also include DTMF tones.

In the internal mode, previously compressed 14.6 Kbps speech is passed from the CCU 18, 29 through the VCU 17, 28 to the PBX 15 or the STU 27. Since the PBX 15 or the STU 27 expects 64 Kbps data, padding of the data stream must occur. Output (64 Kbps) data consists of an idle byte (FF hex) pattern until speech data becomes available from the CCU 18, 29. A sync byte (55 hex) is then output, followed by the 41 previously processed data bytes, after which the idle byte pattern is continued. FIG. 20A provides an example of the input and output data timing and content for 16 PSK modulation.

In the silence mode, input blocks of speech data from the CCU 18, 29 are consumed but not used. An output idle byte pattern (FF hex) to the PBX 15 or the STU 27 is maintained to ensure line silence.

In the standby mode, continuous hardware diagnostic routines are executed and the resulting status stored in the status register. Block transfers to the CCU 18, 29 will not occur until the operating mode is changed by a block request corresponding to VCBTPA. The new control word (and operating mode) is read by the voice codec and the diagnostic status information is passed to the CCU 18, 29.

The transmit channel VCU hardware receives 8-bit μ-law companded PCM (at 8 KHz sampling rate) from the PBX/STU interface. After processing the data according to the current mode of operation, the output data is transferred to the CCU 18, 29 in blocks of 41 bytes during a voice codec block transfer period (VCBTP) as shown in FIG. 19A. Data buffering is performed within the VCU 17, 28 to simplify the input/output requirements of the CCU 18, 29. Control information is passed between the VCU 17, 28 and the CCU 18, 29 via a set of control and status ports for each transmit channel at the beginning of a VCBTP as shown in FIG. 17. The following operating modes are supported by the transmit codecs:

In the external mode, speech bandwidth compression is performed with an output data rate of 14.6 Kbps. (328 bits every 22.5 msec.) Processed speech data is transferred in 41 byte blocks to the CCU 18, 29. Speech data may also include Dual-Tone-Multi-Frequency (DTMF) tones.

Figure 20B:
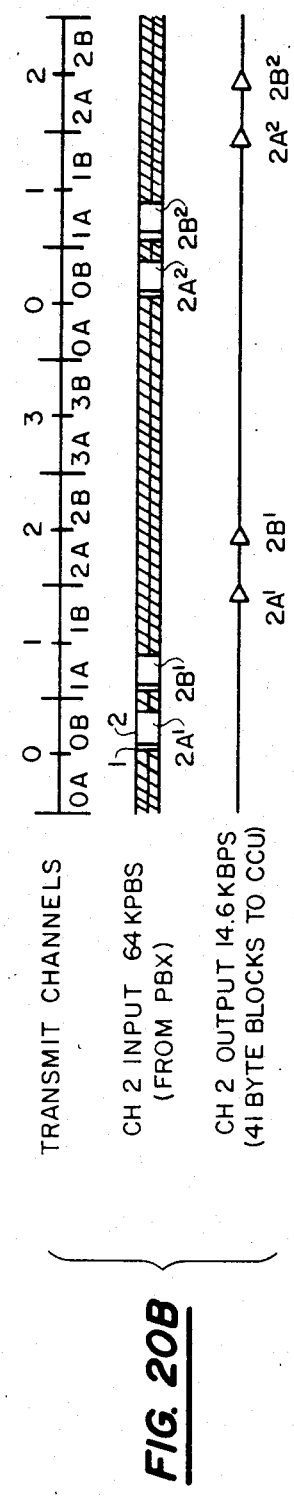
FIG. 20B shows the input and output data timing and content for the transmit channel between the VCU and the PBX (or STU) for 16-level PSK modulation.

In the internal mode, previously processed speech data is passed from the PBX 15 or the STU 27 through the VCU 17, 28 and into the CCU 18, 29. The 64 Kbps input data stream consists of an idle byte patter (FF hex), one sync byte (55 hex), 41 previously processed compressed speech data bytes, and additional idle bytes until the next sync byte occurs. The voice codec monitors the input data for the sync byte, which occurs on a byte boundary, then buffers the 41 bytes of speech data. The speech block is then transferred to the CCU 18, 29 during the next VCBTP as described above. FIG. 20B provides an example of the input and output data timing and content for 16-PSK modulation. Segment 1 on the output channel is a sync byte; and segment 2 is a processed speech byte. The cross-hatched segment represents an idle byte pattern. Note that the sync and speech data bytes will not occur across VCBP boundaries.

In the silence mode, input speech data from the PBX 15 or the STU 27 is consumed but not used. The 41 bytes of output speech data to the CCU contains a silent voice pattern.

In the standby mode, continuous hardware diagnostic routines are executed and the resulting status stored in the status register. Block transfers to the CCU 18, 29 will not occur until the operating mode is changed by a block request corresponding to VCBTPA. The new control word (and operating mode) is read by the VCU 17, 28 and the diagnostic status information is passed to the CCU 18, 29.

A codec frame is defined according to the implementation requirements of the RELP algorithm, but the frame must be an integer sub-multiple of the voice coded block period (VCBP), which is 22.5 msec.

Due to the fact that the PBX 15 and STU 27 operate asynchronously from internal system timing, a means of detecting, reporting and compensating for data overruns and underruns must be incorporated into the VCU 17, 28. This condition occurs approximately once in every 5,000 VCBPs. While detection of over/underruns is implementation dependent, reporting such errors is provided for in the status word. Data underflows can be compensated for by repeating the last speech sample as required, and overflows can be handled by disregarding speech sample(s) as required.

After a reset of any one (or all) codecs, VCBTPA will be the first block transferred from the CCU 18, 29, as shown in FIG. 19A, for example.

Control Channel Unit (CCU)

The channel controller unit (CCU) performs similar functions in both the subscriber stations and the base station. The hardware used in the two station types for the CCU function is, in fact, identical. The software in the subscriber station differs slightly from that in the base station. The CCU performs many functions pertaining to the information formatting and timing associated with operation on the time-division transmission channels. Basic inputs to the CCU come from four sources. First, there is the actual digitized samples which are to be transmitted. These are transferred to the CCU 18, 29 from the VCU 17, 29. (FIGS. and 3.) This data may be encoded voice samples or data samples from the RS-232 data port 10 in the STU. (FIG. 2.) In any case, the digital channels operate at 16 Kbps. Four channels may be processed concurrently by the CCU 18 when operating in the base station with all four 16-level PSK transmission channels operating. The subscriber station CCU 29 operates on only one stream, but that stream may be located in any of the four slot positions associated with the TDMA framing scheme. The second input to the CCU comes via the baseband control channel (BCC) from the STU 27 (in the subscriber station) or the RPU 20 (in the base station). This second input provides control messages pertaining to modes of operation, status and control information. Many of the BCC messages from the CCU 18, 29 are radio control channel (RCC) messages which have been received by the CCU 18, 29. The CCU 18, 29 forwards the control information from the RCC messages to the STU 27 or the RPU 20 and, in response, receives control messages from the RPU 20 or the STU 27. This determines what the CCU 18, 29 is to do with the data from the VCU 17, 28. The third input source provides timing and status information from the modem 19, 30a. The modem 19 provides the master clock signal used in the VCU-CCU-modem chain. In addition, the modem 19, 30a provides status on the accuracy of its bit-tracking synchronization, RF AGC level settings and other "goodness" indicators which are used by the CCU 18, 29 to determine if adequately reliable communications are occurring over the channel. The CCU 18, 29 attempts to control the "fine-tuning" of the instantaneous modem 19, 30a operation through commands to vary the transmit power levels, the AGC levels and the timing/ranging computation. Quality level measurements of modem transmissions are reported to the RPU 20 or the STU 27. The fourth input source is the actual modem data received as symbols of up to four bits each (depending on the modulation levels). These symbols are buffered, demulitplexed and output to the VCU 17, 28 receive circuits for decoding.

Figure 21:
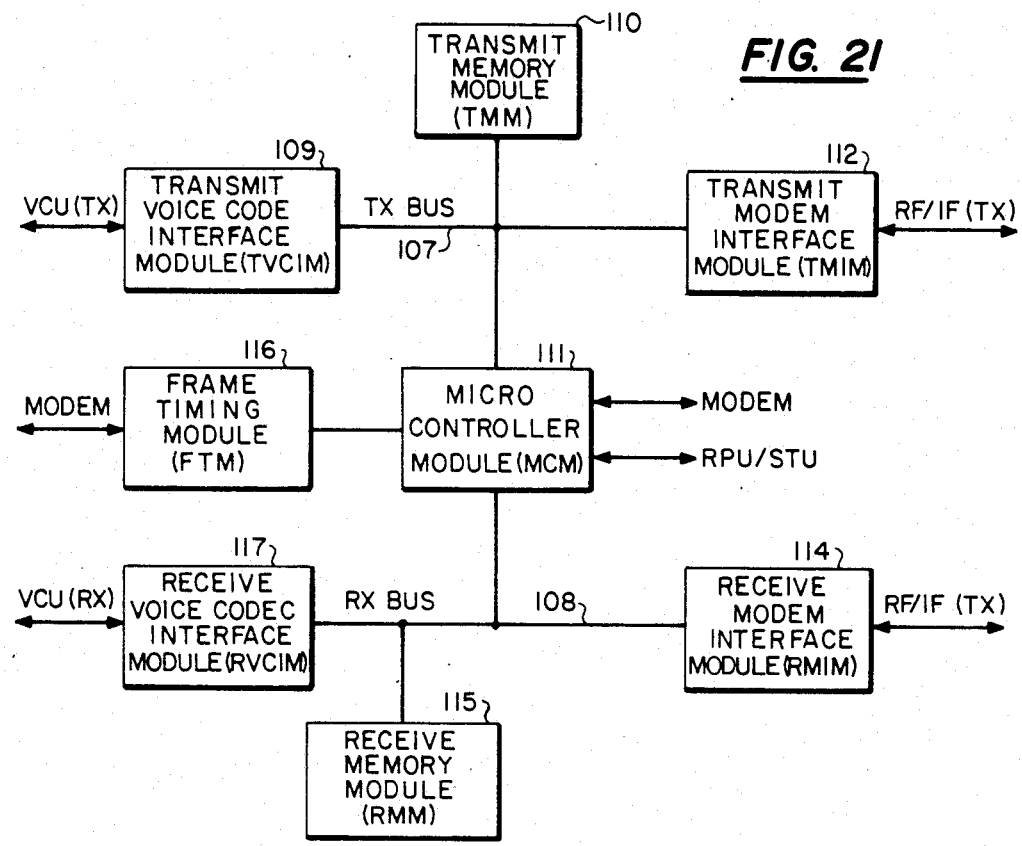
FIG. 21 (on Sheet 5) is a block diagram of the CCU of both the base station of FIG. 2 and the subscriber station of FIG. 3.

FIG. 21 is a block diagram of the CCU. The architecture of the CCU is essentially that of two one-way direct memory access (DMA) data channels with an intelligent microprocessor controller. The function of the DMA channels is to transfer data from the VCU to the modem and vice versa. The CCU interface to the VCU includes two parallel DMA buses, a TX bus 107 for the transmit channel (VCU to CCU to modem) and a RX bus 108 for the receive channel (modem to CCU to VCU). Data processed by the transmit circuits in the VCU is buffered in the VCU memory until the CCU requests a DMA transfer. Forty-one bytes are transferred to the CCU during each block transfer period. Two of these blocks are transmitted per active voice channel (up to four voice channels in the base station) per TDMA frame. The CCU receives these transmit bytes via a transmit voice codec interface module (TVCIM) 109 and buffers them in a transmit memory module (TMM) 110. Depending on the specific mode of operation for the given channel, a CCU processor embodied in a microcontroller module (MCM) 111 appends a control/sync header to the coded voice bytes, thereby formatting a complete voice packet for transmission to the modem via a transmit modem interface module 112. The MCM 111 maintains frame timing information and transfers the data to the modem at the proper time. Before being transferred to the modem the transmit data is converted by the MCM 111 from the eight-bit byte format used by the CCU to a symbol format containing 1, 2 or 4 bits per symbol, depending on the modulation levels for that slot.

The reverse process is performed for the receive data from the modem. Data from the modem is received by a receive modem interface module (RMIM) 114 and buffered in a receive memory module (RMM) 115. This data is then converted from the 1, 2 or 4-bit-per-symbol format used by the modem to the eight-bit byte format used internally by the CCU and all other baseband processing. The overhead and control bits are stripped from the incoming data stream on the RX bus 108 by the MCM 111 according to its knowledge of the frame timing, which is provided by the modem to a frame timing module (FTM) 116 and its own identification of various code words in the symbol stream. The converted data is provided to the VCU via a receive voice codec interface module (RVCIM) 117.

The CCU also provides the link-level control of the radio control channel (RCC) transmissions at both the base and subscriber stations. In the base station only one CCU is configured, by the RPU, as processing the RCC channel. The CCU controls the reception and formatting of messages from the RPU in the base station to the STU controller in the subscriber stations. This control function of the CCU involves detection and error control in the RCC messages as well as the formatting and packetizing of the RCC information for transmission across the radio link. The CCU also detects collisions on the incoming RCC at the base station. The CCU controls the power and ranging computations for subscriber stations performing initial acquisition efforts. The protocol for acquisition and other RCC functions have been described above.

Figure 22:
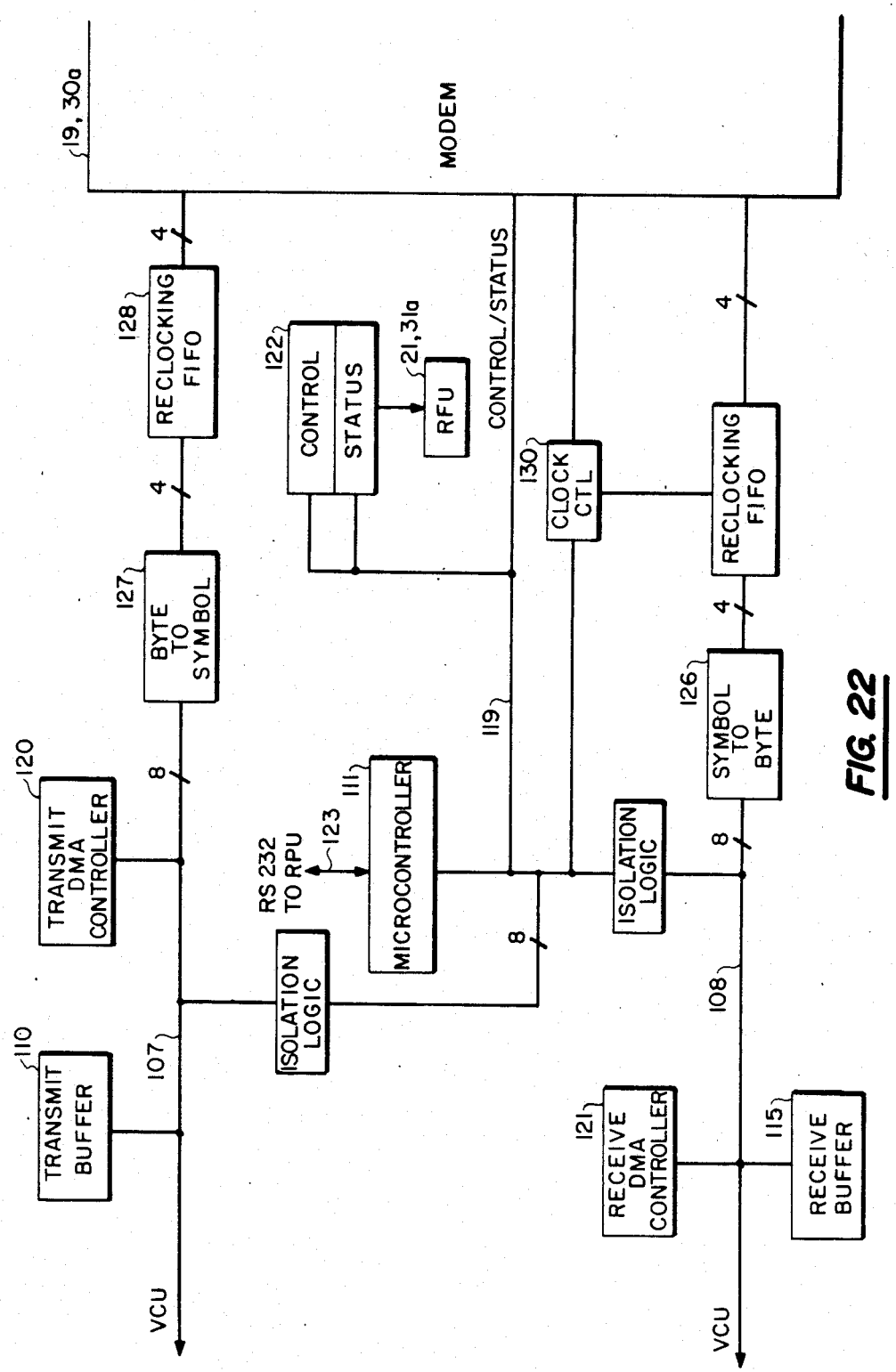
FIG. 22 shows the software-implemented functional architecture of the CCU of FIG. 21.

FIG. 22 shows the software-implemented functional architecture of the CCU. The CCU has three separate data paths: the transmit bus TX 107, the receive bus RX 108 and the microcontroller local bus 119. The microcontroller 111 shares the TX bus 107 with a memory access (DMA) controller 120 and shows the RX bus 108 with a director DMA controller 121. The microcontroller 111 uses these remote buses to control the DMA controller peripherals, the control/status registers 122 and to access both the transmit buffer memory 110 and the receive buffer memory 115. The control and status registers 122 off of the microcontroller local bus 119 provide interfaces to the RFU, the modem and the CCU hardware. An RS-232C link 123 between the RPU and the CCU is supported by a UART on the microcontroller chip 111. In the subscriber station, the RPU is replaced by the STU, but the interface remains the same.

The microcontroller 111 has access to three physically separate RAM areas: local RAM, the transmit buffer and the receive buffer. Local RAM can further be broken down into on-chip RAM and off-chip RAM. The transmit buffer and the receive buffer can only be accessed by the microcontroller when the respective DMA controller is idle.

The transmit buffer 110 is divided into a number of distinct segments. Each segment contains the skeleton of a voice or RCC packet, ready for transmission over the channel. The preamble and unique word (RCC only) are constants initialized by the microcontroller 111 after a CCU reset. The code word (voice only), voice data and RCC data are written into the transit buffer 110 by the microcontroller just prior to the DMA transfer to the modem 19, 30a. Since the RCC "null ACK" is a fixed message sent with a high frequency, it is stored as a separate entity in the transit buffer 110.

The receive buffer 115 is divided into a number of distinct segments. One segment is for the storage of voice data, which is buffered and transferred on a VCU block basis. RCC data is buffered separately from voice data to allow its retention over a longer period of time. If necessary, the microcontroller 111 can maintain a two frame RCC history in the receiver buffer 115, making the RCC copy task (from buffer to local RAM) less of a time critical event.

The local RAM contains the working variables used by the microcontroller 111. One important data structure stored there supports the baseband control channel (BCC) between the CCU and the RPU. One register bank of the local RAM is assigned to provide basic queue information to the RS-232C interrupt handler. A pointer and length field in this bank defines the active transmit data block (TXDB), from which data is read and transmitted. The TXDB contains length and pointer information to the next TXDB in the queue; hence forming a linked list. On the receive side, a circular buffer is used to store incoming data bytes. When a complete message is received, the interrupt handler flags the serial code to interpret it.

The microcontroller 111 uses its local bus 119 to access the modem, RFU and CCU control/status registers 122. The bus also provides access, through isolation logic circuits 124 and 125 to the TX bus 107 and the RX bus 108 respectively. To avoid contention, the remote buses 107, 108 are only accessed by the microcontroller 111 when the respective DMA controller 120 or 121 is idle.

The CCU and RPU communicate via link 123 through a full duplex RS-232C interface, called the baseband control channel (BCC). Asynchronous characters are eight-bit binary and are transmitted at 9600 baud. One start bit and one stop bit are used for data byte framing. Messages are terminated by a unique byte with byte stuffing employed to avoid having the unique byte occur within a message. An alternating bit protocol and an eight bit checksum are used to ensure link integrity.

Two external interrupts are supported by the microcontroller. One is generated by the transmit DMA controller 120 and the other is generated by the receive DMA controller 121. These interrupts occur when the respective controller 120, 121 completes its block transfer; hence, releasing control of its bus to the microcontroller 111.

The BCC interface is driven by an internal interrupt. The software is interrupted upon receipt or transmission of a byte.

At the base station, the CCU microcontroller 111 is responsible for controlling and monitoring the entire four channel data path assigned to it, which includes the VCU 17, 28, the CCU 18, 29, the modem 19, 30a and the RFU 20, 31a. At the subscriber station, the microcontroller 111 controls and monitors the same hardware, but supports only one data path. The CCU, in turn, is controlled by the RPU (in the base station) or the STU (in the subscriber station).

The CCU provides the VCU with mode of operation information. Mode changes occur only on system slot boundaries. During speech compression operation, the CCU also provides the VCU with information as to the position of the VCU block within the system slot (there are two VCU blocks per system slot). VCU addressing is established by the CCU prior to a data transfer, which accomplishes the MUX/DEMUX task. VCU status is read by the CCU after each block transfer and appropriate statistics are maintained by the CCU. The CCU can also initiate a VCU hard reset and/or a VCU.

The microcontroller 111 provides the current modulation level to a symbol-to-byte converter 126 on the RX bus 108 and a byte-to-symbol converter 127 on the TX bus 107.

The modem is provided with information concerning the type of data being received, RCC or voice, due to the different acquisition procedures used in their reception. The modem provides the CCU with a fractional clock offset, AGC level and link quality value every slot. The CCU frequency assignment is provided by the RPU or STU. The CCU controls the initiation of a modem hard reset, self test or receive side training mode.

The CCU handles full duplex data flow via the transmit and receive buses 107, 108. During a given slot time, transmit voice data originating at the VCU is block transferred to the transmit buffer 110 via the transmit DMA controller 121. Each block is one VCU block in length; hence, two such transfers are required for each voice channel. The CCU provides the VCU with the appropriate channel address prior to the transfer, thus effecting the multiplexing operation.

A preamble and code word, stored in the transmit buffer 110, is sent out ahead of the VCU data at the beginning of each slot. The transmit DMA transfers data from the transmit buffer to the reclocking FIFO stock 128 while the modem receives data from the FIFO stock 128 as required. Byte to symbol conversion is accomplished by the byte-to-symbol converter 127 during the transfer. Control of the transmit DMA peripheral is handled by the microcontroller, along with the creation and insertion of the voice packet code word.

Receive data flow is very much a mirror image of the transmit side. Data is written into the reclocking FIFO stack 129 as it appears from the modem 19, 30a. The receive DMA controller 121 empties the FIFO stack 129 into the receive buffer 115 as required. Symbol-to-byte conversion is accomplished by the symbol-to-byte converter 126 and frame timing is accomplished by the clock circuit 130. Byte boundary alignment occurs automatically once the channel is in sync. Once a complete VCU block is received, it is DMA block transferred to the appropriate VCU. Control of the receive DMA controller is handled by the microcontroller 111.

Code word detection is performed for every slot. The microcontroller 111 performs this task by copying the code word byte into the local RAM and comparing it to a list of valid code words. During each slot the modem 19, 30a provides a fractional symbol offset and an AGC value. These are read by the microcontroller 111 and interpreted appropriately. If power or ranging problems exist, the subscriber station is informed of this via the transmit code word.

Transmit RCC data is synthesized in the transmit buffer 110 by the CCU according to the contents of the RCC message queue. If the RPU has sent an RCC message to the CCU, this message is formatted in the transmit buffer 110. Otherwise the NULL KNOWLEDGE message, permanently stored in the transmit buffer 110, is used. Once the RCC packet is ready, the RCC preamble, unique word and RCC data is DMA transferred to the modem 19, 30a as it is needed. The CCU performs collision detection and sets the outbound RCC collision detection bit accordingly.

The receive RCC data handler has two modes: "frame search" and "monitor". In the frame search mode, the RCC channel is considered to be out of sync. Every incoming RCC message must be synchronized using a unique word detection algorithm. In the monitor mode, the RCC channel is in sync and the unique word search algorithm is not invoked. The base station is always in the frame search mode since subscribers may burst in with bad timing at any time. At the subscriber station, the RCC data handler is in the monitor mode unless the station has not acquired RCC synchronization.

In the frame search mode, unique word (UW) detection is performed after every RCC slot. The microcontroller 111 performs this task by scanning for the unique word in a window about the "nominal" unique word location. Successful unique word detection provides the CCU with symbol timing information.

Receive RCC data is DMA transferred from the modem 19, 30a to the receive buffer 115. Once the transfer is complete, the RCC data is copied into the local microcontroller RAM for processing. Receive RCC packets are filtered by the CCU. An RCC packet is passed to the RPU only if the unique word is detected and the CRC is correct.

During RCC operation, the corresponding VCU channel is placed in standby. No data transfers occur between the VCU and the CCU during this channel period, both on the transmit and receive data paths 107, 108.

The software executes on an Intel 8031 microcontroller 111. Program storage is provided for by external EPROM on the microcontroller local bus. The software is required to respond to DMA service requests in real time, maintaining up to a 64 Kbps data flow in both directions without loss of data. FIFO buffering by the stacks 128 and 129 on the modem interface provides the required slack time for the microcontroller 111 to perform the DMA block transfers and system control functions.

The software is divided into five separate modules: supervisor, data transfer, BCC transceiver, BMM control and utility. Each module is designed to have only one entry and exit point, with the exception of interrupts and error conditions. A further exception to this is the utility module, which contains an assortment of utility routines accessed directly from the other modules. In general, inter-module communication takes place through the use of global variables defined in a separate data segment.

The supervisor module includes an initialization function, maintains overall program control and performs basic self test functions.

The data transfer module supports the control of data transfer over the TX bus 107 and the RX bus 108 for both voice and RCC, performs sync word detection for all modulation levels on both voice and RCC data, and supports the CCU-RPU RS-232 communication link 123.

The BCC transceiver module performs BCC transceiver duties, handles the BCC queues, formats transmit BCC messages, processes receive BCC data and moves RCC data in and out of the CCU via the BCC.

The BBM control module controls the RFU, modem, VCU and CCU hardware via registers, reads and interprets status information from these devices (e.g., modem AGC, link quality and symbol ambiguity), decodes embedded code words in the receive voice channel, formats the code word for the transmit voice channel, maintains a real time software/hardware timer and performs online self tests.

The utility module performs miscellaneous utility routines accessed by the other modules.

The CCU software is divided into four separate processes which essentially operate concurrently. Three are the BCC data, TX DMA and RX DMA processes, which are interrupt driven and are invoked only when a specific event demands attention. All three of the event driven processes are located in the data transfer module. The remaining process, which is distributed among all of the modules, is a background process which initializes, controls and monitors the other three processes.

As BCC messages arrive from the RPU (or STU in the subscriber station), they are received and buffered by the BCC data process. Once a complete message is received, the BCC data process notifies the background process via a mailbox. The background process polls this mailbox during its main loop; hence detecting any new messages. Messages are interpreted by the background and relevant action is taken. Any reply is written into the transmit BCC message queue by the background process and the BCC data process is duly notified.

BCC messages can initiate a reconfiguration of the CCU data channels. The necessary control information is written to the modem 19, 30a and the VCU 17, 28 at the appropriate times. The modem acts upon a new control word on slot boundaries. The VCU expects mode changes to occur on the first VCU block transfer of a slot boundary. The background process is responsible for seeing that the correct control timing is maintained.

Status gathering is performed by the background, TX DMA process and the RX DMA process. The latter two collect status words from the TX and RX sides of the VCU respectively. This is necessary because these status registers can only be accessed via the TX bus 107 and the RX bus 108, which are idle only for limited periods of time. The background process gathers status information directly from the modem 19, 30a via the station registers 122 on the local bus 119. Once collected, all status information is collated by the background process and stored in specific status variables.

Status requests received from the RPU are handled by the background process, based on this status history.

Some status information, like the AGC value and fractional bit offset, may necessitate CCU action. Apart from being stored as status history, such data is used to correct subscriber power and ranging problems. In the case of RCC messages, power and range information is forwarded directly to the RPU as part of the RCC. The background process performs this function by formatting a BCC message containing the RCC, AGC and ranging data. Once the packet is ready it is placed in the transmit BCC queue and the BCC data process is notified. For voice channels, this status information is used to format code words which are embedded in outbound voice packets. The background process performs this formatting function and controls the transmission of the code word via the voice channel. All code words must be transmitted five frames in a row, providing 5:1 redundancy coding. The TX DMA process automatically transmits the code word selected by the background process.

The background process also maintains a software/hardware real time clock. This is done by polling one of the 8031's timers and counting overflows. The real time clock function provides a time base for software timeouts and other time dependent events. The background process checks to see that system timing is being maintained by polling CCU hardware error indicators and checking that data transfer events are occurring when they should in the system frame. System framing information is provided via the start of system frame status line and a timer connected to the 16 KHz clock 130. Data synchronization is performed by the background process.

The BCC data process responds to RS-232 interrupts, which can occur for both the transmit and receive directions of the port. The process simply outputs another byte on the transmit side or inputs another byte on the input side. An end-of-message delimiters on the receive side causes the BCC data routine to notify the background process.

The TX DMA process and the RX DMA process handle the transmit and receive DMA channels.

Figure 23:
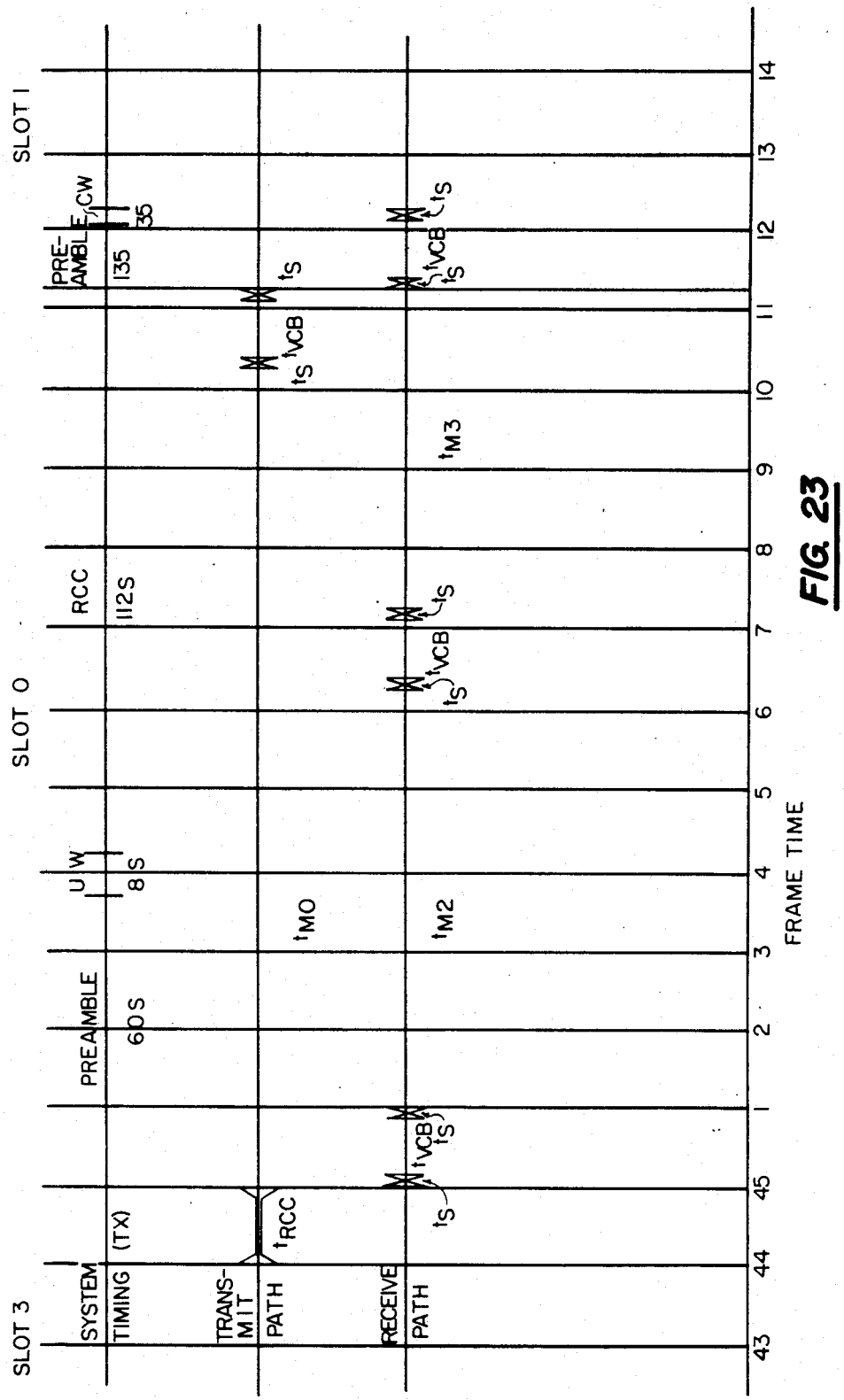
FIG. 23 is a timing diagram for transferring RCC and 16-level PSK voice data on the transmit bus of the CCU of FIG. 22.
Figure 24:
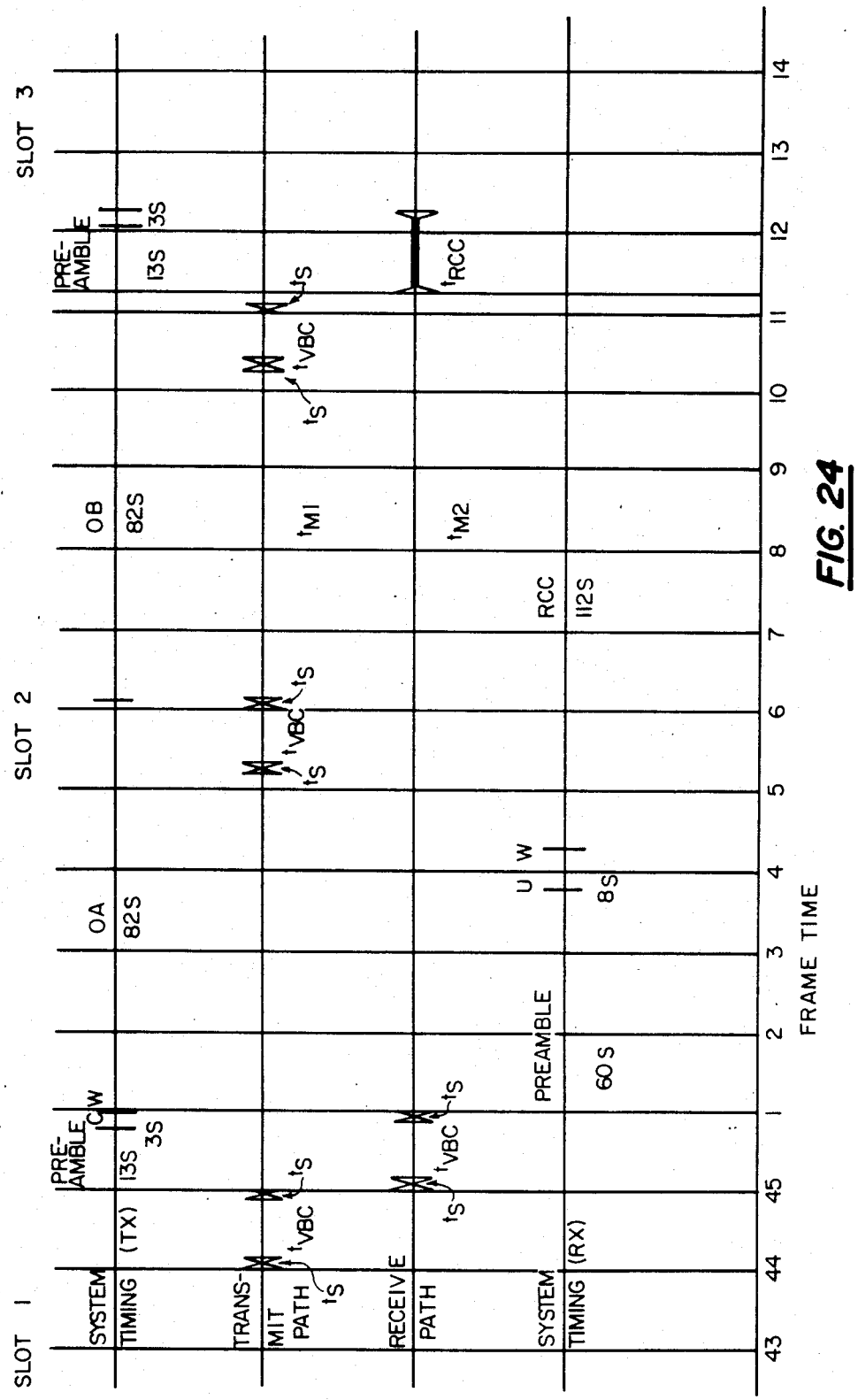
FIG. 24 is a timing diagram for transferring RCC and 16-level PSK voice data on the receive bus of the CCU of FIG. 23.

A step-by-step description of the data transfer function controlled by the software is provided below. Events in the data transfer process are marked by DMA controller interrupts. The interrupt occurs after the DMA controller has completed the assigned block transfer. Each walk-through starts at the beginning of a slot data transfer. It may help to look at FIGS. 23 and 24 while proceeding through this section. FIG. 23 is a timing diagram for transferring RCC and 16 PSK voice data on the transmit bus of the CCU. FIG. 24 is a timing diagram for transferring RCC and 16 PSK data on the receive bus of the CCU. Tables 13 and 14 describe the characteristics of the time symbols shown in FIGS. 23 and 24 respectively.

TABLE 13

| Time Symbol | Operation | Max(μs) | Min(μs) | Typ(μs) |
| --- | --- | --- | --- | --- |
| $t_S$ | CCU DMA setup | 150 | — | 100 |
| $t_{VCB}$ | VCU DMA transfer | 600 | — | 100* |
| $t_{RCC}$ | RCC transfer from CCU | — | — | 900 |
| $t_{M0}$ | RCC tx modem block | — | 10350 | 10350 |
| $t_{M2}$ | 1st Rx modem block | — | 4300 | 4300* |

TABLE 13-continued

| Time Symbol | Operation | Max(μs) | Min(μs) | Typ(μs) |
| --- | --- | --- | --- | --- |
| $t_{M3}$ | 2nd Rx modem block | — | 4225 | 4825* |

*Based on RELP VCU

TABLE 14

| Time Symbol | Operation | Max(μs) | Min(μs) | Typ(μs) |
| --- | --- | --- | --- | --- |
| $t_S$ | CCU DMA setup | 150 | — | 100 |
| $t_{VCB}$ | VCU DMA transfer | 600 | — | 100* |
| $t_{M0}$ | 1st Tx modem block | — | 5225 | 5825* |
| $t_{M1}$ | 2nd Tx modem block | — | 4225 | 4825* |
| $t_{M2}$ | RCC Rx modem block | — | 5600 | 5800* |
| $t_{RCC}$ | RCC transfer to CCU | — | — | 900 |

*Based on RELP VCU

Transmit Function—RCC

1. Receive "end of TX DMA transfer" interrupt. This signals that processing of the previous slot is complete and that processing of the next slot can begin. The TX DMA process is invoked.
   a. Write out control channel and modulation switching information. This information is required by the modem 19, 30 and the byte-to-symbol converter 127.
   b. Format any pending RPU RCC message in the transmit buffer 110. Otherwise prepare and send the null acknowledgement message.
   c. Initialize and enable DMA transfer from the transmit buffer 110 to the modem 19, 30a pointing to the RCC preamble, unique word and RCC data block.
   d. Return from interrupt and proceed with background processing.

Transmit Function—Voice

1. Receive "end of TX DMA transfer" interrupt. This signals that processing of the previous slot is complete and that processing of the next slot can begin. The TX DMA process is invoked.
   a. Write out voice channel and modulation switching information for next slot. This information is required by the modem 19, 30a and the byte-to-symbol converter 127.
   b. Select VCU port address and enable DMA transfer from VCU to transmit buffer 110.
   c. Write VCU control word.
   d. Interrupt VCU to start transfer.
   e. Return from interrupt and proceed with background processing.
2. Receive "end of TX DMA transfer" interrupt. This signals that the VCU to transmit buffer transfer is complete. The TX DMA process is invoked.
   a. Read VCU status word.
   b. Write code word to the transmit buffer 110.
   c. Initialize and enable DMA transfer from the transmit buffer 110 to the modem 19, 30a pointing to voice preamble, code word and voice data block.
   d. Return from interrupt and proceed with background processing.
3. Receive "end of TX DMA transfer" interrupt. This signals that the first half slot transfer from the transmit buffer 110 to the modem 19, 30a is complete. The TX DMA process is invoked.

a. Select VCU port address and enable DMA transfer from VCU to transmit buffer.
b. Write VCU control word.
c. Interrupt VCU to start transfer.
d. Return from interrupt and proceed with background processing.

4. Receive "end of TX DMA transfer" interrupt. This signals that the VCU-to-transmit buffer transfer is complete. The TX DMA process is invoked.
  a. Read VCU status word.
  b. Initialize and enable the DMA controller 120 for transmit buffer to modem transfer.
  c. Return from interrupt and proceed with background processing.

Receive Function—RCC

1. Receive "end of RX DMA transfer" interrupt. This signals that processing of the previous slot is complete and that processing of the next slot can begin. The RX DMA process is invoked.
  a. Setup for BPSK modulation. This information is required by the symbol to byte converter 126. The modem 19, 30a will have already received this information at this time.
  b. Initialize and enable DMA transfer from the modem 19, 30a to the receive buffer 115 for the RCC message.
  c. Return from interrupt and proceed with background processing. AGC calculation and bit sync ambiguity processing should take place at this time.

2. Receive "end of RX DMA transfer" interrupt. This signals that the RCC transfer from the modem 19, 30a to the receive buffer 115 is complete. The RX DMA process is invoked.
  a. Copy RCC into local RAM.
  b. Return from interrupt and proceed with background processing. Prepare to pass received RCC on to the RPU if unique word is detected and the checksum is correct.

Receive Function—Voice

1. Receive "end of RX DMA transfer" interrupt. This signals that processing of the previous slot is complete and that processing of the next slot can begin. The RX DMA process is invoked.
  a. Setup for voice data with correct modulation. This information is required by the symbol-to-byte converter 126. The modem will have already received this information at this time.
  b. Initialize and enable DMA transfer from the modem 19, 30a to the receive buffer for the first half slot of voice data.
  c. Return from interrupt and proceed with background processing. AGC calculation, bit sync ambiguity and code word processing should take place at this time.

2. Receive "end of RX DMA transfer" interrupt. This signals the first half slot transfer from the modem 19, 30a to the receive buffer 115 is complete. The Rx DMA process is invoked.
  a. Select VCU port address and enable DMA transfer from the receive buffer 115 to the VCU. Interrupt VCU to start transfer.
  b. Return from interrupt and proceed with background processing.

3. Receive "end of RX DMA transfer" interrupt. This signals that the first half slot transfer from the receive buffer 115 to the VCU is complete. The RX DMA process is invoked.
  a. Initialize and enable the DMA controller 121 for modem-to-receiver buffer transfer for second half slot.
  b. Return from interrupt and proceed with background processing.

4. Receive "end of RX DMA transfer" interrupt. This signals that the second half slot transfer from the modem 19, 30a to the receive buffer 115 is complete. The TX DMA process is invoked.
  a. Select VCU port address and enable DMA transfer from the receive buffer 115 to the VCU. Interrupt VCU start transfer.
  b. Return from interrupt and proceed with background processing.

CCU Software Execution

Software program execution begins as a result of a hardware reset and the flow starts in the supervisor module. The supervisor module takes care of any hardware and software initialization before entering a main service loop. The supervisor module performs some basic self test functions after a hardware reset and upon request from the RPU. The main service loop access the other modules in sequence. The supervisor module design is such that tasks are subdivided into manageable time-slices, guaranteeing that the main service loop has a reasonable worst case periodicity. Tasks requiring a real time response are handled via interrupt service routines.

Each interrupt service routine performs the minimum of processing to satisfy the service request. This is done to preserve the serial nature of program execution as much as possible and to keep interrupt queueing to a minimum. Typically an interrupt service routine will transfer data to or from an interface and set a boolean to indicate that the action has been performed. Serially executed code, accessed from the main service loop, then proceeds to process that information as required.

The CCU microcontroller 111 is a data flow machine in that software events are driven by the arrival and departure of data. Precise system timing provides the framework for this data flow; however, software events are derived directly from the flow of data and not from system frame markers. This approach allows the software to respond to "real" events (such as data I/O requests) rather than "artificial" events (such as system timing markers). The software relies upon the hardware to convert the former's asynchronous actions into events which are synchronous with the system frame timing. For this to work, it is necessary that the software guarantee to have things initialized and ready before the system frame event occurs.

It is therefore apparent that, while the CCU software is not heavily loaded, it is called upon to respond to events and complete certain tasks within a limited amount of time. This real time processing is interrupt driven and hence requires considerable care in its design. There are four potentially conflicting real time events demanded on the microcontroller: transmit DMA servicing, receive DMA servicing, transmit RS-232 servicing and receive RS-232 servicing. The RS-232 interrupts have the lowest priority since they occur at a maximum rate of one per millisecond. The software is designed so that the one millisecond time constraint is not violated. Response times for voice and RCC data handling are more critical and a discussion of these follows.

The relative timing for the data transfers on the transmit bus and receive bus are shown in FIGS. 23 and 24. The diagrams are drawn approximately to scale and show a worst case timing scenario. The time multiplexed nature of the transmit and receive buses is clearly illustrated by the diagrams. The dark cross lines shown on the transmit and receive paths correspond to the microcontroller activity on the respective bus ($t_S$, $t_{RCC}$) During this time, the respective DMA controller 120, 121 is idle. The short periods of time between DMA controller setups ($t_{VCB}$) corresponds to VCU block transfers. During this time, the DMA controller is dedicated to the respective VCU. For the remainder of the time ($t_{M0}$, $t_{M1}$, $t_{M2}$, $t_{M3}$) the DMA controller 120, 121 is dedicated to serving the modem interface.

The reclocking FIFO stacks 128, 129 at the modem interface create the primary timing constraint implicit in the timing diagrams. The FIFO stacks hold 16 symbols, providing one millisecond of buffering time before underflowing (TX) or overflowing (RX). During this millisecond, the CCU can use the transmit or receive buses 107, 108 to complete block transfers to and from the VCU or copy RCC data into local RAM.

Upon power-up, the CCU software performs an internal self test and places the VCU, modem and RFU into their default states. The microcontroller 111 monitors the system frame timing and begins to perform block transfers to allow the VCU to gain synchronization. Once data transfers are initiated, the microcontroller 111 uses the DMA end of block interrupt to retain system timing. This interrupt is directly tied to the data throughput of the CCU and hence the 16 KHz symbol clock 130. The VCU retains system timing implicitly via DMA transfer requests generated by the microcontroller 111 as a result of the end of block interrupt. The microcontroller 111 continues to monitor frame timing to ensure that proper system operation is maintained.

At the subscriber station, system startup also entails radio synchronization. This is performed by locating the RCC and deriving system timing from it. Once receive timing is established, the microcontroller 111 to establish transmit timing with the base station.

The data transfer module supports the real time and background data transfer events in the CCU. Data transfers are serviced for the transmit data path, the receive data path, the transmit BCC and the receive BCC. All of these tasks are interrupt driven events requiring real time response. The module also performs synchronization acquisition and monitoring as a background task.

The transmit data path handler is invoked when the transmit DMA controller 120 requires service. This typically occurs following a DMA block transfer, at which time the DMA peripheral invokes an end of block transfer interrupt. The interrupt is received on one of the two external interrupt lines of the Model 8031 microcontroller 111. The service required by the interrupt depends on the type of data transfer, RCC or voice, and the time of occurrence within the slot.

The transmit data path interrupt occurs at predictable times during each slot period. The interrupt times and durations are shown on FIGS. 23 and 24. At each occurrence, the microcontroller 111 is required to initialize the DMA peripheral for the next block transfer. This operation should be performed within 150 us from interrupt request to interrupt completion. In the case of RCC data, the first service request requires the microcontroller 111 to format the RCC message in the transmit buffer 110 prior to the DMA transfer. This operation must be completed within 900 us. Since the operations on the transmit path are usually short and require fast response, the interrupt is given the highest priority.

The only output from the transmit data path interrupt handler is the VCU status word collected after the VCU block transfer. This status word is analyzed by software in the BBM control module.

The receive data path handler is invoked when the receive DMA controller 121 requires service. This typically occurs following a DMA block transfer, at which time the DMA peripheral invokes an end of block transfer interrupt. The interrupt is received on one of the two external interrupt lines of the 8031 microcontroller 111. The service required by the interrupt depends on the type of data transfer, RCC or voice, and the time of occurrence within the slot.

The receive data path interrupt occurs at predictable times during each slot period. The interrupt times and durations are shown in FIGS. 23 and 24. At each occurrence, the microcontroller 111 is required to initialize the DMA controller 121 for the next block transfer. This operation should be performed within 150 microseconds from interrupt request to interrupt completion, if DMA initialization is the only task to be performed. In the case of RCC data, the last service request requires the microcontroller 111 to copy the RCC message from the receive buffer 115 to the local RAM after the DMA transfer. This operation must also be completed within 900 microseconds. Since transmit path servicing can occur during this time, receive path interrupts have a lower priority than those of the transmit path. The receive data path interrupt handler makes the VCU status word available after each VCU block transfer. This status word is analyzed by software in the BBM control module. The handler also reads new RCC messages from the channel, which are then interpreted in the BCC transceiver module.

The BCC receive module is implemented via the on-chip RS 232 UART. The UART is capable of generating one internal interrupt, which is triggered whenever a byte is received or transmitted. The BCC handler polls a status bit to determine which of the two cases caused the interrupt and proceeds to service the port accordingly.

The baud rate generator is programmed for a nominal rate of 9600 baud, resulting in a maximum of 1920 interrupts per second. Each interrupt must be serviced within a 1 ms period to avoid data loss. Since the typical interrupt frequency is low and the response time relatively long, BCC data transfer interrupts have a low priority.

The BCC data transfer handler uses pointers to queue and de-queue data as it is received and transmitted respectively. Only link level processing occurs here, including byte stuffing and end of message insertion. These actions are described in the system interface specification.

Very little data processing occurs in the BCC transceiver module. Its main task is to queue and de-queue data while handling the transmit, receive and BCC data paths. The data synchronization acquisition and monitoring, described below, comprise the major processing functions of the BCC transceiver module.

Sync word detection implies a synchronization operation at the symbol level. The term "sync word" is a generic, applying to both the unique word in the RCC and the code word in voice channels. The unique word (UW) is a fixed 8-bit pattern placed at the beginning of an RCC message. A code word (CW) is currently any one of 8 possible 8-bit patterns placed at the beginning of a voice channel. In addition to their synchronization role, code words are used to indicate connection status, power adjustments and ranging adjustments.

The base CCU must exhaustively check for a valid RCC message in every slot. It performs this task by scanning for the unique word in a window ±3 symbols about the nominal UW location, based upon master system timing. The search algorithm starts with the nominal UW position and shifts one symbol right and left until it (1) finds the UW pattern and (2) verifies a correct RCC checksum. The search terminates as soon as (1) and (2) are satisfied or all possibilities have been exhausted. The shift information, RCC message and power information are sent to the RPU following a successful search.

During every voice slot, the base station CCU checks the received voice data for a valid code word. Only the nominal code word position is checked since no active symbol synchronization is performed during voice operation. If no code word is detected for five consecutive frames then the channel is declared out of sync and the RPU is informed of the condition. It is up to the RPU to take any appropriate action at this point. Sync is defined to be restored after three-out-of-five consecutive frames have successful code word detection.

The subscriber CCU, when receiving RCC data, can be in one of two modes: "frame search" or "monitor". The frame search mode is used to acquire receive frame timing from the incoming RCC data and is invoked automatically when receive RCC sync is lost. The monitor mode is entered whenever receive frame synchronization has been acquired.

When in the frame search mode, the subscriber CCU must exhaustively check for a valid RCC message after every RCC slot. Like the base CCU, it performs this task by scanning for the unique word in a window ±3 symbols about the nominal UW location, based upon timing derived from modem AM hole detection. The search algorithm starts with the nominal UW position and shifts one symbol right and left until it (1) finds the UW pattern and (2) verifies a correct RCC checksum. The search terminates as soon as (1) and (2) are satisfied or all possibilities have been exhausted. The shift information from a successful search is used to adjust the CCU generated receive framing markers. Acquisition terminates when (1) and (2) above are satisfied for three consecutive frames with the UW in its nominal position. The STU is informed of framing acquisition when it occurs. RCC messages are not forwarded to the STU during frame search mode.

When framing acquisition is accomplished, the subscriber station CCU enters the monitor mode. Only the nominal UW position is checked to avoid the possibility of false UW acquisitions. If no UW is detected for five consecutive frames then the channel is declared out of sync and frame search mode is entered. The STU is informed of this out of sync condition. During the monitor mode, RCC messages that have a correct checksum and SIN number are passed on to the STU.

During every voice slot, the subscriber station CCU checks the received voice data for a correct code word. Only the nominal code word position is checked since no active symbol synchronization is performed during voice operation. All possible code words are searched for in this direction of the channel. Code words can cause incremental changes in the subscriber station's power and ranging values. Incremental range changes can actually result in the change of symbol as well as fractional ranging values. If no code word is detected for five consecutive frames then the channel is declared out of sync and the STU is informed of the condition. Sync is defined to be restored after three-out-of-five consecutive frames have successful code word detection.

Additional CCU Considerations

The transmit DMA transfer request between the transmit buffer 110 and the modem 19, 30a must be derived from the full bit of the FIFO stack 128. This implies that the FIFO stack 128 will always be full when a DMA block transfer is complete.

The receive DMA transfer request between the modem 19, 30a and the receive buffer 115 must be derived from the empty bit of the stack 129. This implies that the FIFO stack 129 will always be empty when a DMA block transfer is complete.

The CCU controller software provides the gate to enable DMA transfers, but external control must provide the handshaking to initiate and maintain the block transfer. This is particularly important for the modem interface where frame timing is critical.

The microcontroller 111 should have the capability to put a DMA transfer on hold. The software will not attempt to use the DMA bus during a block transfer unless this control is exerted or the DMA peripheral is idle.

The reclocking FIFO stacks 128, 129 should be automatically cleared (reset) periodically.

Frame timing information must be available to the microcontroller 111. This could take the form of a symbol clock input to an internal timer of the microcontroller.

When an RCC or voice packet is received by the CCU in sync, no symbol shifting should be required to bring the packet onto a byte boundary. This should apply regardless of modulation level.

Modem

The modem operates in one of three operation modes. In the base station, the modem carries on a full-duplex transmit and receive function. When operating in the subscriber station, the modem operates in a half-duplex mode, transmitting during part of the TDMA frame and receiving during another part of the TDMA frame. The third mode is a self-adapting training mode. One modem design accommodates all these functions. The modem performs the appropriate function in response to keying signals coming in from the controlling CCU.

The subscriber station modem 30a and the base station modem 19 are identical. A block diagram of the modem is shown in FIG. 25.

The modem transmitter sections include a TX symbol filter 132, a digital-to-analog (D/A) converter 133, a 200 KHz bandpass filter 134, a mixer 135 and a TX (transmitter) timing control circuit 136. The receiver section of the modem includes a mixer 138, an analog-to-digital (A/D) converter 139, a FIFO stack 140 and a Model TMS 320 microprocessor 141.

The modem transmitter section transmits the information fed to it by the CCU at 16-level PSK modulation. It is up to the CCU on the receive side to interpret the data as DPSK, QPSK or 16 PSK. The modem transmits without the knowledge of the modulation level.

The modem transmitter section is fully implemented in hardware and requires no adjustments. Symbols received from the CCU are encoded and their corresponding waveforms are shaped to provide good interference properties and not suffer amplitude or group delay distortion. The justification of this concept is made on the assumption that in the near neighborhood frequency band (within 50-100 KHz) to the band utilized there are no strong interfering signals (power densities of 30-40 dB above the signal). The modem transmitter section utilizes relatively wide IF filtering (100 KHz) so that the transmitted signal will not suffer amplitude or group delay distortion, and also filters out any harmonics generated by the digital filtering done at baseband.

The TX symbol filter 132 is a fixed-coefficient digital FIR (Finite-duration impulse-response) Filter. This filter 132 simulates a six pole filter with a sampling rate of 50 samples per symbol per 6 symbol stay in the FIR Filter.

The modem receives symbols from its respective CCU at a rate of 16 K symbols/second. These symbols are then converted to a DPSK code for input on line 143 to the FIR filter 132. The FIR algorithm requires that every other symbol be inverted before entering into the FIR filter. Gray code is used for the DPSK coding. This insures that if a symbol was received in error, there is a good probability that the two symbols to the receiver codec will be in error by only one bit.

The impulse response of the FIR filter 132 is truncated at 6T (T=1/16 KHz). The FIR filter oversamples the symbols at a rate of 800 KHz so that every symbol is sampled 50 times during its 5T stay in the filter. This is equivalent to a sampling rate of 3T/25 where the sampling period is T/25, so that samples are output each 3T/25 period. The outputs are skewed such that only the first and fourth, second and fifth, or third and sixth pairs of samples overlap at any one time. Each of these T/25 length samples is actually divided into two parts. During the first half of the sample period, the I portion of the output is computed and during the second half of the period, the Q portion of the output is computed. Thus, the actual rate at which the FIR filter 132 outputs data is 50×16 KHz=800 KHz. The I and O sampling is staggered by one-half a sample period, but this is corrected by the FIR filter 132.

Signals representing the multiplication of symbols and impulse responses in the FIR 132 filter and the addition of two of these multiplications are provided by an 8K×8 ROM on line 144 in response to the symbols that are received on line 143.

The FIR filter 132 outputs 10 bit digital samples on line 144 at the rate of 800 KHz. These values are the fed into the D/A converter 133 to create an analog waveform on line 145. This waveform is the time-shared I and Q waveforms of the symbol to be transmitted. This shared waveform on line 145 is filtered by the 200 KHz bandpass filter 134 then fed over line 146 into the mixer 135. The mixer's local oscillator input is an IF frequency signal of 20 MHz on line 147. The I and Q components are thereby upconverted to 20.2 MHz IF output signal on line 148. The output signal on line 148 is fed through a 20.2 MHz bandpass filter (not shown) and provided to the RFU 21, 31a.

The desired signal out of the D/A converter 134 is centered at 200 KHz with a bandwidth of about 32 KHz. By multiplying the 200 KHz waveform by 20 MHz, the output waveform mixes the I and Q samples with the SIN and COS components of the IF frequency. Thus, the 20 MHz signal can directly multiply the output waveform and the exact component multiplications will be handled automatically. Therefore, there is no need for a discrete SIN(IF)/COS(IF) generation circuit to multiply the I/Q samples from the D/A as is in the receiver. This also removes isolation feed through in the mixer from the baseband to the output of the mixer.

The output data stored in the transmitter FIR filter 132 is computed to correct for any errors that may occur due to the 1/50 T difference in the I and Q time values. Also the IF filter in the RFU (FIGS. 28 and 29) adds the two values together to form the correct transmitted waveform since its bandwidth is relatively small compared to the IF frequency.

In the modem receiver section, the mixer 138 mixes an analog waveform received from the RFU on line 150 via a 20 MHz bandpass filter (not shown) with a 20 MHz IF signal on line 151 to down convert the analog signal to baseband on line 152. The analog signal is then converted by the A/O converter 139 to a digital signal on line 153 which is buffered in the FIFO stack 140 for processing by the microprocessor 141. The microprocessor 141 performs frequency and bit tracking of the received digital signal and also performs the FIR filtering and demodulation of the signal into a binary symbol stream that is provided on line 154 to the CCU.

In addition to the analog and digital data signals which are processed by the modem, a number of control and status signals are sent to and from the modem. These signals generally are sent to the modem from the CCU. The modem also sends control signals to the RFU to control such functions as the transmit power level, frequency, AGC, and antenna switching for diversity.

The modem interfaces are shown in FIGS. 26 and 27. The modem receives most of its inputs from the CCU. Other inputs are from the RFU and the timing units. The modem inputs are as follows:

The following lines carry the signals described to the modem 19, 30a from the CCU 18, 29:

The TX DATA lines 156 carry a 4 bit symbol to be transmitted by the modem (2 bits for QPSK, 1 bit for BPSK). The MOD BUS 157 is a bidirectional microprocessor bus that provides control/status information to/from the modem. The MOD WR line 158 carries a control signal to the latch MOD BUS into the modem. The MOD RD line 159 carries a control signal to put modem status and other information onto the MOD BUS for transmission to the CCU 18, 29. The MOD RESET line 160 carries a control signal to reset the modem. The MOD ADD lines 161 carry address signals to different locations to latch values inside the modem. The TX SOS line 162 carries a signal to begin transmitting a TX slot. The RX SOS line 163 carries a signal to begin receiving an RX slot.

The IF RECEIVE line 165 carries an IF receive frequency input signal to the modem 19, 30a from the RFU 21, 31a.

The following lines carry the signals described to the modem 19 from the STIMU 35. The 80 MHZ line 167 carries an 80 MHz ECL clock signal. A like signal is provided to the modem 30a by a timing unit (not shown) in the subscriber station. The 16 KHZ line 168 carries a master TX CLK signal used in base station. The SOMF line carries a master start of frame signal in the base station from STIMU. This signal is not used in the modem, but forwarded to the CCU 18, 29.

The following lines carry the signals described from the modem 19, 30a to the CCU 18, 29. The TX CLK line 171 carries a 16 KHz clock signal that provides the CCU with the symbol transmit timing. Symbols are clocked into the modem with the rising edge of this clock. In the base station, all slots have the same master TX CLK. Thus all signals from the base station are sent at the same time. In the subscriber station, the TX CLK is offset by the fractional range delay by the modem on information supplied by the CCU. The RX CLK line 172 carries the 16 KHz clock signal that is derived from the received signal. This signal is always provided in the subscriber station, but is provided only during control slot acquisition in the base station.) This clock signal clocks out the received symbol to the CCU and provide symbol timing to the CCU. The RX DATA lines 173 carry the four bit received symbol, clocked by RX CLK signal. The MOD BUS 157 carries status and data information from the modem. The MOD SOMF line 175 forwards the SOMF signal from the STIMU to the CCU in the base station. The AM STROBE line 176 carries a high to low transition to give the CCU a rough frame marker during RCC acquisition in the subscriber station. This is a one shot line that is pulsed when the microprocessor 141 determines the approximate location of the AM hole.

The following lines carry the signals described from the modem 19, 30a to each RFU 21, 31a. The RF RX BUS 178 is an 8-bit bus between the modem and RFU section. This bus conveys AGC and frequency select information to the RF RX section. The modem controls AGC values to be sent, and forwards CCU frequency selection information. The frequency select information is fed to the modem by the CCU over the MOD BUS 157. During training mode, the modem will control the RF RX frequency selection. The RF TX BUS 179 is an 8-bit bus between the modem and the RFU TX section. This bus conveys TX power level and frequency select information to the RFU TX section. The modem has nothing to do with these, thus the information is only forwarded to the RF TX section. The RX 80 MHZ REF line 180 carries an ECL 80 MHz reference clock signal to the RFU RX section. The TX EN line 182 to the RFU TX section carries a signal to enable RF transmission. The RX EN line 183 to RFU RX section carries a signal to enable RF reception. The AGC WR line 184 carries a write strobe to latch AGC data into RFU RX section. The RXFREQ WR line 185 carries a write strobe for frequency writes to the RFU TX section. The PWR WR line 186 carries a write strobe to latch power information into RFU TX section. The PWR RD line 187 carries a read strobe to read back power information from the RFU TX section. The TXFREQ RD line 188 carries a read strobe to read back transmit frequency from the RFU TX section. The TXFREQ WR line 189 carries write strobe frequency writes to the RFU TX section. The IF TRANSMIT line 190 carries the transmitted signal at IF frequency to the RFU.

The following lines carry the signals described from the modem 19 to the STIMU 35. The VCXO BUS 192 is a 20-bit data bus to a VCXO in the STIMU 35 with control information for frequency tracking. The VCXO WR line carries a write pulse to the VCXO circuit for latching the VCXO BUS 192 into the VCXO. Like signals are carried from the modem 30a to a timing unit (not shown) in the subscriber station.

The base station modem operation is assigned to a fixed RF frequency. Communication at the base station is full duplex, therefore the modem receiver and transmitter will be operating simultaneously. A modem also is assigned to be the control frequency channel modem, thus only transmitting and receiving information with the radio control channel (RCC) format during the allocated control slot period. All transmissions from the base station modems are clocked to the master TX CLK signal at 16 KHz on line 171. Unlike the subscriber modems, the base station modems 19 output to the CCU 18 the fractional part of the symbol time between the master TX CLK signal on line 171 and the derived RX CLK signal on line 172 in the modem 19. This information is then sent to the subscriber station in the RCC so that the subscriber station will delay its transmission in order that is signal is received at the base station synchronous with all other slots.

The base station modem 19 also transmits a null energy signal in the control slot to provide the RCC AM hole (which establishes a frame reference) when the RFU transmits a null energy signal. This no-carrier portion of the RCC transmission is used for initial RX acquisition at the subscriber station.

The modem 19 is unaware of the fact that there are four voice codecs in the base station, multiplexed by the CCU 18, for four 16 PSK subscriber slot assignments. The modem 19 accepts the bit stream from the CCU 18 and treats the transmission just as a single codec subscriber.

All operations in the subscriber station modem 30a are derived from the received RX CLK signal on line 172 which is recovered from the received transmission. This serves as the master clock of the subscriber station. The TX CLK signal on line 171 to the CCU 29 is not a master clock as in the base station. It is derived from the RX CLK signal on line 172 and delayed by the fractional time as selected by the CCU 29. The CCU 29 determines the delay from the RCC. The delay is determined by the distance between base and subscriber stations. The subscriber station CCU 29 feeds this fractional time information to the modem 30a through MOD BUS 157. The modem 30a itself accounts for the fractional delay. The CCU 29 accounts for the integer symbol delay be insertion of the TX SOS signal on line 162 delayed by the correct number of symbols. This process aligns the signals arriving at the base station from variations in the range of all subscriber stations.

Communication is half-duplex at the subscriber station. Thus, when the transmitter is idle, it is inhibited. The modem 30a, when not actively transmitting, is set to its receive mode and can thus monitor the gain levels of the receive signal to be prepared when a burst arrives from the base station.

The subscriber station modem 30a does not transmit an AM guard band for the RCC slot. None is required since the base station defines the frame. Unlike the fixed frequency base station modems 19, subscriber station modems 30a also can transmit or receive data over any one of the 26 frequencies selected in the RFU by the CCU 29.

There are many sources of delay in the modem that have a pronounced affect upon the system timing. Such things include analog filter delays, propagation delays, FIR filter processing delays, etc. These delays skew the TX and RX frames from one another, and these skews must be taken into careful account.

The delay between the TX SOS signal on line 162 in the base station and the first received analog symbol "peak" at the base station is +7.4 symbols. Therefore, there is a skew between TX and RX slots. To correctly decode the incoming phase, the modem must begin sampling about 3.5 symbols before the "peak" arrives. Therefore, the skew between TX SOS signal and the beginning of RX sampling is about 4 symbols in length.

At the base station, the start of the RX slot occurs about 4 T after the start of the TX slot. The RX slot start is defined as the time the first analog sample is taken in order to detect the first "peak" that is received.

The subscriber station clocks are derived completely from a master 80 MHz VCXO in the subscriber station timing unit (not shown). The VCXO is controlled by an analog line from the modem 30a. From this, all receive and transmit clocks are calculated. The modem 30a then provides the CCU 29 with the 16 KHz RX CLK signal on line 172 derived from the incoming data stream. The CCU 29 itself detects the unique word in the control channel and can determine frame and slot markers from the unique word and the RX CLK signal on line 172. The AM hole signal from the signal demodulated by the modem informs the CCU 29 where to look for the unique word.

During the reception of any slot, the modem 19, 30a performs frequency synchronization by acquisition and then continues tracking. In the subscriber station, the VCXO is under direct control of the microprocessor 141 through a D/A converter. The microprocessor frequency acquisition and tracking algorithms compute the changes in the VCXO necessary to maintain synchronization.

In the base station, an OCXO located in the STIMU 35 is fixed and acts as the master clock of the system. Therefore, no frequency deviations will occur on reception.

During the receipt of any slot, the modem 19, 30a also performs bit synchronization on the bit sync scramble of the received data stream. An algorithm performs a bit tracking loop inside the receiver. The microprocessor 141 has control over a variable frequency divider of the 80 MHz VCXO or OCXO (only during control slot demodulation). Inside of the bit tracking loop, the microprocessor 141 modifies the frequency division in order to obtain bit synchronization. During the reception of a voice channel, the division values have step sizes of 0.1% of 16 KHz, but during a control slot the values may change more drastically, as much as +/−50%.

Frame synchronization is handled in completely different ways in the base station and the subscriber stations. In the base station, the master SOMF (start of modem frame) signal is forwarded to the CCU 18 on line 175 from the timing unit on line 169 via the modem 19. This is the master SOMF signal used for all transmission from the base station. From this and the master system symbol clock signal (16 KHz), the CCU 18 can derive all slot and frame timing.

In the subscriber station, frame synchronization is done by the CCU 29 with the detection of the unique word in the received RCC data stream. Upon initial acquisition, the modem 30a provides a one shot, approximate frame marker (AM STROBE) on line 176. During acquisition, the modem 30a searches for the AM HOLE in the RCC. IF the AM HOLE is detected, the modem 30a counts it for a few frames and then provide the AM STROBE marker on line 176 to the CCU 29 at the frame location of the AM HOLE. The CCU 29 uses this strobe marker to set up initial frame marker counters (windowing) that can be modified by CCU software for exact frame sync. This also signifies that the AM HOLE was detected and the RCC is acquired.

Slot synchronization is under the control of the CCU 18, 29. The signals TX SOS on line 162 and RX SOS on line 163 are commands to the modem 19, 30a to begin the transmission or reception of a slot. These signals are synchronized to the TX CLK signal on line 171 and the RX CLK signal on line 172 respectively.

The self adapting mode is a looped-back state that the modem enters to train the receiver's digital FIR filter coefficients to correct for any receive analog filter degradations that may occur in time or with temperature. The analysis is done by looping back the transmitter data through the RF unit and receiving a known pattern in the receiver. The coefficients are optimized over a 5 constraint LaGrangian system. These constraints are (1) the received data stream; (2) the data stream delayed by 0.05 T; (3) the data stream advanced by 0.05 T; (4) the data stream from the adjacent upper channel; and (5) the data steam from the adjacent lower channel.

During training, the microprocessor 141 provides to the TX FIR filter 131 on line 143 a series of 32 symbol long training patterns. This is done via a FIFO stack (not shown) that is enabled during the training mode. Advances/delays are done by the receive bit track circuitry that will skew the two streams by 0.05 T.

The CCU 18, 29 places the modem 19, 30a into the training mode to allow the modem transmitter section to read special training data from the FIFO stack on board the modem. The receiver section will be advanced/delayed for some of the tests. When the process is complete, the modem sends a status message to the CCU 18, 29 that the coefficients are computed. At this time, the CCU 18, 29 tests the modem by placing it in normal operation and writing out a set pattern, commanding the RFU 21, 31a to loopback, and read the returned data and test for validity.

The modem is described in further detail a co-pending U.S. patent application entitled "Modem for Subscriber RF Telephone System" filed on even date herewith by Eric Paneth, David N. Critchlow and Moshe Yehushua, the disclosure of which is incorporated herein by reference.

RF/IF Unit (RFU) and Antenna Interface

The RFU subsystem provides the communications channel link between the modem and the antenna in both the base station and the subscriber station. The RFU functions as a linear amplitude and frequency translator and is essentially transparent to the channel data and modulation characteristics.

Figure 28:
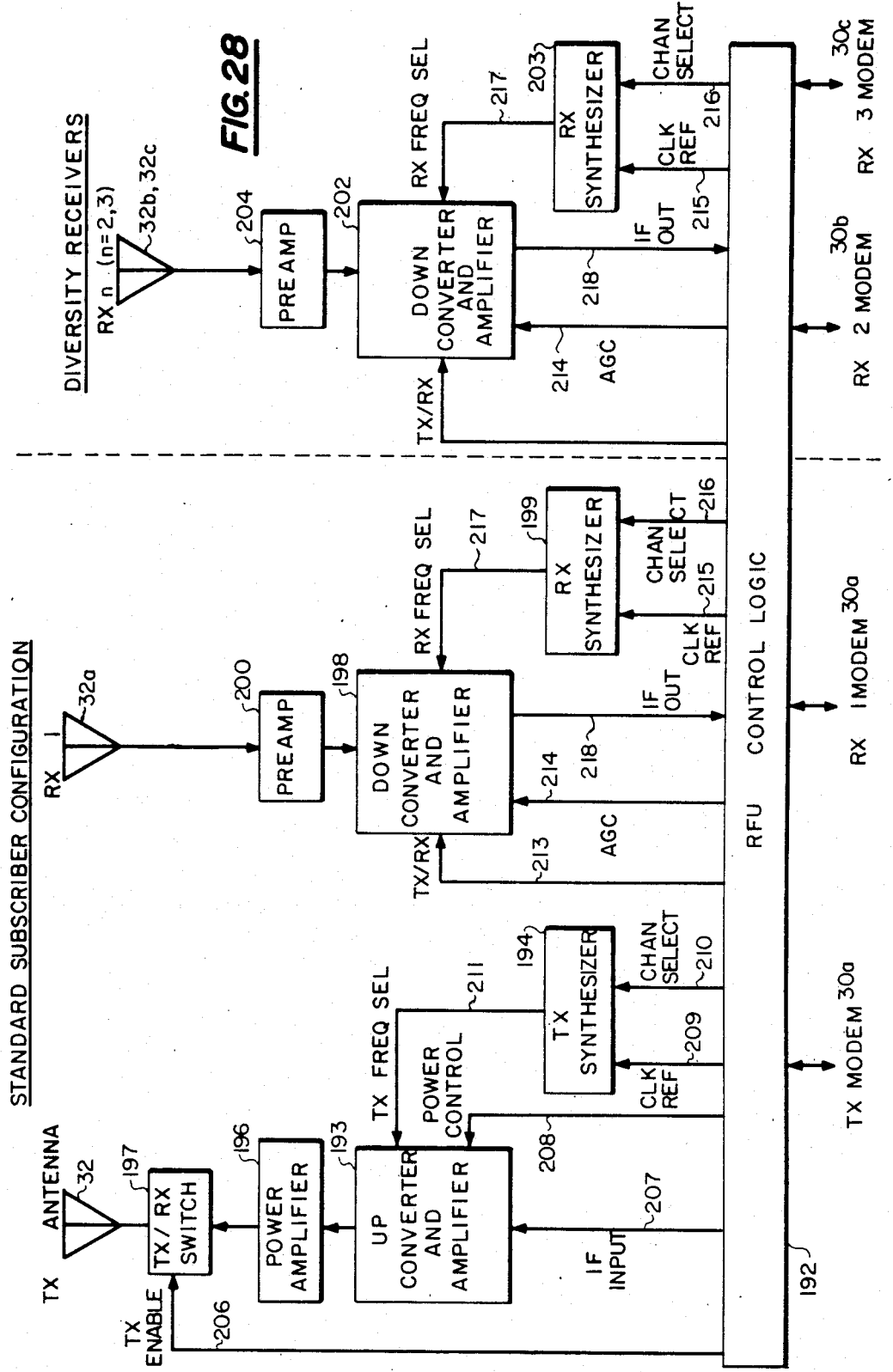
FIG. 28 is a block diagram of the antenna interface circuit for the subscriber station of FIG. 3.

The antenna interface circuit for the subscriber station is shown in FIG. 28. A RFU control logic circuit 192 is coupled to the transmitter antenna 32, and the three receiver antennas 32a, 32b and 32c by the antenna interface circuit. The RFU control logic circuit 192 is also interfaced with the transmit section of the modem 30a, and the receive sections of the modems 30a, 30b and 30c. Actually, 32 and 32a are the same antenna.

The transmitter section of the antenna interface includes an up converter and amplifier circuit 193, a TX synthesizer 194, a power amplifier 196 and a TX/RX mode switch 197. A first receiver section RX 1 of the antenna interface includes a down converter and amplifier 198, a RX synthesizer 199 and a preamplifier 200 which is connected to switch 197. Each additional diversity receiver section, TXn (n=2, 3) includes a down converter and amplifier 202, a RX synthesizer 203 and a preamplifier 204.

The RFU control logic circuit 192 provides the following signals to the transmitter section of the antenna interface circuit in response to the signals received from the transmit section of the modem 30a: (1) a TX enable signal on line 206 for causing the TX/RX switch 197 to enable transmission by the transmitter antenna 32; (2) an IF input signal on line 207 to the up converter and amplifier 193; (3) a power control signal on line 208, also up to the up converter and amplifier 193; (4) a clock reference signal on line 209 to the TX synthesizer 194; and (5) a channel select signal on line 210, also to the TX synthesizer 194. The TX synthesizer 194 responds to the channel select signal on line 210 by providing a TX frequency select signal on line 211 to the up converter and amplifier 193 that is equal to the difference between the desired transmit frequency and the modem IF frequency.

The RFU control logic circuit 192 provides the following signals to each of the receiver sections of the antenna interface circuit in response to the signals received from the respective receive sections of the modems 30a, 30b and 30c: (1) a TX enable signal on lines 213 to cause the down converter and amplifier circuits 198, 202 to operate in the receive modes; (2) an automatic gain control (AGC) signal on lines 214 to the down converter and amplifier circuits 198, 202; (3) a clock reference signal on lines 215 to the RX synthesizers 199, 203; and (4) a channel select signal on lines 216 also to the RX synthesizers 199, 203 respond to the channel select signal on lines 216 by providing a RX frequency select signal on lines 217 to the down converter and amplifier circuits 198, 202 that is equal to the difference between the desired receive frequency and the modem IF frequency. The down converter and amplifier circuits 198, 202 provide IF output signals on line 218 to the RFU control logic circuit 192 for delivery to the receive sections of the respective modems 30a, 30b and 30c.

The up converter and amplifier circuit 193 in the transmitter section receives the modulated IF signal on line 207, amplifies it and translates it to the selected RF channel frequency. A combination of filters (not shown), amplifiers 196, 197 and level control circuits (not shown) is then used to provide the proper output level and suppress undesired signals at the image and harmonic frequencies. The transmitter output frequency is the sum of the modem IF frequency and a conversion frequency synthesized in 25 KHz stops from the reference frequency supplied by the modem.

The subscriber station RFU functions as a half-duplex transceiver with the receivers inactive during the transmit intervals. The transmit burst rate is sufficiently high to simulate full-duplex operation to the user. The frequency channel assigned is that selected by the base station RPU.

Figure 29:
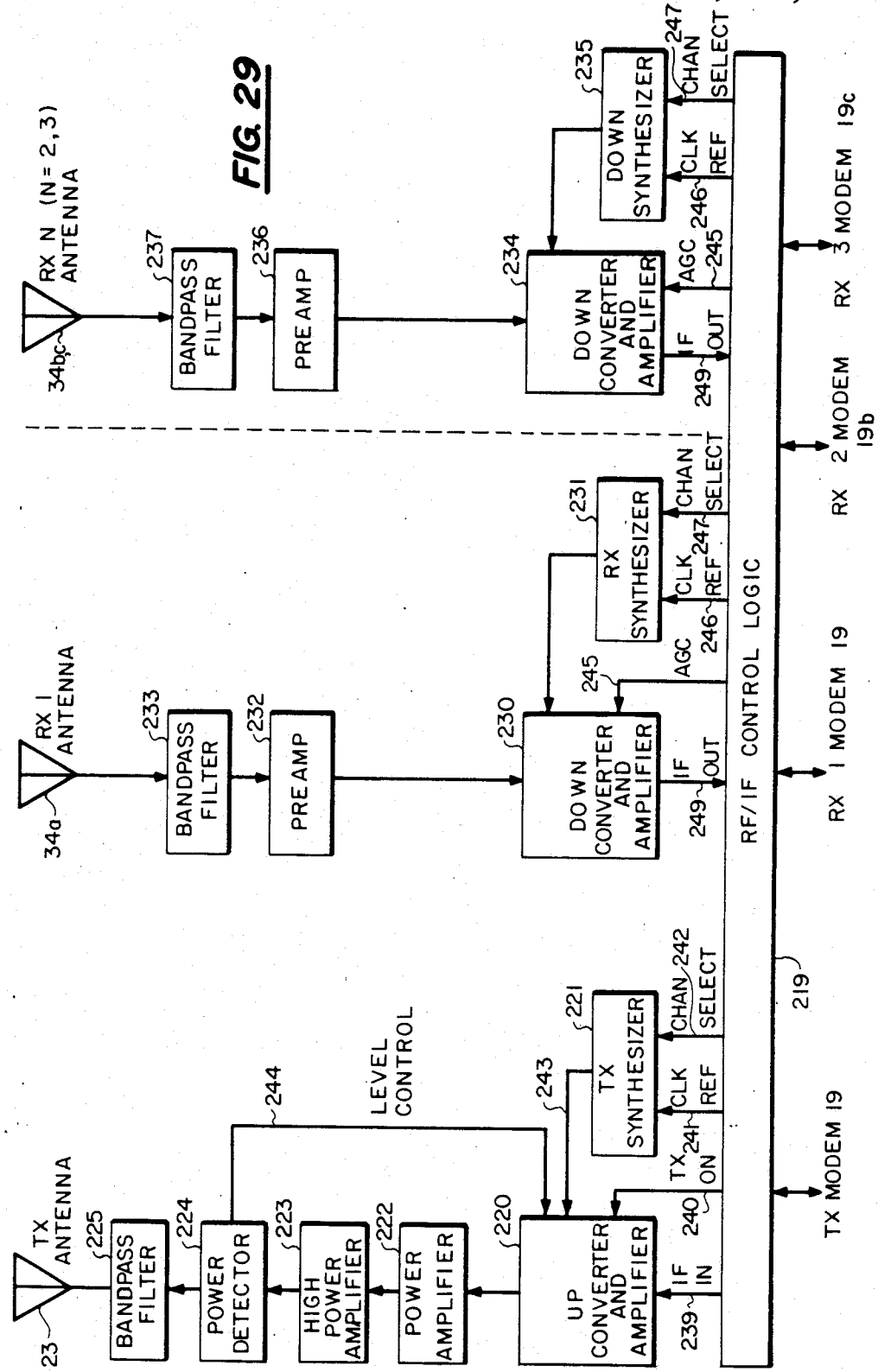
FIG. 29 is a block diagram of the antenna interface circuit for the base station of FIG. 2.

The antenna interface circuit for the base station is shown in FIG. 29. An RFU control logic circuit 219 is coupled to the transmitter antenna 23, and the three receiver antennas 34a, 34b and 34c by the antenna interface circuit. The RFU control logic circuit 219 is also interfaced with the transmit section of the modem 19, and the receive sections of the modems 19, 19b and 19c. (Modems 19b and 19c are diversity modems not shown in FIG. 2.)

The transmitter section of the antenna interface includes an up converter and amplifier circuit 220, a TX synthesizer 221, a power amplifier 222, a high power amplifier 223, in a power detector 224 and a bandpass filter 225. A first receiver section RX 1 of the antenna interface includes a down converter and amplifier 230, a RX synthesizer 231, a preamplifier 232 and a bandpass filter 233. Each additional diversity receiver section, RXn includes a down converter and amplifier 234, a RX synthesizer 235, a preamplifier 236, and a bandpass filter 237.

The RFU control logic circuit 219 provides the following signals to the transmitter section of the antenna interface circuit in response to the signals received from the transmit section of the modem 19: (1) a TX ON signal on line 239 to the up converter and amplifier 220 for turning on the transmission section to enable transmission by the transmitter antenna 23; (2) an IF input signal on line 240, also to the up converter and amplifier 220; (3) a clock reference signal on line 24 to the TX synthesizer 221; and (4) a channel select signal on line 242, also to the TX synthesizer 221. The TX synthesizer 221 responds to the channel select signal on line 242 by providing a RX frequency select signal on line 243 to the up converter and amplifier 220 that is equal to the difference between the desired transmit frequency and the modem IF frequency. A level control signal is provided on line 244 from the power detector 224 to the up converter and amplifier 220.

The RFU control logic circuit 219 provides the following signals to each of the receiver sections of the antenna interface circuit in response to the signals received from the respective receive sections of the modems 19, 19b, 19c: (1) an automatic gain control (AGC) signal on lines 245 to the down converter and amplifier circuits 230, 234; (2) a clock reference signal on lines 246 to the RX synthesizers 231, 235; and (3) a channel select signal on lines 247 also to the RX synthesizers 231, 235. The RX synthesizers 231, 235 respond to the channel select signal on lines 247 by providing a RX frequency select signal on lines 248 to the down converter and amplifier circuits 230, 234 that is equal to the difference between the desired receive frequency and the modem IF frequency. The down converter and amplifier circuits 230, 231 provide IF output signals on line 249 to the RFU control logic circuit 219 for delivery to the receive sections of the respective modems 19, 19b, 19c.

The RFU's in the base station and the subscriber stations are similar with the exception of the additional high power amplifier 223 used to increase the transmit power of the base station RF outputs. The basic function of the RFU's in either station is to convert the modulated IF (20.2 MHz) signal from the modem transmitter section to the desired RF transmission frequency in the 450 MHz UHF range. The receive side of the RF unit performs the opposite action of downconverting the receive 450 MHz UHF signals to an IF signal at 20 MHz. The transmit and receive frequencies are offset from each other by 5 MHz. The RF units are programmed by the CCU control function to operate on different frequencies used in the overall system. Typically, each base station RFU will be set to operate on a given frequency assignment upon system initialization and will not change. The number of RFUs in the base station corresponds to the number of transmit and receive frequency channel pairs supported in the base station. The subscriber station RFUs will typically change frequency of operation with each new phone connection.

The RFUs include variable AGC and transmit power level adjustments. The AGC gain coefficient is provided by the modem based on a computation in the receive section processor 141 in the modem. The subscriber station transmit power level is computed by the CCU based on messages received from the base station on the RCC channel and other control parameters.

If all slots in a frequency channel are not used, the RFU will transmit an idle pattern placed into it by the CCU. If a completed frequency channel is not used, the transmitter for that frequency can be disabled by the CCU software through the modem.

The switching time for the diversity switches shall be less than 50 microseconds.

Three antennas and three separate RF/IF units are provided. (Single transmit, three receive).

Many portions of the base station RFU and antenna interface are identical to those described above for the subscriber station. This subsection emphasizes the differences.

The base station RFUs and antenna interface circuits operate on a full duplex basis. All transmitters and receivers normally operate at 100 percent duty cycle. In addition, it is economically attractive for the base station to operate at higher transmit power and to use lower noise figure receivers with diversity. The transmitter is intended for operation at the highest permitted power level without dynamic control. Receive diversity is provided by multiple receive antennas and multiple modems.

The base station ordinarily does not change operating frequency or transmit power level during normal operation. The transmitter and receiver sections are fully tunable to each of the 26 channels.

The transmit section of the base station antenna interface receives the modulated IF INPUT signal on line 239 from the modem and processes it as in the subscriber transmitter section described above. It is further amplified to the required power level and filtered by a cavity preselector bandpass filter 225. To reduce noise at the operating frequencies of co-located receivers and to reduce spurious emission level.

The base station receive section of the antenna interface is similar to that discussed for the subscriber station except that the front end is preceded by cavity preselector bandpass filters 233, 237, which help to eliminate the desensitization caused by co-located or nearby transmitters. Low noise preamplifiers are also used to reduce the usable threshold signal level. All antennas 23, 34a, 34b, 34c have 30 dB isolation from any other antenna. Additional isolation is provided in the transmit and receive sections to ensure approximately 80 dB of isolation between transmitted signals and received signals. The bandpass filter, preamplifiers and amplifiers are located adjacent to the appropriate transmit or receive antenna.

Diversity Reception Processing

Diversity reception is used to reduce the probability of experiencing a channel fade below an accepted threshold. The diversity system is capable of adding three branch diversity over the subscriber to base and the base to subscriber paths. The diversity hardware at both the base station and the subscriber stations includes a special diversity combiner circuit, three modems and their associated RF units and antennas. Only one modem-RFU-antenna combination has transmit capability. Although the diversity combiner circuit 33 is shown only in the subscriber system diagram of FIG. 2, it is present and connected to the modems and CCU in the base station in the same manner as in the subscriber station.

When operating with diversity reception, the base station or subscriber station uses three receive antennas separated by a distance great enough to insure that the fading characteristics of the signals received will be uncorrelated. These three antennas feed through three identical receiver sections in the antenna interface to the RFU control logic circuit whose IF outputs go into separate modems for demodulation. A TMS 320 microprocessor in the diversity combiner circuit 33 (diversity processor) takes the outputs from the modems and provide a more reliable data stream to the rest of the system in a way that emulates a single modem. The two tasks of performing the diversity combination and appearing as a single modem to the CCU are the responsibility of the diversity processor hardware and software.

The diversity processor reads from the three modems their data symbols, AGC values, signal+noise, magnitude and phase error (deviation of the detected phase from the ideal 22.5 degree reference vectors). The algorithm used to determine the demodulated symbol involves using a majority vote and calculations of signal-to-noise ratios for each modem to identify the modem with the most likely right answer.

The diversity processor-CCU interface registers are almost identical to the registers found in the modems, with the exception that the extra registers used to pass information used in the diversity processing function are not needed and therefore only three address bits are needed.

Because the I/0 capabilities of the TMS320 microprocessor are small, and most of the processing works with one type of I/0 register at a time, a special register which will hold the register address needed at the time is used. For example, the AGC value from each modem must be read, the highest value chosen, and the result written to the diversity processor's I/0 registers where it can be read by the CCU. The addressing of these registers is most efficiently done if the address of the AGC register is first written to a port where it is placed on the modem address lines. Thereafter, the processor need only address the correct modem or the microprocessor register bank, thereby speeding I/0 operations.

In the subscriber station diversity system, each modem has its own timing unit, and the timing signals used by the three modems in the diversity system are not necessarily in phase. Because the modem clock signals of the three modems are not synchronized to each other, latches are needed to hold the data symbol output from each modem until the diversity processor reads it.

An important function of the diversity processor is to maintain communications between the CCU and the three modems. This communication must be done quickly enough so as to meet all of the CCU's requirements but not so fast as to overload the diversity processor.

We claim:

1. A system for processing a given plural number of information signals received simultaneously over telephone company trunk lines for simultaneous transmission over a given radio frequency (RF) channel, comprising separate conversion means for respective connection to said trunk lines for converting the information signals received over said trunk lines into digital signal samples;

a given plural number of separate signal compression means for simultaneously compressing the digital signal samples respectively derived from separate ones of the conversion means to provide said given number of separate compressed signals;

channel control means connected to the compression means for sequentially combining the compressed signals into a single transmit channel bit stream, with each of the respective compressed signals occupying a repetitive sequential slot position in the transmit channel bit stream associated with a predetermined one of the separate compression means;

an exchange for coupling the respective separate conversion means to indicated ones of the separate compression means;

remote-connection processor means for coupling to said trunk lines and responsive to an incoming call request signal received over one of said trunk lines by providing a slot assignment signal indicating which one of the separate compression means the exchange is to connect to the one of the separate conversion means connected to said one trunk line and thereby assigning to said one trunk line the slot in the transmit channel bit stream associated with the one of the separate compression means that is so connected by the exchange means, wherein the remote-connection processor means maintains a memory of which slots are so assigned and consults said memory upon receipt of a said incoming call request and then provides a said slot assignment signal that effects a said connection to a compression means associated with one of the slots that is not assigned to another trunk line;

call processor means connected to the remote-connection processor means and responsive to a said slot assignment signal for causing the exchange to complete the connection indicated by said slot assignment signal; and transmitter means for providing a transmit channel signal for transmission over the given RF channel in response to the transmit channel bit stream.

2. A system according to claim 1, wherein said call request is accompanied by a subscriber identification signal identifying a subscriber station to which the call request is addressed, wherein the remote-connection processor means are responsive to said subscriber identification signal by providing to the channel control means a transmit slot control signal indicating an association between the identified subscriber station and the slot in the transmit channel bit stream assigned in response to said accompanying call request; and wherein the channel control means are connected to the remote-connection processor means and responsive to a said transmit slot control signal by providing in a separate slot of the transmit channel bit stream a remote control message addressed to the subscriber station identified by the transmit slot control signal and indicating the slot containing the compressed speech data signal derived from the speech signal received over the trunk line from which the call request and accompanying subscriber identification signal were received.

3. A system according to claim 2, further comprising a subscriber station including means for receiving and processing said transmit channel signal to reconstruct the information signal received from the trunk line assigned to which the slot of the transmit channel bit stream indicated in the remote control message addressed to the subscriber station was assigned.

4. A system according to claim 3, further comprising receiver means for receiving a receive channel signal and for processing the receive channel signal to provide a receive channel bit stream containing separate compressed signals in different respective repetitive sequential slot positions;

a given plural number of separate signal synthesis means each associated with a different slot position in the receive channel bit stream for reconstructing digital signal samples from separate compressed signals contained in the associated respective slot positions of the receive channel bit stream;

wherein the channel control means segregates the separate compressed signals from the receive channel bit stream and distributes the segregated signals to the separate synthesis means associated with the respective time slots from which the signals are segregated; and separate reconversion means for respective connection to each of said trunk lines for reconverting digital signal samples to information signals for transmission over the respective trunk lines, wherein each of the separate reconversion means is associated with one of the separate conversion means and is connected to a common one of the trunk lines with the associated separate conversion means;

wherein the exchange means couple the respective separate reconversion means to indicated ones of the separate synthesis means; and wherein the remote-connection processor means are responsive to said incoming call request signal received over said one trunk line by providing a slot assignment signal for indicating which one of the separate synthesis means the exchange is to connect to the one of the separate reconversion means connected to said one trunk line and thereby assigning to said one trunk line the slot in the receive channel bit stream associated with the one of the separate synthesis means that is so connected by the exchange means, wherein the remote-connection processor means maintains a memory of which slots in the receive channel bit stream are so assigned and consults said memory upon receipt of a said incoming call request and then provides to the call processor a said slot assignment signal for effecting a said connection to a synthesis means associated with one of the slots that is not assigned to another trunk line.

5. A system according to claim 4,
wherein the remote-channel connection processor means further provides to the channel control means a receive slot control signal indicating an association between the identified subscriber station and the slot in the receive channel bit stream assigned to signals received from the subscriber station identified by the received subscriber identification signal; and wherein the channel control means is responsive to said receive slot control signal by providing in a slot of the transmit channel bit stream a remote control message addressed to the subscriber station identified by said receive slot control signal and indicating when the addressed subscriber station is to transmit signals to the means for receiving a receive channel signal so that compressed signals derived from the transmission from the addressed subscriber station occupies the assigned slot in the receive channel bit stream.

6. A system according to claim 5, wherein the subscriber station further includes means for processing the remote control message in the received transmit channel signal to cause transmissions from the subscriber station to be transmitted at times indicated by the remote control message.

7. A system according to claim 2, further comprising means for receiving a receive channel signal and for processing the receive channel signal to provide a receive channel bit stream containing separate compressed signals in different respective repetitive sequential slot positions;

a. given plural number of separate signal synthesis means each associated with a different slot position in the receive channel bit stream for reconstructing digital signal samples from separate compressed signals contained in the associated respective slot positions of the receive channel bit stream;

wherein the control means segregates the separate compressed signals from the receive channel bit stream and distributes the segregated signals to the separate synthesis means associated with the respective time slots from which the signals are segregated; and separate reconversion means for respective connection to each of said trunk lines for reconverting digital signal samples to information signals for transmission over the respective trunk lines, wherein each of the separate reconversion means is associated with one of the separate conversion means and is connected to a common one of the trunk lines with the associated separate conversion means;

wherein the exchange means couple the respective separate reconversion means to indicated ones of the separate synthesis means; and wherein the remote-connection processor means are responsive to said incoming call request signal received over said one trunk line by providing a slot assignment signal for indicating which one of the separate synthesis means the exchange is to connect to the one of the separate reconversion means connected to said one trunk line and thereby assigning to said one trunk line the slot in the receive channel bit stream associated with the one of the separate synthesis means that is so connected by the exchange means, wherein the remote-connection processor means maintains a memory of which slots in the receive channel bit stream are so assigned and consults said memory upon receipt of a said incoming call request and then provides to the call processor a said slot assignment signal for effecting a said connection to a synthesis means associated with one of the slots that is not assigned to another trunk line.

8. A system according to claim 7, wherein the remote-channel connection processor means further provides to the channel control means a receive slot control signal indicating an association between the identified subscriber station and the slot in the receive channel bit stream assigned to signals received from the subscriber station identified by the received subscriber identification signal; and wherein the channel control means is responsive to said receive slot control signal by providing in a slot of the transmit channel bit stream a remote control message addressed to the subscriber station identified by said receive slot control signal and indicating when the addressed subscriber station is to transmit signals to the means for receiving a receive channel signal so that compressed signals derived from the transmission from the addressed subscriber station occupies the assigned slot in the receive channel bit stream.

9. system according to claim 8, wherein the subscriber station further includes means for processing the remote control message in the received transmit channel signal to cause transmissions from the subscriber station to be transmitted at times indicated by the remote control message.

10. A system for processing a given plural number of information signals received simultaneously over telephone company trunk lines for simultaneous transmission, comprising separate conversion means for respective connection to said trunk lines for converting the information signals received over said trunk lines into digital signal samples;

a plurality of transmit channel circuits, each of which is assigned to a different given radio frequency (RF) channel and each of which includes a given plural number of separate signal compression means for simultaneously compressing the digital signal samples respectively derived from separate ones of the conversion means to provide said given number of separate compressed signals;

channel control means connected to the compression means for sequentially combining the compressed signals into a single transmit channel bit stream, with each of the respective compressed signals occupying a repetitive sequential slot position in the transmit channel bit stream associated with a predetermined one of the separate compression means;

transmitter means for providing a transmit channel signal for transmission over the given RF channel in response to the transmit channel bit stream;

an exchange for coupling the respective separate conversion means to indicated ones of the separate compression means;

remote-connection processor means for coupling to said trunk lines and responsive to an incoming call request signal received over one of said trunk lines by providing a slot assignment signal indicating which transmit channel circuit and which one of the separate compression means in the indicated transmit channel circuit the exchange is to connect to the one of the separate conversion means connected to said one trunk line and thereby assigning to said one trunk line the indicated transmit channel circuit and the slot in the transmit channel bit stream associated with the one of the separate compression means that is so connected by the exchange means, wherein the remote-connection processor means maintains a memory of which slots are so assigned for each of the plurality of the transmit channel circuits and consults said memory upon receipt of a said incoming call request and then provides a said slot assignment signal that effects a said connection to a given transmit channel circuit in which not all of the time slots are assigned to another trunk line and to a compression means therein associated with one of the slots that is not assigned to another trunk line; and call processor means connected to the remote-connection processor means and responsive to a said slot assignment signal for causing the exchange to complete the connection indicated by said slot assignment signal.

11. A system according to claim 10, wherein said call request is accompanied by a subscriber identification signal identifying a subscriber station to which the call request is addressed, wherein the remote-connection processor means are responsive to said subscriber identification signal by providing to the channel control means in the given transmit channel circuit assigned in response to said accompanying call request a transmit slot control signal indicating an association between the identified subscriber station and the slot in the transmit channel bit stream assigned in response to said accompanying call request, and a transmit channel control signal indicating an association between the identified subscriber station and the RF channel assigned to the given transmit channel circuit assigned in response to said accompanying call request; and wherein the channel control means are connected to the remote-connection processor means and responsive to a said transmit slot control signal by providing in a separate slot of the transmit channel bit stream a remote control message addressed to the subscriber station identified by the transmit slot control signal and indicating the slot containing the compressed speech data signal derived from the speech signal received over the trunk line from which the call request and accompanying subscriber identification signal were received, and further indicating the RF channel assigned to the given transmit channel circuit assigned in response to said call request.

12. A system according to claim 11, further comprising a subscriber station including means for receiving and processing said remote control message and said transmit channel signal to reconstruct the information signal received from the trunk line to which the RF channel and the slot of the transmit channel bit stream indicated in the remote control message addressed to the subscriber station were assigned.

13. A system according to claim 12, further comprising a plurality of receive channel circuits, each of which is paired with one of the transmit channel circuits, each of which is assigned a different given RF channel, and each of which includes receiver means for receiving a receive channel signal and for processing the receive channel signal to provide a receive channel bit stream containing separate compressed signals in different respective repetitive sequential slot positions;

a given plural number of separate signal synthesis means each associated with a different slot position in the receive channel bit stream for reconstructing digital signal samples from separate compressed signals contained in the associated respective slot positions of the receive channel bit stream;

channel control means for segregating the separate compressed signals from the receive channel bit stream and distributing the segregated signals to the separate synthesis means associated with the respective time slots from which the signals are segregated;

separate reconversion means for respective connection to each of said trunk lines for reconverting digital signal samples to information signals for transmission over the respective trunk lines, wherein each of the separate reconversion means is associated with one of the separate conversion means in the paired transmit channel circuit and is connected to a common one of the trunk lines with the associated separate conversion means;

wherein the exchange means couple the respective separate reconversion means to indicated ones of the separate synthesis means; and wherein the remote-connection processor means are responsive to said incoming call request signal received over said one trunk line by providing a slot assignment signal for indicating which receive channel circuit and which one of the separate synthesis means in the indicated received channel circuit the exchange is to connect to the one of the separate reconversion means connected to said one trunk line and thereby assigning to said one trunk line the indicated receive channel circuit and the slot in the receive channel bit stream associated with the one of the separate synthesis means that is so connected by the exchange means, wherein the remote-connection processor means maintains a memory of which slots in the receive channel bit stream are so assigned for each of the plurality of the receive channel circuits and consults said memory upon receipt of a said incoming call request and then provides to the call processor a said slot assignment signal for effecting a said connection to a given receive channel circuit in which not all of the time slots are assigned to another trunk line and which is paired with a transmit channel circuit in which not all of the time slots are assigned to another trunk line and to a synthesis means therein associated with one of the slots that is not assigned to another trunk line.

14. A system according to claim 13, wherein the remote-channel connection processor means further provides to the channel control means in the given receive channel circuit assigned in response to said accompanying call request a receive slot control signal indicating an association between the identified subscriber station and the slot in the receive channel bit stream assigned to signals received from the subscriber station identified by the received subscriber identification signal, and a receive channel control signal indicating an association between the identified subscriber station and the RF channel assigned to the given receive channel circuit in response to said accompanying call request; and wherein the channel control means is responsive to said receive slot control signal by providing in a slot of the transmit channel bit stream a remote control message addressed to the subscriber station identified by said receive slot control signal and indicating when the addressed subscriber station is to transmit signals to the means for receiving a receive channel signal so that compressed signals derived from the transmission from the addressed subscriber station occupies the assigned slot in the receive channel bit stream, and further indicating the RF channel assigned to the given receive channel circuit assigned in response to said call request.

15. A system according to claim 14, wherein the subscriber station further includes
means for processing the remote control message in the received transmit channel signal to cause transmissions from the subscriber station to be transmitted at times indicated by the remote control message and over the RF channel indicated by the remote control message.

16. A system according to claim 11, further comprising
a plurality of receive channel circuits, each of which is paired with one of the transmit channel circuits, each of which is assigned a different given RF channel, and each of which includes
receiver means for receiving a receive channel signal and for processing the receive channel signal to provide a receive channel bit stream containing separate compressed signals in different respective repetitive sequential slot positions;
a given plural number of separate signal synthesis means each associated with a different slot position in the receive channel bit stream for reconstructing digital signal samples from separate compressed signals contained in the associated respective slot positions of the receive channel bit stream;
channel control means for segregating the separate compressed signals from the receive channel bit stream and distributing the segregated signals to the separate synthesis means associated with the respective time slots from which the signals are segregated;
separate reconversion means for respective connection to each of said trunk lines for reconverting digital signal samples to information signals for transmission over the respective trunk lines, wherein each of the separate reconversion means is associated with one of the separate conversion means in the paired transmit channel circuit and is connected to a common one of the trunk lines with the associated separate conversion means;
wherein the exchange means couple the respective separate reconversion means to indicated ones of the separate synthesis means; and wherein the remote-connection processor means are responsive to said incoming call request signal received over said one trunk line by providing a slot assignment signal for indicating which receive channel circuit and which one of the separate synthesis means in the indicated received channel circuit the exchange is to connect to the one of the separate reconversion means connected to said one trunk line and thereby assigning to said one trunk line the indicated receive channel circuit and the slot in the receive channel bit stream associated with the one of the separate synthesis means that is so connected by the exchange means, wherein the remote-connection processor means maintains a memory of which slots in the receive channel bit stream are so assigned for each of the plurality of the receive channel circuits and consults said memory upon receipt of a said incoming call request and then provides to the call processor a said slot assignment signal for effecting a said connection to a given receive channel circuit in which not all of the time slots are assigned to another trunk line and which is paired with a transmit channel circuit in which not all of the time slots are assigned to another trunk line and to a synthesis means therein associated with one of the slots that is not assigned to another trunk line.

17. A system according to claim 16,
wherein the remote-channel connection processor means further provides to the channel control means in the given receive channel circuit assigned in response to said accompanying call request a receive slot control signal indicating an association between the identified subscriber station and the slot in the receive channel bit stream assigned to signals received from the subscriber station identified by the received subscriber identification signal, and a receive channel control signal indicating an association between the identified subscriber station and the RF channel assigned to the given receive channel circuit in response to said accompanying call request; and
wherein the channel control means is responsive to said receive slot control signal by providing in a slot of the transmit channel bit stream a remote control message addressed to the subscriber station identified by said receive slot control signal and indicating when the addressed subscriber station is to transmit signals to the means for receiving a receive channel signal so that compressed signals derived from the transmission from the addressed subscriber station occupies the assigned slot in the receive channel bit stream, and further indicating the RF channel assigned to the given receive channel circuit assigned in response to said call request.

18. A system according to claim 17, wherein the subscriber station further includes
means for processing the remote control message in the received transmit channel signal to cause transmissions from the subscriber station to be transmitted at times indicated by the remote control message and over the RF channel indicated by the remote control message.

* * * * *